(12) United States Patent
Vutukuri et al.

(10) Patent No.: US 9,185,712 B2
(45) Date of Patent: Nov. 10, 2015

(54) SINGLE ANTENNA INTERFERENCE CANCELLATION IN A MOBILE COMMUNICATION SYSTEM

(75) Inventors: Eswar Kalyan Vutukuri, Hedge End (GB); Werner Kreuzer, Baiern (DE); David Philip Hole, Southampton (GB); René Faurie, Versailles (FR)

(73) Assignee: BlackBerry Limited, Waterloo, Ontario (CA)

( * ) Notice: Subject to any disclaimer, the term of this patent is extended or adjusted under 35 U.S.C. 154(b) by 354 days.

(21) Appl. No.: 13/468,803

(22) Filed: May 10, 2012

(65) Prior Publication Data

US 2013/0121320 A1    May 16, 2013

(30) Foreign Application Priority Data

May 10, 2011 (EP) .................................... 11305560

(51) Int. Cl.
*H04W 72/08* (2009.01)
*H04J 11/00* (2006.01)
*H04B 1/10* (2006.01)

(52) U.S. Cl.
CPC ............... *H04W 72/082* (2013.01); *H04B 1/10* (2013.01); *H04J 11/0036* (2013.01)

(58) Field of Classification Search
None
See application file for complete search history.

(56) References Cited

U.S. PATENT DOCUMENTS

| | | | |
|---|---|---|---|
| 2004/0171364 A1* | 9/2004 | Pukkila | 455/226.1 |
| 2004/0259561 A1 | 12/2004 | Stewart et al. | |
| 2005/0201493 A1* | 9/2005 | Onggosanusi et al. | 375/340 |
| 2007/0058709 A1 | 3/2007 | Chen et al. | |
| 2008/0219325 A1 | 9/2008 | Sambhwani | |
| 2010/0322092 A1* | 12/2010 | Yu | 370/252 |
| 2010/0322211 A1* | 12/2010 | Hole et al. | 370/337 |
| 2011/0077017 A1* | 3/2011 | Yu et al. | 455/452.1 |
| 2012/0040633 A1* | 2/2012 | Nammi et al. | 455/296 |

FOREIGN PATENT DOCUMENTS

| | | |
|---|---|---|
| CA | 2776582 | 11/2012 |
| CN | 1661930 | 8/2005 |
| CN | 102780662 | 11/2012 |
| EP | 2523375 | 11/2012 |
| WO | 2010127239 | 11/2010 |

OTHER PUBLICATIONS

3GPP, "Technical Specification Group Core Network and Terminals; Mobile radio interface Layer 3 specification; Core network protocols; Stage 3 (Release 10)," TS 24.008, V10.2.0, Mar. 2011 (634 pages).

(Continued)

*Primary Examiner* — Thai Nguyen
(74) *Attorney, Agent, or Firm* — Fish & Richardson P.C.

(57) ABSTRACT

Methods, apparatus and articles of manufacture for single antenna interference cancellation in a mobile communication system are disclosed. An example method disclosed herein for a wireless device comprises determining a number of bursts to be received in a time division multiple access frame comprising a plurality of timeslots, and when the number of bursts exceeds a threshold number of bursts for which single antenna interference cancellation can be performed, performing single antenna interference cancellation for a subset of the bursts received in the time division multiple access frame.

27 Claims, 24 Drawing Sheets

(56) References Cited

OTHER PUBLICATIONS

3GPP, "Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 10)," TS 44.060, V10.4.0, Mar. 2011 (622 pages).

3GPP, "Technical Specification Group GSM/EDGE Radio Access Network; Multiplexing and multiple access on the radio path (Release 10)," TS 45.002, V10.0.0, Mar. 2011 (112 pages).

3GPP, "Technical Specification Group GSM/EDGE Radio Access Network; Radio transmission and reception (Release 10)," 45.005, V10.0.0, Mar. 2011 (246 pages).

3GPP, "Technical Specification Group GSM/EDGE Radio Access Network; Radio subsystem link control (Release 10)," TS 45.008, V10.0.0, Mar. 2011 (148 pages).

Rim UK Ltd., "Multislot support for DARP-I mobiles in downlink dual carrier configuration," 3GPP TSG GERAN #49, Tdoc GP-110173, Agenda Item: 7.1.5.1.6, Chengdu, China, Feb. 28-Mar. 4, 2011 (3 pages).

EPO, "Extended European Search Report," issued in connection with European Patent Application No. 11305560.2, dated Oct. 18, 2011 (6 pages).

PCT, "International Search Report and Written Opinion," issued in connection with PCT Patent Application No. PCT/IB2012/052328, dated Oct. 9, 2012 (12 pages).

Patent Cooperation Treaty, "International Preliminary Report on Patentability," issued in connection with International application No. PCT/IB2012/052328, dated Nov. 21, 2013, 9 pages.

Canadian Intellectual Property Office, "Office Action," issued in connection with Canadian Application No. 2,776,582, dated Oct. 7, 2013, 3 pages.

Canadian Intellectual Property Office, "Office Action", issued in connection with Canadian Patent Application No. 2,776,582, dated Dec. 2, 2014 (4 pages).

State Intellectual Property Office of People's Republic of China, "First Office Action", issued in connection with Chinese Patent Application No. 201210143957.2, dated Jul. 1, 2014 (12 pages).

\* cited by examiner even the US 9,185,712 B2

SINGLE ANTENNA INTERFERENCE CANCELLATION IN A MOBILE COMMUNICATION SYSTEM

FIELD OF THE DISCLOSURE

This disclosure relates generally to mobile communication systems and, more particularly, to single antenna interference cancellation in a mobile communication system.

BACKGROUND

Single antenna interference cancellation can refer to any technique to reduce interference in mobile communication system without the use of multiple antennas. Single antenna interference cancellation can be applied in the downlink to reduce the impact of interference for communication from a network to a mobile station, and can additionally or alternatively be applied in the uplink to reduce the impact of interference for communication from the mobile station to the network. In the GSM/EDGE radio access network (GERAN) specifications (where GSM refers global system for mobile communications, and EDGE refers to enhanced data rates for GSM evolution), no particular technique for single antenna interference cancellation has been standardized. Instead, the GERAN specifications include downlink advanced receiver performance requirements that inherently require implementation of single antenna interference cancellation to enable these performance requirements to be met.

DETAILED DESCRIPTION

Figure 1:
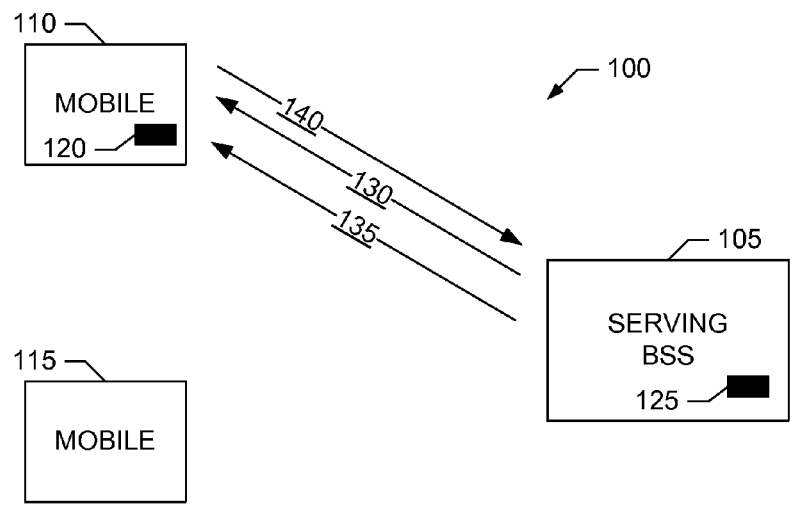
FIG. 1 is block diagram of an example mobile communication system including an example mobile station and an example base station capable of controlling single antenna interference cancellation as described herein.

Methods, apparatus and articles of manufacture for controlling single antenna interference cancellation in a mobile communication system are disclosed herein. An example disclosed method to control single antenna interference cancellation in a mobile communication system includes an example mobile station determining a number of bursts to be received in a time division multiple access frame comprising a plurality of timeslots. When the number of bursts exceeds a threshold number of bursts for which single antenna interference cancellation can be performed, this example method also includes the mobile station performing single antenna interference cancellation for a subset of the bursts received in the time division multiple access frame. Example techniques for performing single antenna interference cancellation for the subset of the bursts, including per-burst techniques and per-codeword techniques, are described in greater detail below. As also described in detail below, these example techniques can be implemented individually or combined in many different manners.

Another example disclosed method to control single antenna interference cancellation in a mobile communication system includes an example mobile station receiving a message, such as a packet downlink assignment message, from an example network indicating downlink timeslots of a time division multiple access frame for which downlink advanced receiver performance requirements are to be met. For example, the message may indicate the timeslot number(s) of the downlink timeslot(s) for which the downlink advanced receiver performance requirements are to be met. This example method also includes the mobile station enabling single antenna interference cancellation for at least a subset of the downlink timeslots indicated in the received message. In some examples, when a number of timeslots for which the downlink advanced receiver performance requirements can be supported is to be exceeded if single antenna interference cancellation is enabled for the downlink timeslots indicated in the received signaling, the method further includes the mobile station disabling single antenna interference cancellation for at least one of the downlink timeslots indicated in the received signaling. Additionally or alternatively, in some examples the method includes the mobile station indicating to the network a number of timeslots for which the downlink advanced receiver performance requirements can be supported.

A further example disclosed method to control single antenna interference cancellation in a mobile communication system includes an example network sending a message, such as a packet downlink assignment message, to a mobile station indicating downlink timeslots of a time division multiple access frame for which downlink advanced receiver performance requirements are to be met. For example, the message may indicate the timeslot number(s) of the downlink timeslot(s) for which the downlink advanced receiver performance requirements are to be met. In some examples, the method also includes the network receiving from the mobile station an indication of a number of timeslots for which the downlink advanced receiver performance requirements can be supported, and the network using the received indication to determine the downlink timeslots for which downlink advanced receiver performance requirements are to be met.

Yet another example disclosed method to control single antenna interference cancellation in a mobile communication system includes an example network determining a subset of downlink timeslots for which an example mobile station is able to meet downlink advanced receiver performance requirements. This example method also includes the network scheduling and/or selecting a modulation and coding scheme for a downlink data transmission to the mobile station based on determining the subset of downlink timeslots in which the downlink advanced receiver performance requirements are able to be met. In some examples, the method further includes the network receiving a message from the mobile station indicating the subset of downlink timeslots for which the mobile station is able to meet the downlink advanced receiver performance requirements. The message can be, for example, a packet downlink ack/nack message, a piggy-backed ack/nack field included in a received data block, etc. Additionally or alternatively, in some examples the method includes the network receiving link quality interference measurements from the mobile station for the subset of downlink timeslots for which the mobile station is able to meet the downlink advanced receiver performance requirements, but not receiving link quality interference measurements for any other timeslot in the time division multiple access frame (or vice versa). In such an example, the network can use the received link quality interference measurements to determine the subset of downlink timeslots for which the mobile station is able to meet (or has met) the downlink advanced receiver performance requirements.

As mentioned above, the GERAN specifications include downlink advanced receiver performance (DARP) requirements (e.g., such as DARP Phase I requirements) that inherently rely on implementation of single antenna interference cancellation (SAIC) to enable these performance requirements to be met. In prior networks conforming to the existing GERAN specifications, a mobile station that supports DARP is expected to support DARP on all downlink timeslots in which the mobile station can receive data. However, a mobile station may have insufficient processing capacity to perform SAIC for all the downlink timeslots in which it could otherwise receive downlink data. In such cases, an existing mobile station can signal to the network that it supports receiving data on only the lower number of downlink timeslots for which it can also support SAIC, which can result in an undesirable reduction in the peak data rate achievable by the mobile station. Alternatively, the mobile station can signal to the network that it does not support the DARP requirements, which can undesirably limit the effectiveness of radio resource management techniques that take advantage of knowing that the mobile station is able to satisfy the DARP requirements.

Unlike such prior networks conforming to the existing GERAN specifications, a network supporting SAIC control as described herein permits a mobile station to selectively enable and disable SAIC in the context of supporting DARP requirements. For example, a mobile station implementing SAIC control in accordance with the example described herein can selectively perform SAIC on only a subset of bursts to be received in its assigned and/or allocated timeslots of a time division multiple access (TDMA) frame. Such SAIC control can be beneficial if, for example, the mobile station has insufficient processing capacity to perform SAIC for all the downlink timeslots in which it could otherwise receive downlink data. Furthermore, at least some examples of controlling SAIC described herein enable SAIC to be selectively controlled (e.g., enabled and/or disabled) on a per-burst and/or per codeword basis while still permitting the mobile stations to meet the DARP requirements.

Turning to the figures, a block diagram of an example mobile communication system 100 in which SAIC can be controlled in accordance with example techniques described herein is illustrated in FIG. 1. The mobile communication system 100 of the illustrated example is GERAN compliant and supports DARP requirements, such as the DARP Phase I requirements specified in the Third Generation Partnership Project (3 GPP) Technical Specification (TS) 45.005. As such, the mobile communication system 100 also supports SAIC to meet the DARP requirements. For example, although applicable for downlink and uplink communications, SAIC can be particular useful in meeting DARP requirements for downlink communications as many GERAN mobile stations do not contain multiple antennas and, thus, cannot implement interference cancellation techniques employing multiple antennas. Although the example mobile communication system 100 is assumed to be GERAN compliant and to support DARP requirements, the example control techniques disclosed herein are applicable in other TDMA or similar communication systems employing SAIC and/or other interference cancellation techniques (e.g., including interference cancellation techniques involving multiple antennas). Furthermore, the example control techniques disclosed herein are not limited to controlling interference cancellation in TDMA or similar communication systems, but can be used to control any signal processing that may be applied on a per-burst basis. Moreover, at least some of the example control techniques disclosed herein can be used to control any signal processing that may be applied on a per-codeword basis.

The mobile communication system 100 of FIG. 1 includes an example network element 105 (also referred to as an example network component 105), which is illustrated in FIG. 1 as an example base station subsystem (BSS) 105, that may be implemented by, for example, one or more of a base station transceiver (BTS), a base station controller (BSC), a packet control unit (PCU), a network cell, etc. The mobile communication system 100 also includes example mobile stations 110 and 115. The mobile stations 110 and 115 may be implemented by any type of mobile station or user endpoint equipment or, more generally, any type of wireless device, such as smartphone, a mobile telephone device that is portable, a mobile telephone device implementing a stationary telephone, a personal digital assistant (PDA), etc. To support controlling of SAIC in accordance with the examples described herein, the mobile station 110 includes an example receive-side SAIC controller 120, and the network element 105 includes an example transmit-side SAIC controller 125. (The mobile station 115 may or may not include a respective receive-side SAIC controller.) The receive-side SAIC controller 120 and the transmit-side SAIC controller 125 are described in greater detail below. Furthermore, although only one network element 105 and two mobile stations 110-115 are illustrated in FIG. 1, the mobile communication system 100 can support any number of network elements and mobile stations.

Figure 2:
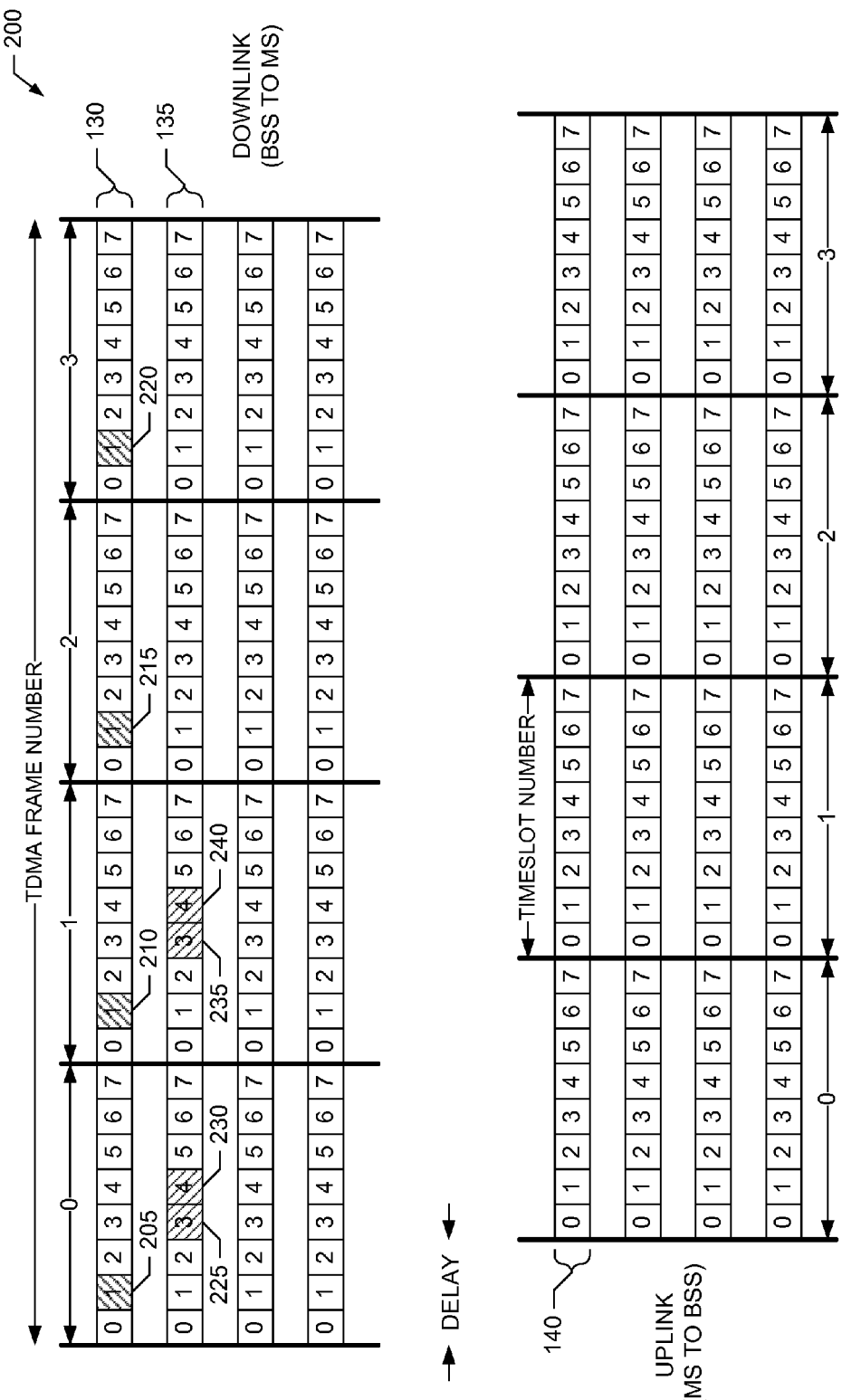
FIG. 2 illustrates example downlink and uplink time division multiple access frames for use in the example mobile communication system of FIG. 1.

As shown in FIG. 1, the network element 105 and the mobile station 110 exchange information by way of one or more downlink radio frequency (RF) channels (also referred to as downlink carriers) 130 and 135, and one or more uplink RF channels (also referred to as uplink carriers) 140. FIG. 2 illustrates an example GSM radio interface 200 that may be employed by the mobile communication system 100 of FIG. 1. The radio interface 200 is divided into downlink and uplink RF channel pairs, and each RF channel is divided into TDMA frames containing eight (8) timeslots. As shown in the example of FIG. 2, which is not meant to be limiting, the radio interface 200 supports four (4) downlink and uplink RF channel pairs, including the downlink RF channels 130 and 135 for communicating from the network element 105 to the mobile station 110, and the uplink RF channel 140 for communicating from the mobile station 110 to the network element 105. In the illustrated example, the downlink RF channel 130 is paired with the uplink RF channel 140.

In each direction, each timeslot of the radio interface 200 may be associated with, for example, a circuit switched channel (TCH), which can carry circuit switched services like speech, or a packet data channel (PDCH), which can carry user packet switched (PS) data. For example, the network element 105 can establish a downlink temporary block flow (TBF) with the mobile station 110 to send downlink packet data from the network element 105 to the mobile station 110. The downlink TBF can be assigned a single slot (e.g., single PDCH) or multiple slots (e.g., corresponding to a multislot configuration) on, for example, the radio frequency channel 130. Similarly, the network element 105 can establish an uplink TBF with the mobile station 110 to enable the mobile station 110 to send uplink packet data to the network element 105 over the uplink radio frequency channel 140.

The mobile communication system 100 of the illustrated example supports downlink dual carrier operation in which the mobile station 110 can receive data on two carriers having different carrier frequencies (or different radio frequency channel sequences). In other words, the mobile station 110 of the illustrated example can be assigned downlink TBFs having PDCHs on both of two carriers. Such an assignment is called a dual carrier assignment. For example, in FIGS. 1 and 2 the downlink RF carriers 130 and 135 have different carrier frequencies (or different radio frequency channel sequences). In downlink dual carrier operation, each of the downlink carriers (e.g., such as the downlink carrier 130) is paired with a corresponding uplink carrier (e.g., such as the uplink carrier 140). One downlink carrier (e.g., the downlink carrier 130) is defined to be carrier 1 (or the first carrier) and the other carrier (e.g., the downlink carrier 135) is defined to be carrier 2 (or the second carrier) by way of an assignment message sent to the mobile station 110. Furthermore, during operation, the downlink carrier (e.g., the downlink carrier 130) paired with the uplink carrier (e.g., the uplink carrier 140) via which the mobile station 110 generally is presently sending its polling information to the network element 105 is referred to as the primary carrier, whereas the other downlink carrier not paired with this uplink carrier (e.g., such as the downlink carrier 135) is referred to as the secondary carrier.

As used herein, an assignment in the mobile communication system 100 generally refers to the act of signaling to a mobile station, such as the mobile station 110, the timeslot(s) that is/(are) made available (e.g., assigned) to the mobile station. The set of timeslots assigned to a unidirectional data flow are specified by a respective TBF. As noted above, a TBF is unidirectional such that an uplink TBF relates to an uplink assignment (and allocation, which is described below) and a downlink TBF relates to a downlink assignment (and allocation, which is described below). As also noted above, a mobile station, such as the mobile station 110, can be assigned one or more timeslots within a TDMA frame for a given service. For example, speech services are typically assigned on one timeslot in a TDMA frame, whereas packet switched (PS) data services may be assigned on one or more timeslots within the TDMA frame. In dual transfer mode (DTM) operation, both speech and data services are assigned resources within a TDMA frame, although typically on different timeslots. (An exception to this assignment is single slot DTM operation in which a half rate speech channel is multiplexed with a half rate packet channel on the same timeslot.)

As used herein, an allocation in the mobile communication system 100 generally refers to the act of actual reception/transmission of data on one or more particular timeslots, typically in units of radio blocks (e.g., over 2 or 4 TDMA frames), to/from a particular mobile (e.g., and associated with a particular TBF). As such, an allocation can include a subset, or all of, the timeslots in the corresponding assignment. Also, multiple mobile stations can have the same or overlapping assignments, with allocation being performed to avoid collisions. In some circumstances, the mobile communication system 100 may allocate a particular timeslot for transmission by a mobile station, such as the mobile station 110, although no transmission actually occurs. Such behavior is permitted, for example, in certain configurations when the mobile station 110 has no data to transmit.

With reference to the GSM radio interface 200, in the mobile communication system 100, the timeslot numbering for the uplink is offset from the timeslot numbering for the downlink. As such, in a given TDMA frame, a downlink timeslot and an uplink timeslot having the same timeslot number can be assigned and allocated for a mobile station, such as the mobile station 110, on both the downlink and the uplink even if the mobile station is unable to receive and transmit at the same time. However, a mobile station, such as the mobile station 110, which is not capable of receiving and transmitting at the same time, is generally not assigned and/or allocated timeslots of a given TDMA frame in both the uplink or the downlink that have different timeslot numbers, but that overlap temporally, except when, for example, enhanced flexible timeslot assignment (EFTA) is used.

As mentioned above, more than one timeslot within a TDMA frame can be assigned to a mobile station to support one or more services. This is referred to as multislot operation. The number of timeslots that a mobile station, such as the mobile station 110, can support within a TDMA frame depends on the multislot capability of the mobile station. The mobile station 110 can signal its multislot capability to the network in, for example, the mobile station classmark or the mobile station radio access capability information elements, as described in 3 GPP TS 24.008. The multislot capability of the mobile station 110 is indicated by the multislot class to which the mobile station belongs, as described in 3 GPP TS 45.002. Also, a mobile station, such as the mobile station 110, may have multiple multislot classes applicable in different scenarios (e.g., such as corresponding to whether DTM and/or EGPRS is/are in use, etc.) Depending on its multislot capabilities (i.e., its multislot class), a mobile station, such as the mobile station 110, can support from 1 to 8 timeslots in the uplink TDMA frame of a given uplink RF carrier (e.g., such as the uplink RF carrier 140) and/or from 1 to 8 timeslots in the downlink TDMA frame of a given downlink RF carrier (e.g., such as the downlink RF carrier 130 or 135). As an illustrative example, a mobile station belonging to multislot class 12 (as defined in 3 GPP TS 45.002) is capable of, in a given TDMA frame, (i) receiving up to 4 timeslots, (ii) transmitting up to 4 timeslots, or (iii) transmitting and receiving on n and m timeslots, respectively, provided that n+m<=5.

The mobile communication system 100 can support different transmission time intervals for transmitting codewords via the radio interface 200 of FIG. 2. Each TDMA frame has a duration of approximately 5 milliseconds (ms.) or, more particularly, 4.615 ms. As described above, a particular timeslot is associated with a respective PDCH as specified by an established TBF. In the case of basic transmission time interval (BTTI) operation, a codeword is interleaved and transmitted over four (4) bursts each transmitted in the same timeslot (e.g., timeslots having the same number, corresponding to a particular PDCH) in four (4) consecutive TDMA frames. For example, a codeword transmitted using four bursts sent in timeslots 205, 210, 215 and 220, each having a timeslot number of 1, is a representative example of a codeword sent using a BTTI configuration. However, in the case of reduced transmission time interval (RTTI) operation, two timeslots (e.g., also referred to as a timeslot pair or a PDCH pair) in each of two adjacent TDMA frames are used to transmit the codeword. As such, in RTTI, the four bursts of the codeword are interleaved and transmitted within approximately 10 ms. using a pair of timeslots in each of two adjacent TDMA frames. For example, a codeword transmitted using four bursts sent in timeslots 225, 230, 235 and 240, which have timeslot numbers of 2 and 3 in two adjacent TDMA frames, is a representative example of a codeword sent using an RTTI configuration. If both BTTI and RTTI timeslots are present simultaneously in a given assignment, such a configuration is referred to as a multiple transmission time interval (MTTI) assignment. In an MTTI assignment, timeslots having a given timeslot number can be used for BTTI transmissions or RTTI transmissions, but not both.

As mentioned above, in some examples, the mobile station 110 can support dual carrier operation in which the timeslots assigned to the mobile station 110 (e.g., to support one or more services) can span across two downlink RF channels, such as the downlink RF channels 130 and 135. With reference to FIG. 2, depending on its multislot capabilities (e.g., the multislot class), the mobile station 110 may support receiving up to a maximum of 16 timeslots within a given TDMA frame interval on the two downlink RF channels 130 and 135.

Voice services over adaptive multi-user channels on one slot (referred to as VAMOS) is a GERAN feature in which two speech channels, each of which is addressed to a different mobile station, are multiplexed on the same frequency and time resource. The transmissions of (and to) the multiplexed mobile stations use different training sequences. (Training sequences are described in greater detail below.) In at least some examples, VAMOS, especially in the downlink, relies on SAIC being implemented in each multiplexed mobile station to enable cancellation of the transmitted signal associated with the other of the multiplexed mobile stations. In the uplink, on the other hand, GERAN networks typically rely on multiple antenna techniques to detect and decode the multiplexed transmissions from both mobile stations in the case of VAMOS.

Figure 3:
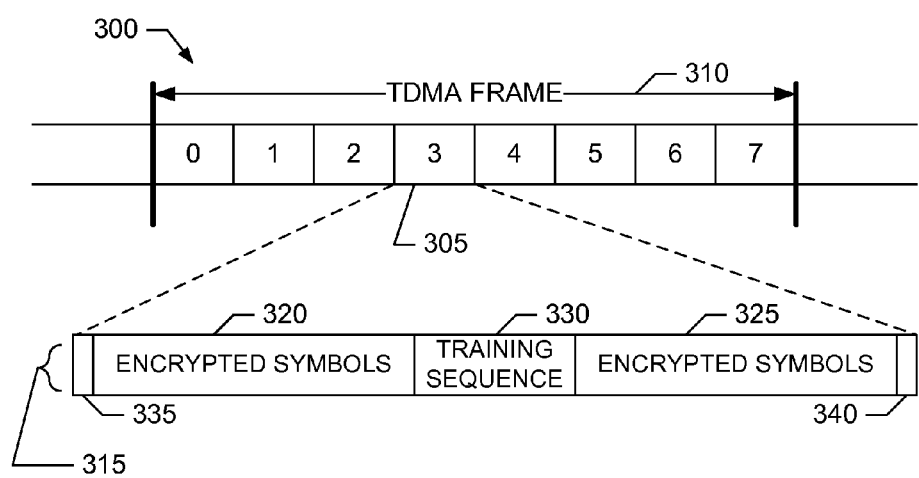
FIG. 3 illustrates an example format for an example burst that may be sent in a timeslot included in the example time division multiple access frames illustrated in FIG. 2.

FIG. 3 illustrates an example format 300 of a GSM normal burst that may be sent in a timeslot included in a TDMA frame of the GSM radio interface 200 of FIG. 2. The example format 300 is but one example of the types of bursts that could be sent in the timeslot 305. Referring to FIGS. 2 and 3, each timeslot 305 within a TDMA frame 310 is used to transmit one (normal) burst 315 via the radio interface 200. The burst 315 includes two encrypted symbol fields 320 and 325 each carrying 58 symbols of layer-2 information. The burst 315 also includes a 26-symbol training sequence 330 that is used for channel estimation and equalization to facilitate reception of the burst 315. Tail symbols 335 and 340 are further included in the burst 315, and a guard band (not shown) may also be associated with the burst 315. The layer 2 information which is mapped to the encrypted symbol fields 320, 325 on each burst 315 is channel coded prior to mapping. The channel coding is used as a forward error correction mechanism such that errors on the channel can be corrected at the receiver using the redundancy in the received bits.

As described above, codewords contain multiple bursts 315 transmitted in a particular timeslot (e.g., for BTTI) or pair of timeslots (e.g., for RTTI) over multiple TDMA frames 300. For example, for full rate speech, one codeword corresponds to 8 GSM normal bursts 315, whereas for half rate speech or packet data, one codeword corresponds to 4 GSM normal bursts 315. As described in greater detail below, for either voice services or data services, the DARP requirements are based on block error rate performance, in which block errors are determined from errors in decoding entire codewords each made up of multiple bursts 315, as described above. (A codeword is also referred to herein as a radio block.) In contrast, SAIC is typically applied to each burst 315 of received data before and/or during equalization, which is prior to combining the bursts into codewords and performing decoding.

Figure 4:
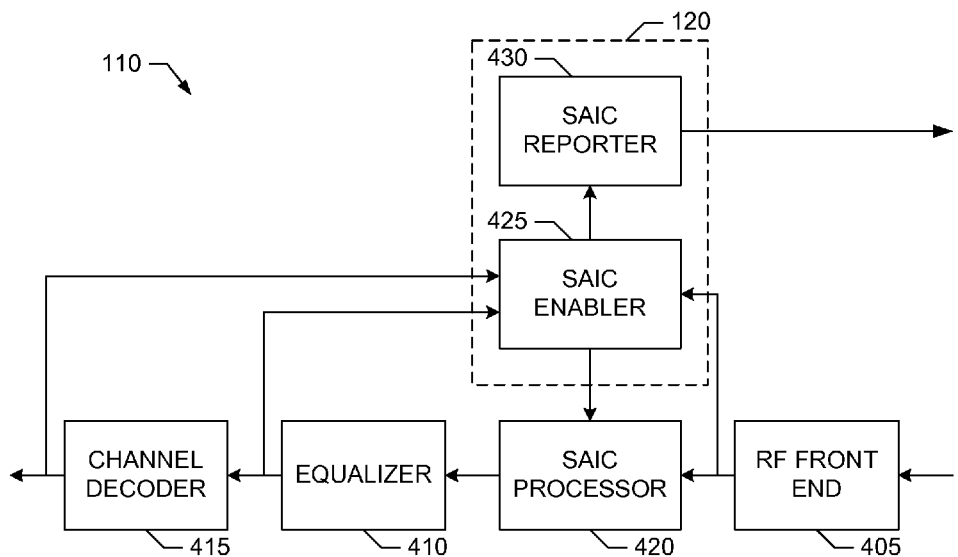
FIG. 4 illustrates an example implementation of the mobile station of FIG. 1 that includes an example receive-side single antenna interference cancellation controller.

Using the foregoing descriptions of the mobile communication system 100 of FIG. 1, the GSM radio interface 200 of FIG. 2 and the GSM burst format 300 of FIG. 3 as a frame of reference, the receive-side SAIC controller 120 included in the mobile station 110 and the transmit-side SAIC controller 125 included in the network element 105 are now described. FIG. 4 illustrates an example implementation of the mobile station 110 of FIG. 1, which includes an example implementation of the receive-side SAIC controller 120. The mobile station 110 of FIG. 4 includes an example RF front end 405 to receive downlink RF channels, such as the RF channels 130 and/or 135. The mobile station 110 of FIG. 4 also includes an example equalizer 410 to perform channel estimation and equalization to receive the bursts 315 transmitted in the timeslots 305 of the received RF channel(s) 130 and/or 135. The mobile station 110 of FIG. 4 further includes an example channel decoder 415 to deinterleave and decode the received bursts 315 to obtain the downlink codewords (or radio blocks) transmitted via the received RF channels 130 and/or 135.

To perform SAIC on the received bursts 315, the mobile station 110 of FIG. 4 includes an example SAIC processor 420. The SAIC processor 420 implements any appropriate interference cancellation technique capable of mitigating the effect of an interfering signal. Many SAIC are particularly well-suited to reducing/mitigating interference when both the wanted and interfering signals are modulated using Gaussian minimum shift keying (GMSK), which is one of the modulation schemes that can be employed in the GSM burst 315. In some examples, the SAIC processor 420 uses the training sequence 330 of a wanted GSM burst 315 addressed to the mobile station 110 to reduce the interference caused by other coincident or overlapping GSM burst(s) 315 (e.g., addressed to one or more other mobile stations, such as the mobile station 115). In the illustrated example, the SAIC processor 420 performs interference cancellation on the signal to be input to the equalizer 410. However, in other examples (not shown), SAIC processing can be performed and/or distributed at one or more other points in the receive and decode chain of the mobile station 110.

The receive-side SAIC controller 120 included in the mobile station 110 controls the SAIC processing performed by the SAIC processor 420. The receive-side SAIC controller 120 illustrated in FIG. 4 includes an example SAIC enabler 425 to selectively enable and disable SAIC processing for different bursts 315 received by the mobile station 110. As mentioned above, such control of SAIC processing can be beneficial if, for example, the mobile station 110 has insufficient processing capacity to perform SAIC for all its assigned or allocated downlink timeslots. In some examples, the SAIC enabler 425 performs SAIC control by determining a number of bursts 315 to be received in the timeslot(s) 305 assigned or allocated to the mobile station 110 in a given downlink TDMA frame 310, or in the case of downlink dual carrier operation, across two downlink TDMA frames 310, each being associated with a respective carrier. If the number of bursts 315 to be received exceeds a threshold number of bursts for which single antenna interference cancellation can be performed (referred to herein as N_SAIC), the SAIC enabler 425 causes the SAIC processor 420 to perform SAIC processing on only a subset of one or more bursts 315 to be received in the downlink TDMA frame 310. For example, if the SAIC processor 420 is initialized to not perform SAIC processing on any received burst 315, then the SAIC enabler 425 can enable the SAIC processor 420 to perform SAIC processing on only the selected subset of bursts 315. Conversely, if the SAIC processor 420 is initialized to perform SAIC processing on all received bursts 315, then the SAIC enabler 425 can disable the SAIC processor 420 from performing SAIC processing on any burst 315 other then the selected subset of bursts 315.

Although the examples described herein generally assume that the receive-side SAIC controller 120 uses SAIC processing capacity (e.g., corresponding to N_SAIC) to determine whether to enable/disable SAIC for particular burst(s)/timeslot(s), the receive-side SAIC controller 120 can also use criteria other than, or in addition to, SAIC processing capacity to determine whether to enable/disable SAIC. For example, the network could proactively indicate to the mobile station 110 that SAIC can be disabled for certain timeslot(s) (e.g., because the indicated timeslot(s) are not being subjected to an interferer, or at least not a GMSK interferer, etc.) Additionally or alternatively, the receive-side SAIC controller 120 could disable SAIC based on mobile performance criteria, such as to reduce battery/power consumption, etc.

The SAIC enabler 425 can use information from one or more of the RF front end 405, the equalizer 410 and/or the channel decoder 415 to determine for which bursts/timeslots SAIC is to be enabled/disabled. For example, the SAIC enabler 425 can obtain radio conditions, interference measurements, etc., from the RF front end 405. Additionally or alternatively, the SAIC enabler 425 can obtain bit error rate, frame error rate, quality measurements, etc., from the equalizer 410. Additionally or alternatively, the SAIC enabler 425 can obtain decoded signaling information, decoded header information (e.g., address information), etc., from the channel decoder 415.

As described in greater detail below, the SAIC enabler 425 can implement per-burst SAIC control and/or per-codeword SAIC control. When performing per-burst SAIC control, the SAIC enabler 425 is able to selectively enable or disable SAIC processing independently for each received burst 315 and, thus, each received burst 315 in a received codeword may have SAIC processing enabled or disabled independently of the other received bursts 315 in the codeword. As such, in per-burst SAIC control, the SAIC enabler 425 is able to selectively enable or disable SAIC processing independently in each timeslot 305, and timeslots 305 having the same timeslot number in adjacent TDMA frames 310 within a radio block period may have SAIC processing enabled or disabled independently of each other.

Figure 5:
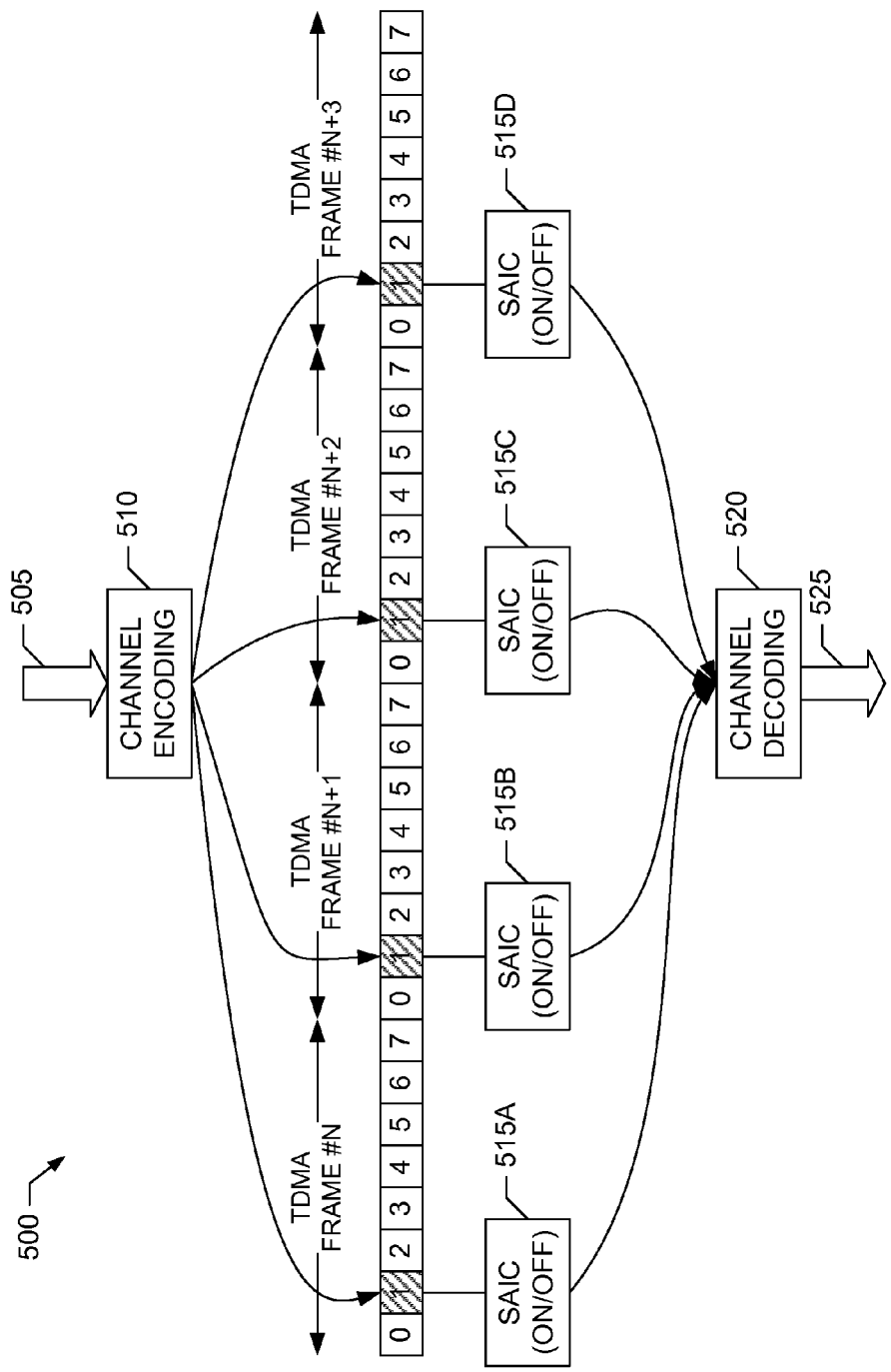
FIG. 5 is a block diagram illustrating an example of per-burst control that may be performed by the example receive-side single antenna interference cancellation controller of FIG. 4.

An example operation 500 in which the SAIC enabler 425 performs per-burst SAIC control is illustrated in FIG. 5. In the illustrated example operation 500, at the transmitter, bits 505 to be transmitted in a codeword are input to an example channel encoding process 510. The channel encoding process 510 encodes the bits into four bursts to be sent in timeslot number 1 of four adjacent TDMA frames N through N+3. As illustrated in FIG. 5, the SAIC enabler 425 in the receiving device (e.g., the mobile station 110) enables or disables SAIC for each timeslot independently, which is depicted as independent SAIC ON/OFF processes 515A-D. Each received burst is then provided to an example channel decoding process 520, which combines and decodes the four received bursts to obtain decoded bits 525 corresponding to the input bits 505.

In contrast to per-burst SAIC control, when performing per-codeword SAIC control, the SAIC enabler 425 either selectively enables or selectively disables SAIC processing for all received bursts 315 of a received codeword as a group. Thus, in per-codeword SAIC control, the SAIC enabler 425 selectively enables or selectively disables SAIC processing for all timeslots having the same timeslot number in adjacent TDMA frames 310 within a radio block period (and, thus, carrying bursts for the same codeword). Per-timeslot SAIC control is an example of per-codeword SAIC control in which SAIC control is selectively enabled or disabled based on timeslot number for a duration of a communication session (e.g., a call) such that the same SAIC control is applied to timeslots having the same timeslot number in adjacent TDMA frames during the communication session (e.g., the call).

Figure 6:
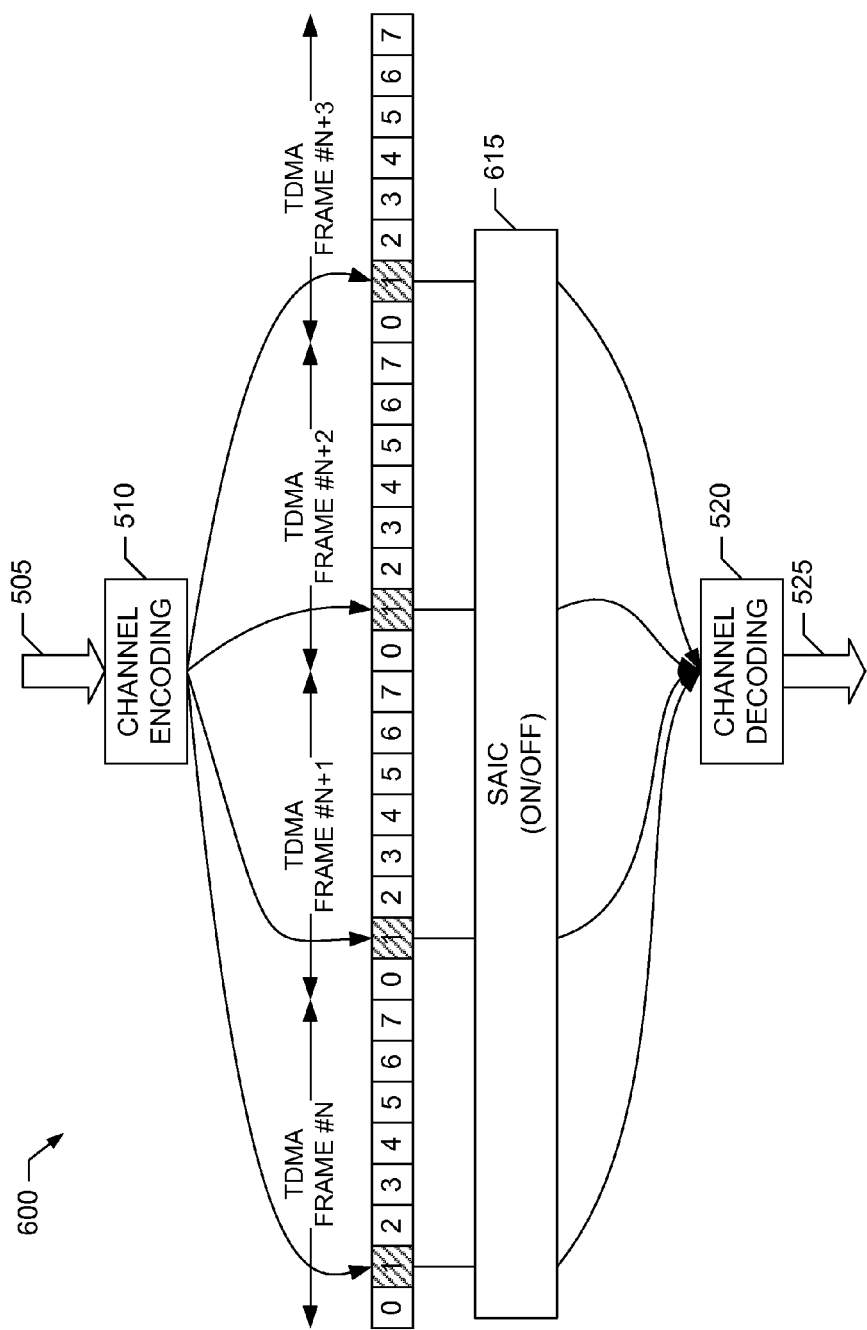
FIG. 6 is a block diagram illustrating an example of per-codeword control that may be performed by the example receive-side single antenna interference cancellation controller of FIG. 4.

An example operation 600 in which the SAIC enabler 425 performs per-codeword SAIC control is illustrated in FIG. 6. Like elements in FIGS. 5 and 6 are labeled with the same reference numerals. In the illustrated example operation 600, the bits 505 to be transmitted in a codeword are input to the example channel encoding process 510. The channel encoding process encodes the bits into four bursts to be sent in timeslot number 1 of four adjacent TDMA frames N through N+3. As illustrated in FIG. 6, the SAIC enabler 425 enables or disables SAIC for timeslots in a radio block period as group, which is depicted as the SAIC ON/OFF process 615 in which the same SAIC control is applied to each timeslot number 1 in the four adjacent TDMA frames included in the radio block period for the codeword (or radio block) being transmitted. Each received burst is then applied to an example channel decoding process 520, which combines and decodes the four received bursts to obtain decoded bits 525 corresponding to the input bits 505.

Returning to FIG. 4, examples of per-burst SAIC control and per-codeword SAIC control techniques that may be implemented by the SAIC enabler 425 are described in greater detail below. Additionally, and as described in greater detail below, the SAIC enabler 425 can implement each of the described per-burst SAIC control techniques or per-codeword SAIC control techniques on its own, or the SAIC enabler 425 can implement a combination of one or more of the described or similar techniques.

The receive-side SAIC controller 120 of FIG. 4 also includes an example SAIC reporter 430 to report the downlink timeslot(s) for which DARP requirements (e.g., such as DARP Phase I requirements) are able to be met by the mobile station 110. Generally, the downlink timeslot(s) for which DARP requirements are able to be met correspond to the downlink timeslot(s) for which SAIC has been enabled by the SAIC enabler 425. Because the SAIC enabler 425 can selectively enable or disable SAIC for bursts received in one or more downlink timeslots, the timeslot(s) for which SAIC is enabled in the mobile station 110 may be unknown to the network. As such, the timeslots for which DARP requirements can be met by the mobile station 110 may also be unknown to the network. Thus, the SAIC reporter 430 indicates to the network (e.g., via a packet downlink ack/nack message, a piggy-backed ack/nack field included in an uplink block, etc.) the downlink timeslot(s) for which DARP requirements can be met. In some examples, the network (e.g., such as the network element 105) can use this reported indication to schedule when to transmit data to the mobile station 110.

Figure 7:
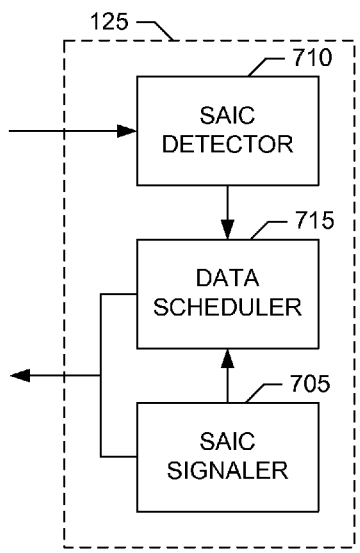
FIG. 7 illustrates an example implementation of the base station of FIG. 1 that includes an example transmit-side single antenna interference cancellation controller.

FIG. 7 illustrates an example implementation of the transmit-side SAIC controller 125 included in the network element 105 of FIG. 1. The transmit-side SAIC controller 125 of FIG. 7 includes an example SAIC signaler 705 to signal to a mobile station, such as the mobile station 110, the downlink timeslot(s) for which DARP requirements (e.g., DARP Phase I requirements) are to be met. In some examples, the receive-side SAIC controller 120 of mobile station 110 uses this signaling information (e.g., received via a packet downlink assignment message) to determine for which bursts/timeslots SAIC is to be enabled.

The transmit-side SAIC controller 125 of FIG. 7 also includes an example SAIC detector 710 to detect the downlink timeslot(s) for which a mobile station, such as the mobile station 110, is able to meet DARP requirements (e.g., such as DARP Phase I requirements). For example, the SAIC detector 710 can detect the downlink timeslot(s) for which the mobile station 110 can meet DARP requirements from a message (e.g., such as a packet downlink ack/nack message, a piggy-backed ack/nack field included in a received data block, etc.) sent by the mobile station 110 and indicating the downlink timeslot(s) for which DARP requirements can be met. Additionally or alternatively, the SAIC detector 710 can use detected link quality interference measurements to determine the downlink timeslot(s) for which DARP requirements are able to be met if, for example, the mobile station 110 provides such measurements only for those timeslot(s) in which the DARP requirements can be met.

The transmit-side SAIC controller 125 of FIG. 7 further includes an example data scheduler 715 to schedule transmission of data to the mobile station 110 and/or choose the modulation and coding scheme of a scheduled data transmission based on the downlink timeslot(s) for which the mobile station 110 is able to meet the DARP requirements, as determined by the SAIC detector 710. For example, the data scheduler 715 can schedule transmission of data that is not robustly coded and/or data that is being repeated due to prior reception failure(s) in the downlink timeslot(s) for which the mobile station 110 signaled that it is able to meet the DARP requirements. The downlink timeslot(s) for which the mobile station 110 is able to meet the DARP requirements generally correspond to timeslot(s) for which SAIC has been enabled (at least for one or more of the bursts of a codeword received in a particular radio block period).

Further examples of SAIC control that can be implemented in the mobile communication system 100 by mobile stations (such as the mobile station 110) including respective receive-side SAIC controllers 120 and/or by network elements (such as the network element 105) including respective transmit-side SAIC controllers 125 are described in greater detail below. Some of these examples illustrate SAIC control that can be implemented in the mobile communication system 100 using only the receive-side SAIC controllers 120 included in the respective mobile stations 110 (i.e., and without any transmit-side SAIC controllers 125). Other examples illustrate SAIC control that can be implemented in the mobile communication system 100 using a combination of the receive-side SAIC controllers 120 included in the respective mobile stations 110 and the transmit-side SAIC controllers 125 included in the respective network elements 105.

While example manners of implementing the receive-side SAIC controller 120 and the transmit-side SAIC controller 125 of FIG. 1 have been illustrated in FIGS. 4 and 7, respectively, one or more of the elements, processes and/or devices illustrated in FIGS. 4 and/or 7 may be combined, divided, re-arranged, omitted, eliminated and/or implemented in any other way. Further, the example SAIC enabler 425, the example SAIC reporter 430, the example SAIC signaler 705, the example SAIC detector 710, the example data scheduler 715 and/or, more generally, the example receive-side SAIC controller 120 and/or the example transmit-side SAIC controller 125 of FIGS. 4 and 7 may be implemented by hardware, software, firmware and/or any combination of hardware, software and/or firmware. Thus, for example, any of the example SAIC enabler 425, the example SAIC reporter 430, the example SAIC signaler 705, the example SAIC detector 710, the example data scheduler 715 and/or, more generally, the example receive-side SAIC controller 120 and/or the example transmit-side SAIC controller 125 could be implemented by one or more circuit(s), programmable processor(s), application specific integrated circuit(s) (ASIC(s)), programmable logic device(s) (PLD(s)) and/or field programmable logic device(s) (FPLD(s)), etc. In at least some example implementations, at least one of the example receive-side SAIC controller 120, the example transmit-side SAIC controller 125, the example SAIC enabler 425, the example SAIC reporter 430, the example SAIC signaler 705, the example SAIC detector 710 and/or the example data scheduler 715 are hereby expressly defined to include a tangible computer readable medium such as a memory, digital versatile disk (DVD), compact disk (CD), etc., storing such software and/or firmware. Further still, the example receive-side SAIC controller 120 and/or the example transmit-side SAIC controller 125 of FIGS. 4 and 7 may include one or more elements, processes and/or devices in addition to, or instead of, those illustrated in FIGS. 4 and 7, and/or may include more than one of any or all of the illustrated elements, processes and devices.

Flowcharts representative of example processes that may be executed to implement the example network element 105, the example mobile station 110, the example receive-side SAIC controller 120, the example transmit-side SAIC controller 125, the example SAIC enabler 425, the example SAIC reporter 430, the example SAIC signaler 705, the example SAIC detector 710 and/or the example data scheduler 715 of FIGS. 1, 4 and 7 are shown in FIGS. 8-15, 18 and 21-28. In these examples, the process represented by each flowchart may be implemented by one or more programs comprising machine readable instructions for execution by a processor, such as the processor 2912 shown in the example processing system 2900 discussed below in connection with FIG. 29. Alternatively, the entire program or programs and/or portions thereof implementing one or more of the processes represented by the flowcharts of FIGS. 8-15, 18 and 21-28 could be executed by a device other than the processor 2912 (e.g., such as a controller and/or any other suitable device) and/or embodied in firmware or dedicated hardware (e.g., implemented by an ASIC, a PLD, an FPLD, discrete logic, etc.). Also, one or more of the processes represented by the flowchart of FIGS. 8-15, 18 and 21-28, or one or more portion(s) thereof, may be implemented manually. Further, although the example processes are described with reference to the flowcharts illustrated in FIGS. 8-15, 18 and 21-28, many other techniques for implementing the example methods and apparatus described herein may alternatively be used. For example, with reference to the flowcharts illustrated in FIGS. 8-15, 18 and 21-28, the order of execution of the blocks may be changed, and/or some of the blocks described may be changed, eliminated, combined and/or subdivided into multiple blocks.

As mentioned above, the example processes of FIGS. 8-15, 18 and 21-28 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 8-15, 18 and 21-28 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 8:
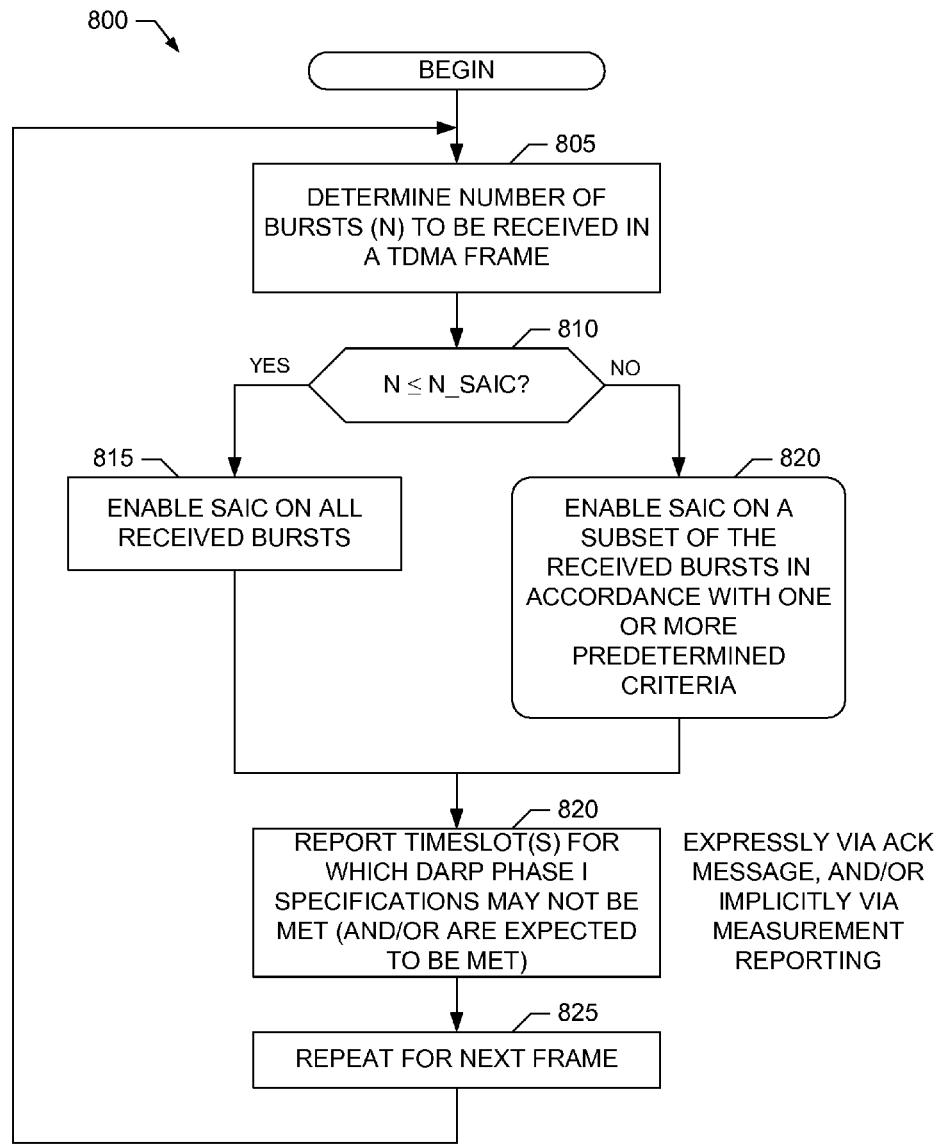
FIG. 8 is a flowchart representative of an example process that may be performed to implement the example receive-side single antenna interference cancellation controller of FIG. 4.

An example process 800 that may be executed to implement the receive-side SAIC controller 120 of FIGS. 1 and 4 is illustrated in FIG. 8. With reference to the preceding figures, the example process 800 of FIG. 8 begins execution at block 805 at which the SAIC enabler 425 of the receive-side SAIC controller 120 determines the number of bursts (N) to be received by the mobile station 110 in a given TDMA frame (e.g., the current TDMA frame to be received). The bursts to be received can include, for example, bursts corresponding to downlink data, control messages and/or uplink state flags to be received and processed by the mobile station 110.

At block 810, the SAIC enabler 425 determines whether the number of bursts (N) to be received by the mobile station 110 in the TDMA frame is less than or equal to a threshold number (e.g., a maximum number) of bursts for which SAIC can be performed by the SAIC processor 420 in the TDMA frame (referred to herein as N_SAIC, and also referred to as the SAIC processing capacity of the mobile station 110). If N is less than or equal to N_SAIC and, thus, the SAIC processing capacity has not been exceeded, at block the SAIC enabler 425 enables SAIC for all bursts to be received. If, however, N is not less than or equal to N_SAIC (or, equivalently, N is greater than N_SAIC) and, thus, SAIC processing capacity has been exceeded, at block 820 the SAIC enabler 425 causes the SAIC processor 420 to perform (e.g., enable) SAIC for a subset of the bursts to be received in the TDMA frame in accordance with one or more predetermined criteria. For example, at block 820 the SAIC enabler 425 can perform per-burst SAIC control such that SAIC is enabled for one or more bursts of a codeword, but disabled for one or more other bursts of the codeword. In another example, at block 820 the SAIC enabler 425 can perform per-codeword SAIC control such that SAIC is either enabled or disabled for all bursts in a codeword. In yet a further example, at block 820 the SAIC enabler 425 can perform a combination of per-burst SAIC control for bursts of one or more codewords, and per-codeword SAIC control for bursts of one or more other codewords being received in the TDMA frame.

At block 820, the SAIC reporter 430 of the receive-side SAIC controller 120 reports the downlink timeslot(s) for which DARP requirements (e.g., such as DARP Phase I requirements) are able to be met by the mobile station 110 (or, alternatively, are not able to be met). As noted above, the downlink timeslot(s) for which DARP requirements are able to be met generally correspond to the downlink timeslot(s) for which SAIC has been enabled by the SAIC enabler 425 (e.g., for at least one or more bursts of a radio block period). In some examples, at block 820 the SAIC reporter 430 reports the downlink timeslot(s) for which DARP requirements are able to be met via one or more messages signaled to the network, such as one or more packet downlink ack/nack messages, one or more piggy-backed ack/nack fields included in received data blocks, etc. Additionally or alternatively, at block 820 the SAIC reporter 430 can use link quality measurement reporting to indirectly report the downlink timeslot(s) for which DARP requirements are able to be met. For example, the SAIC reporter 430 can report link quality interference measurements for only the subset of one or more downlink timeslots for which the DARP requirements are able to be met, and not report link quality interference measurements for any other downlink timeslot for which the DARP requirements are not able to be met. Alternatively, the SAIC reporter 430 can report link quality interference measurements for only the subset of one or more downlink timeslots for which the DARP requirements are not able to be met, and not report link quality interference measurements for any other downlink timeslot for which the DARP requirements are able to be met.

At block 825, the receive-side SAIC controller 120 then repeats the process 800 for the next TDMA frame.

Figure 9:
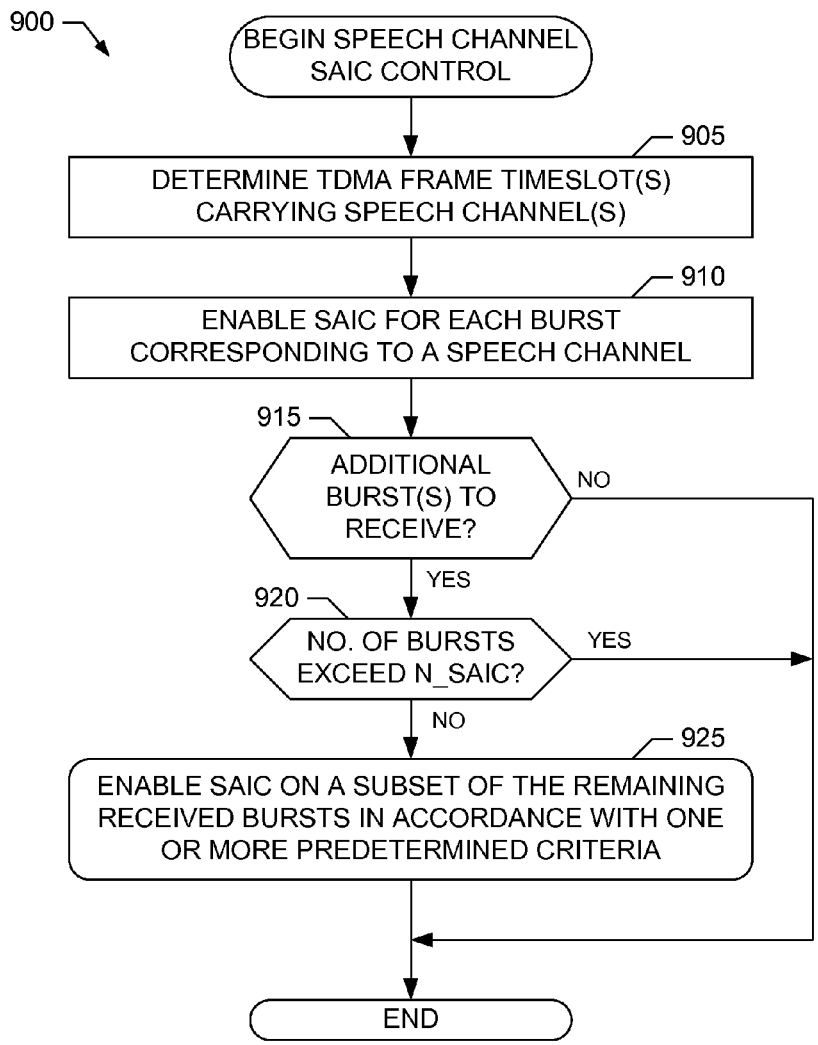
FIG. 9 is a flowchart representative of an example process that may be performed to implement speech channel control in the example receive-side single antenna interference cancellation controller of FIG. 4.

An example process 900 that may be executed to implement speech channel SAIC control in the receive-side SAIC controller 120 of FIGS. 1 and 4, and/or to perform the processing at block 820 in FIG. 8, is illustrated in FIG. 9. During DTM operation, the mobile station 110 can receive a speech channel on one timeslot and PS data on one or more other timeslots depending on the DTM multislot class of the mobile station 110. In systems that support GERAN, such as the mobile communication system 100, voice traffic is typically exchanged using GMSK modulation. Also, because data and voice services are typically carried on different frequency resources (e.g., different RF channels) in the GERAN systems, it is likely that the interference experienced by a speech channel is due to other speech channels from neighboring cells. As such, the interference exhibited by a speech channel is also likely to be a GMSK modulated signal, which is the type of interference SAIC is generally well-suited to reducing/mitigating. Also, the VAMOS feature for multiplexing speech channels on the same resource may rely on SAIC, especially for downlink communications. Thus, in some examples, the receive-side SAIC controller 120 employs the example process 900 (or a similar process) to prioritize enabling SAIC for timeslots carrying speech traffic (e.g., in the case of DTM operation, VAMOS operation, etc.).

With the foregoing in mind, and with reference to the preceding figures, the example process 900 of FIG. 9 begins execution at block 905 at which the SAIC enabler 425 of the receive-side SAIC controller 120 identifies each downlink timeslot in a given TDMA frame (e.g., the current TDMA frame to be received) carrying speech traffic to be received by the mobile station 110. Although there is typically at most one timeslot that will carry speech traffic, the example process 900 also supports scenarios in which the mobile station 110 can receive multiple speech channels on multiple timeslots. At block 910, the SAIC enabler 425 enables SAIC for each timeslot identified at block 905 as corresponding to a speech channel.

At block 915, the SAIC enabler 425 determines whether there are additional downlink bursts to be received by the mobile station 110 on other assigned/allocated timeslots. If there are additional bursts to be received, then at block 920 the SAIC enabler 425 determines whether the total number of bursts to be received exceeds N_SAIC and, thus, exceeds the SAIC processing capacity of the mobile station 110. If the number of bursts to be received exceeds N_SAIC (block 920) or there are no additional bursts to be received (block 915), the example process 900 ends and, thus, the SAIC enabler 425 disables SAIC for the other non-speech timeslots in the TDMA frame. However, if the number of bursts to be received does not exceed N_SAIC (block 920) and, thus, SAIC processing capacity has not been exceeded, at block 925 the SAIC enabler 425 causes the SAIC processor 420 to perform (e.g., enable) SAIC for a subset of the remaining bursts to be received in the TDMA frame in accordance with one or more predetermined criteria. For example, any of the SAIC control techniques implemented at block 820 of FIG. 8 could also be implemented at block 925 of FIG. 9. Execution of the example process 900 then ends.

Figure 10:
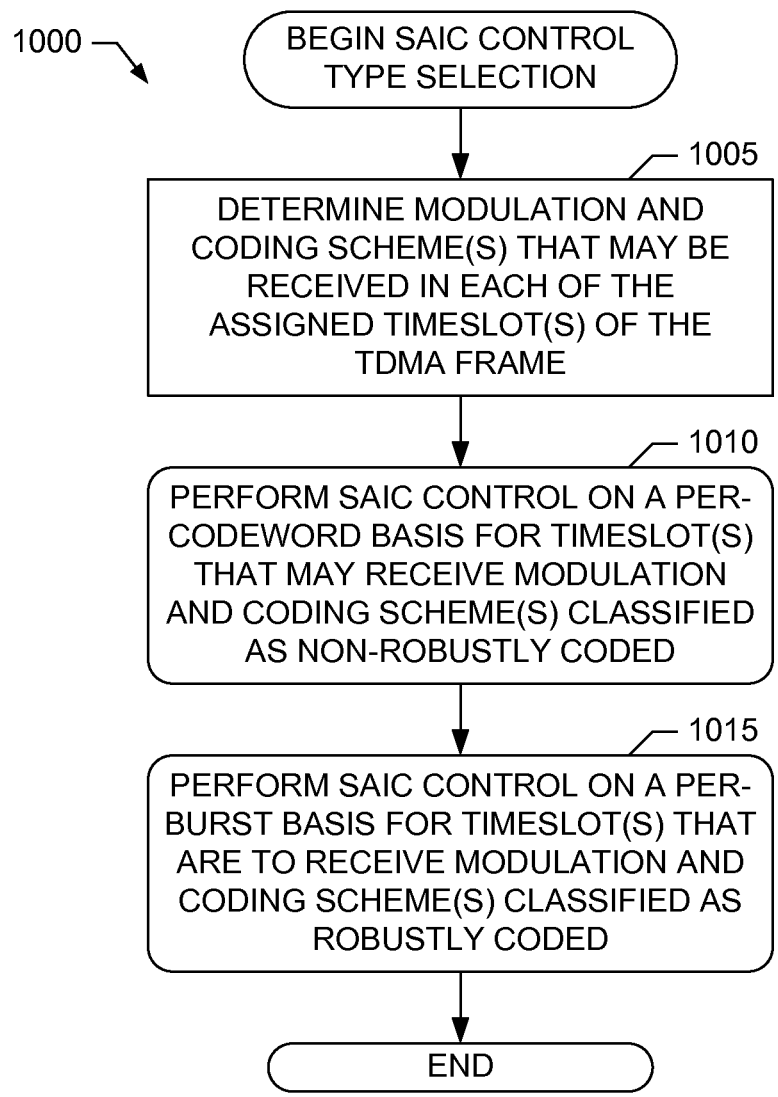
FIG. 10 is a flowchart representative of an example process that may be performed to implement control type selection in the example receive-side single antenna interference cancellation controller of FIG. 4.

An example process 1000 that may be executed to implement SAIC control type selection in the receive-side SAIC controller 120 of FIGS. 1 and 4, and/or to perform the processing at block 820 in FIG. 8, is illustrated in FIG. 10. The receive-side SAIC controller 120 can execute the process 1000 to determine whether to perform per-burst SAIC control or per-codeword SAIC control on a particular timeslot or subset of timeslots in a TDMA frame. When the modulation and coding scheme (MCS) used to transmit a codeword exhibits robust coding (e.g., such as by having a low code rate associated with strong error correction capabilities), then it may be beneficial to perform per-burst SAIC control and enable SAIC for at least a subset of the bursts within the codeword (and disable SAIC for the remainder of the bursts without SAIC) rather than perform per-codeword SAIC control in which SAIC is enabled for one or more codewords, but completely disabled for other codeword(s). For example, for per-burst SAIC control for robustly coded MCSs, the received bursts on which SAIC is enabled will generally result in good decoded bits (e.g., bits with few errors) while the bursts on which SAIC is disabled may result in poor decoded bits (e.g., bits with more errors). However, when de-interleaved and passed on to the channel decoder 415, the interleaved pattern of good bits and poor bits input to the channel decoder 415 can often be decoded without error (or with few errors) when the MCS used for the codeword was robust (e.g., is associated with low code rate having sufficient redundancy to mitigate the errors in the burst for which SAIC was disabled).

Conversely, if the MCS used to transmit the codeword does not exhibit robust coding (e.g., such as by having a high code rate (e.g., close to one) associated with reduced error correction capabilities), then it may be beneficial to perform per-codeword SAIC control and either enable or disable SAIC all the bursts within the codeword. This is because there is no (or little) redundancy in the codeword transmitted using the non-robust MCS and, as such, bursts for which SAIC is disabled would likely result in bit errors within the codeword that the channel decoder 415 would be unable to mitigate.

With the foregoing in mind, and with reference to the preceding figures, the example process 1000 of FIG. 10 begins execution at block 1005 at which the SAIC enabler 425 of the receive-side SAIC controller 120 determines the MCS (or set of MCSs) that may be received in each assigned timeslot of a given TDMA frame (e.g., the current TDMA frame to be received). At block 1010, the SAIC enabler 425 performs per-codeword SAIC control for each timeslot that is to receive MCS(s) classified as non-robustly coded (e.g., having a coding rate greater than a rate threshold). Examples of per-codeword SAIC control techniques that can be performed by the SAIC enabler 425 are described in greater detail below. At block 1015, the SAIC enabler 425 performs per-burst SAIC control for each timeslot that is to receive MCS(s) classified as robustly coded (e.g., having a coding rate less than a rate threshold). Examples of per-burst SAIC control techniques that can be performed by the SAIC enabler 425 are described in greater detail below.

Figure 11:
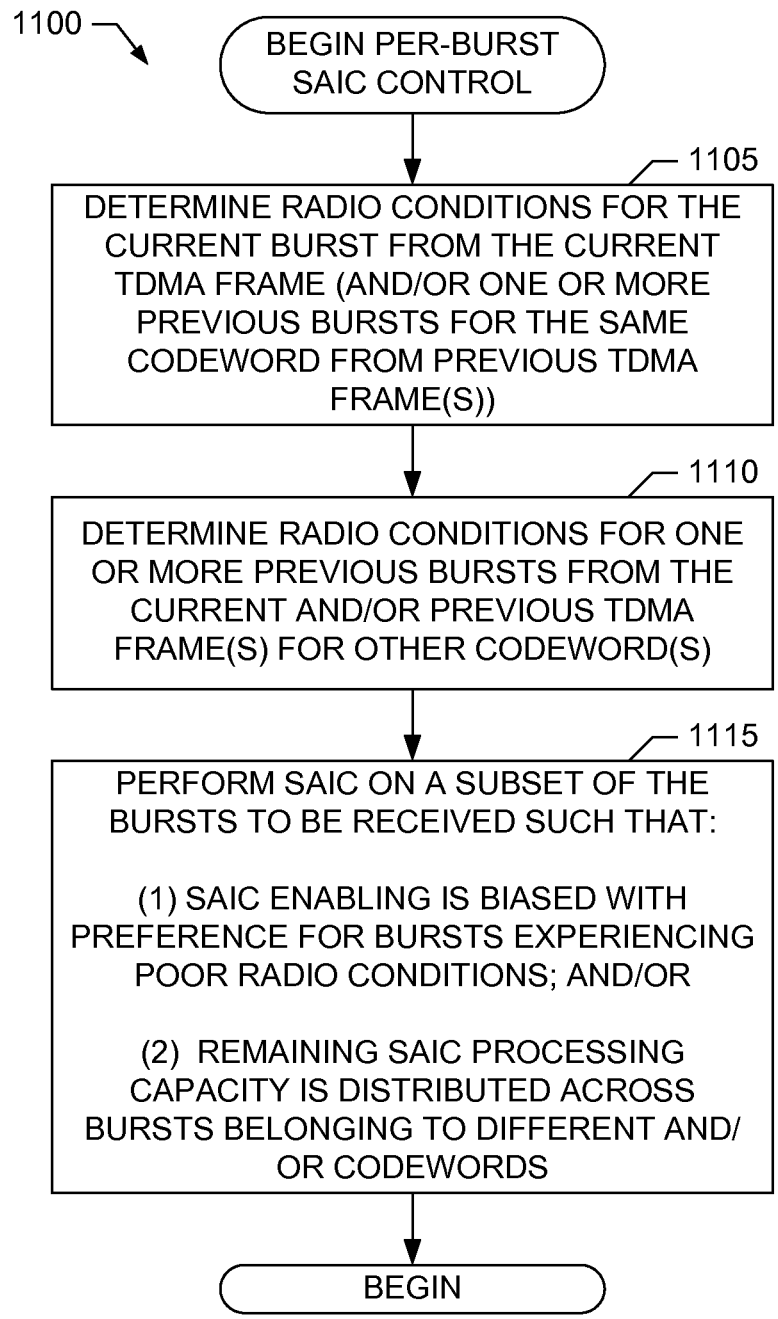
FIG. 11 is a flowchart representative of an example process that may be performed to implement per-burst control based on determined radio conditions in the example receive-side single antenna interference cancellation controller of FIG. 4.
Figure 12:
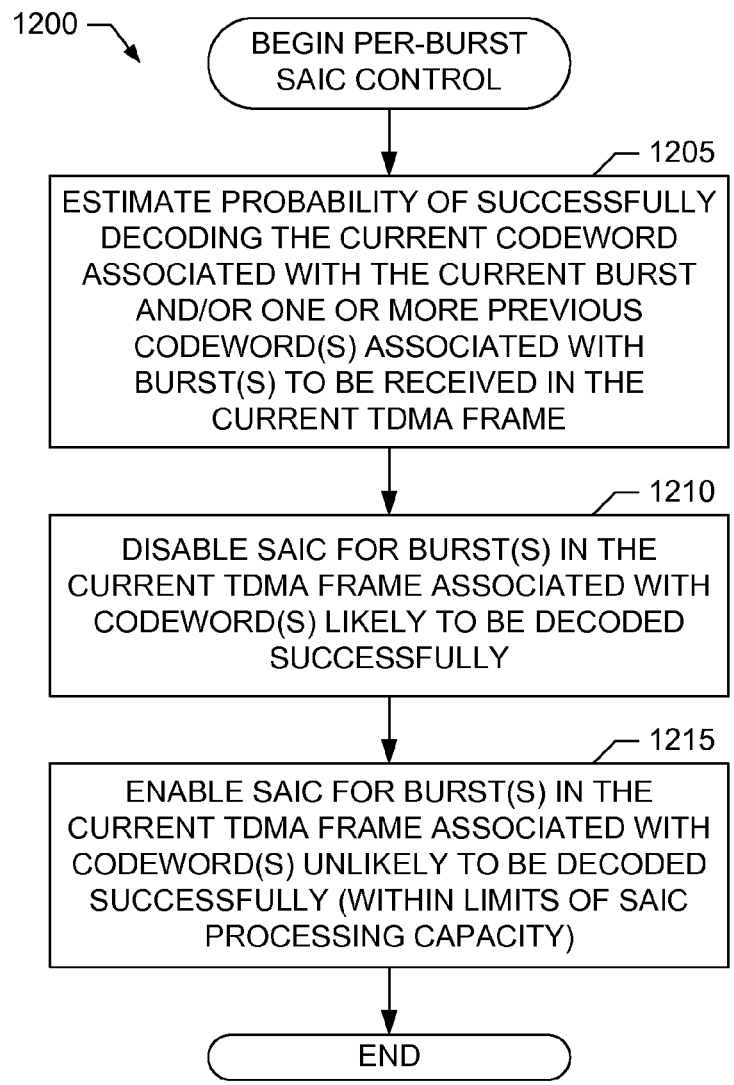
FIG. 12 is a flowchart representative of an example process that may be performed to implement per-burst control based on decode probability estimation in the example receive-side single antenna interference cancellation controller of FIG. 4.
Figure 13:
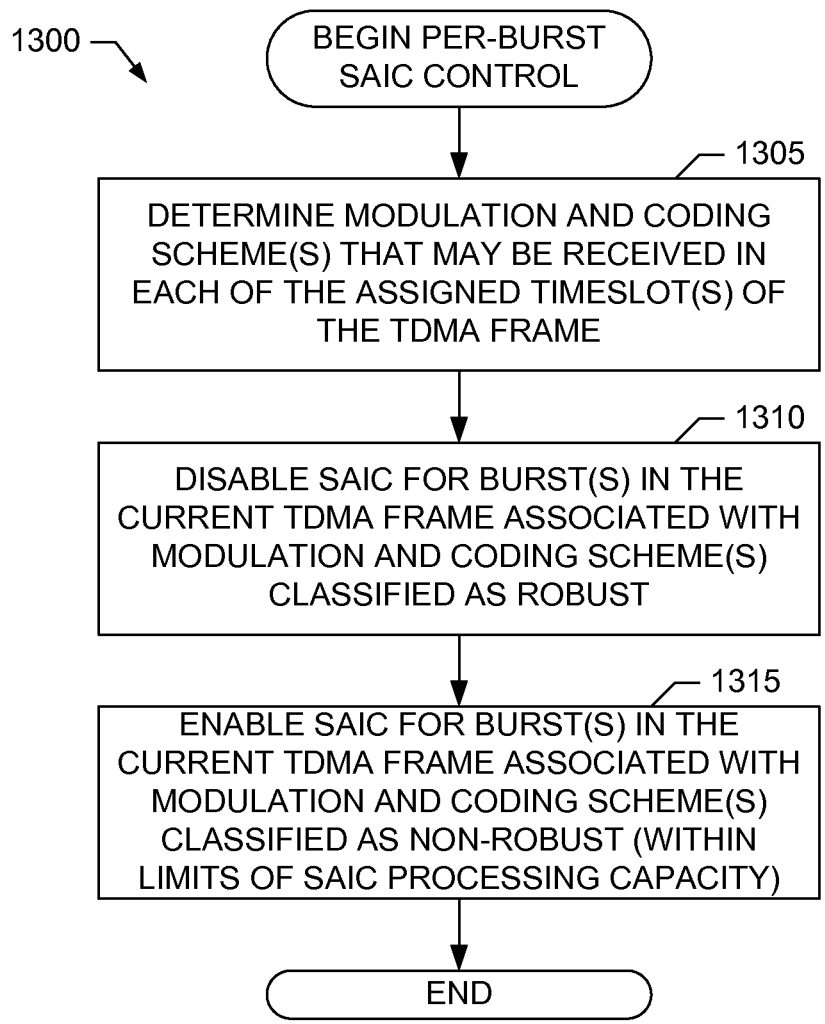
FIG. 13 is a flowchart representative of an example process that may be performed to implement per-burst control based on modulation and coding schemes in the example receive-side single antenna interference cancellation controller of FIG. 4.

Example processes 1100, 1200 and 1300 that may be executed to implement per-burst SAIC control in the receive-side SAIC controller 120 of FIGS. 1 and 4, and/or to perform the processing at block 820 in FIG. 8 and/or at block 1015 of FIG. 10, are illustrated in FIGS. 11, 12 and 13, respectively. In some examples, the receive-side SAIC controller 120 can determine whether to enable or disable SAIC for a particular burst of a particular codeword based on one or more (e.g., in any combination) of the following criteria: (1) detected radio conditions applicable to the current burst and/or previously-received bursts of the same and/or different codewords received on the same and/or different timeslots within the TDMA frame (e.g., which could include bursts of a set of codewords received over time but on the same timeslot), (2) estimated probability of decoding success/failure for the codeword(s) associated with current burst and/or previously-received bursts of the same and/or different codewords received on the same and/or different timeslots within the TDMA frame (e.g., which could include bursts of a set of codewords received over time but on the same timeslot), and/or (3) the MCS/code rate applicable to the current burst and/or previously-received burst(s) of the same and/or different codewords received on the same and/or different timeslots within the TDMA frame (e.g., which could include bursts of a set of codewords received over time but on the same timeslot).

As noted above, although the DARP requirements are based on block error rate, SAIC is performed by the SAIC processor 420 at the burst-level. In some examples (e.g., which may depend on radio conditions, SAIC implementation details, etc.) it may be possible to meet the DARP requirements (e.g., such as the DARP Phase I requirements specified in 3 GPP 45.005) without applying SAIC to every received burst of a particular codeword. Using per-burst SAIC control, the receive-side SAIC controller 120 of the mobile station 110 can enable SAIC processing for only a subset of received bursts, thereby permitting SAIC processing to be distributed to bursts which belong to different codewords. In some examples, the subset of bursts for which SAIC is to be enabled is selected to permit the mobile station 110 to meet the required DARP performance requirements even though SAIC is not enabled for one or more of the other received bursts of a codeword. As such, per-burst SAIC control can allow the mobile station 110 to meet the DARP block error rate performance requirements for frames/blocks received in a number (N) of timeslots in a TDMA frame that is greater than the threshold number (N_SAIC) of timeslots within the TDMA frame for which the mobile station 110 can support SAIC processing.

Turning to FIG. 11, the example process 1100 illustrated therein may be executed to implement per-burst SAIC control based on determined radio conditions. With reference to the preceding figures, the example process 1100 of FIG. 11 begins execution at block 1105 at which the SAIC enabler 425 of the receive-side SAIC controller 120 determines the radio conditions (e.g., by determining and/or obtaining one or more radio link quality measurements, and/or measuring the strength of an interfering signal, and/or estimating the modulation of the interfering signal, etc.) for the current burst being received by the mobile station 110, and/or one or more previous bursts for the same codeword received in previous TDMA frame(s) and/or for different codeword(s) received earlier on the same timeslot. At block 1110, the SAIC enabler 425 determines the radio conditions (e.g., by determining and/or obtaining one or more radio link quality measurements, and/or measuring the strength of an interfering signal, and/or estimating the modulation of the interfering signal, etc.) for one or more previous bursts received for one or more codewords other than the codeword associated with the current burst. At block 1115, the SAIC enabler 425 enables SAIC for a subset of bursts to be received in the current TDMA frames such that SAIC processing is prioritized for bursts/timeslots experiencing poor radio conditions and/or that are most likely to gain from SAIC (such as timeslots experiencing a strong GMSK interferer) as determined at blocks 1105 and/or 1110. If SAIC capacity is not exceeded after enabling SAIC for these prioritized bursts, then at block 1115 the SAIC enabler 425 enables SAIC for other bursts/timeslots based on one or more predetermined criteria, such as enabling SAIC to be distributed across bursts belonging to different codewords (e.g., in the case of codewords that are robustly encoded with a low code rate), and/or enabled for bursts belonging to the same codeword (e.g., in the case of the codeword being encoded with a high code rate and, thus, not robustly encoded).

Turning to FIG. 12, the example process 1200 illustrated therein may be executed to implement per-burst SAIC control based on decode probability estimation. With reference to the preceding figures, the example process 1200 of FIG. 12 begins execution at block 1205 at which the SAIC enabler 425 of the receive-side SAIC controller 120 estimates (using any appropriate technique) the probability of successfully decoding the codeword associated with the current burst being received by the mobile station 110. Additionally or alternatively, at block 1205 the SAIC enabler 425 estimates (using any appropriate technique) the probability of successfully decoding one or more other codewords associated with other burst(s) to be received in the current TDMA frame. At block 1210, the SAIC enabler 425 disables SAIC processing for bursts/timeslots of the current TDMA frame associated with codeword(s) likely to be decoded successfully (e.g., corresponding to codeword(s) having an estimated probability of successful decoding that exceeds a probability threshold). At block 1215, the SAIC enabler 425 enables SAIC processing for bursts/timeslots of the current TDMA frame associated with codeword(s) unlikely to be decoded successfully unless SAIC is performed (e.g., corresponding to codeword(s) having an estimated probability of successful decoding that is less than the probability threshold).

Turning to FIG. 13, the example process 1300 illustrated therein may be executed to implement per-burst SAIC control based on modulation and coding schemes. With reference to the preceding figures, the example process 1300 of FIG. 13 begins execution at block 1305 at which the SAIC enabler 425 of the receive-side SAIC controller 120 determines the MCS (or set of MCSs) that may be received by the mobile station 110 in each assigned timeslot of a given TDMA frame (e.g., the current TDMA frame to be received). At block 1310, the SAIC enabler 425 disables SAIC for one or more bursts/timeslots associated with MCS(s) classified as robustly coded (e.g., having a coding rate less than a rate threshold). At block 1315, the SAIC enabler 425 enables SAIC for one or more bursts/timeslots associated with MCS(s) classified as not robustly coded (e.g., having a coding rate greater than the rate threshold).

Figure 14:
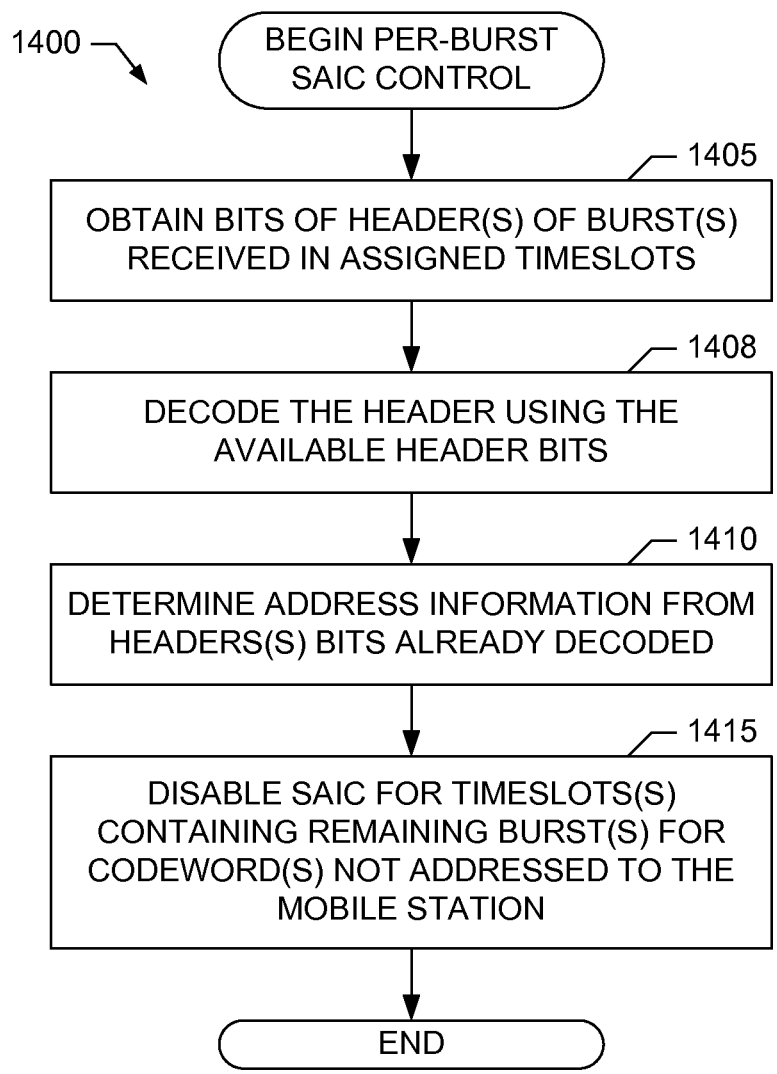
FIG. 14 is a flowchart representative of an example process that may be performed to implement per-burst control based on address information in the example receive-side single antenna interference cancellation controller of FIG. 4.

An example process 1400 that may be executed to implement per-burst SAIC control based on address information in the receive-side SAIC controller 120 of FIGS. 1 and 4, and/or to perform the processing at block 820 in FIG. 8 and/or at block 1015 of FIG. 10, is illustrated in FIG. 14. In some examples, such as when bursts being received by the mobile station 110 correspond to enhanced general packet radio service (EGPRS) bursts, the receive-side SAIC controller 120 can use address information to determine or estimate (the latter if, for example, all address bits have been yet been received) which burst(s) received in which timeslot(s) are addressed to the mobile station 110 (and which are not), and enable SAIC processing accordingly. For example, in EGPRS (in which the header and data payload of codewords are encoded separately), the mobile station 110 may be able to decode the header within the first one or two bursts of a codeword (e.g., because the header is usually robustly encoded) and deduce from the header whether or not the codeword is addressed to the mobile station 110 by reading the address information embedded in the decoded header. The receive-side SAIC controller 120 can then enable SAIC for the remaining bursts of the codeword if the codeword is addressed to the mobile station 110, or disable SAIC for the remaining bursts of the codeword if the codeword is not addressed to the mobile station 110.

With the foregoing in mind, and with reference to the preceding figures, the example process 1400 of FIG. 14 begins execution at block 1405 at which the SAIC enabler 425 of the receive-side SAIC controller 120 obtains bits of the header(s) of codeword(s) for burst(s) that have been received in the timeslot(s) assigned to the mobile station 110. At block 1408, the receive-side SAIC controller 120 decodes the header(s) using the obtained header bits. At block 1410, the SAIC enabler 425 obtains address information (e.g., such as the temporary flow identity (TFI)) from the decoded header associated with each codeword. At block 1415, the SAIC enabler 425 disables SAIC for the timeslot(s) in current and/or subsequent TDMA frame(s) that are to contain the remaining burst(s) for codeword(s) that are not addressed to the mobile station 110.

Figure 15:
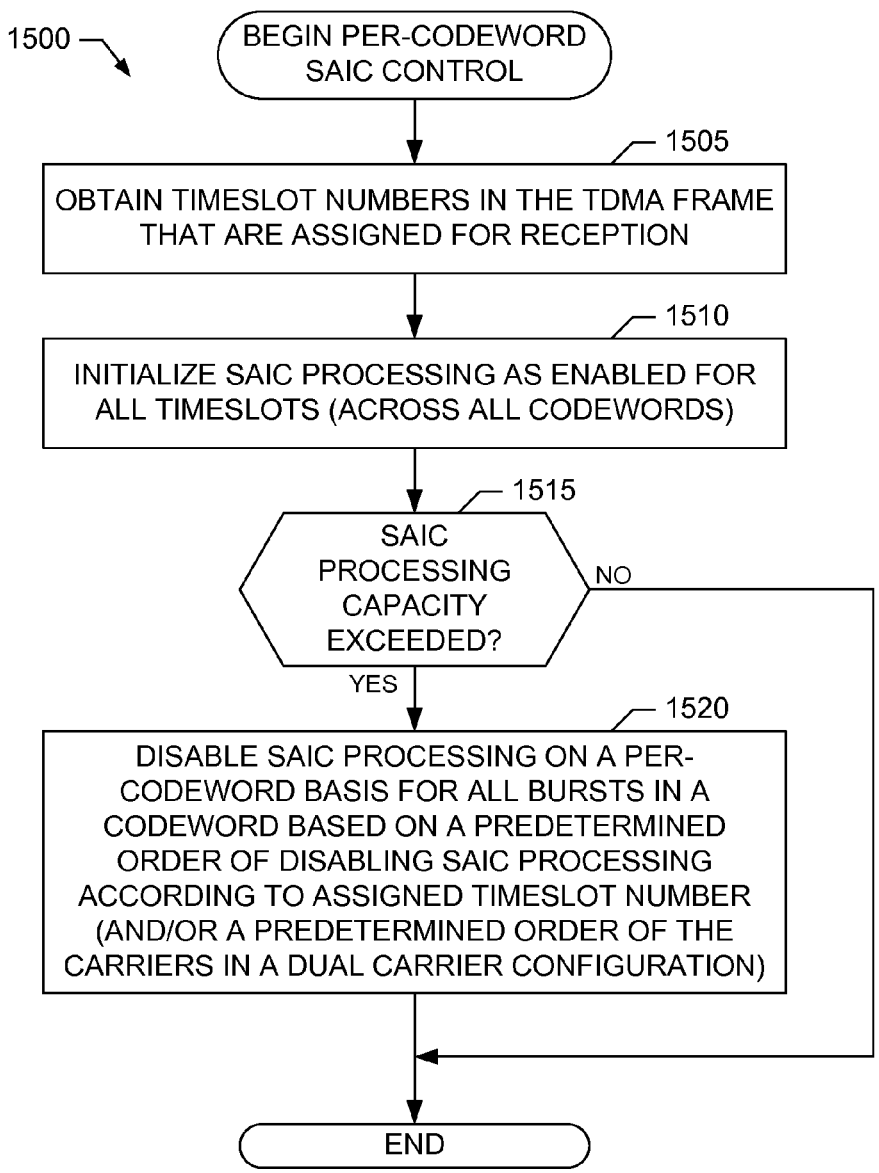
FIG. 15 is a flowchart representative of an example process that may be performed to implement per-codeword control based on predetermined timeslot ordering in the example receive-side single antenna interference cancellation controller of FIG. 4.

An example process 1500 that may be executed to implement per-codeword SAIC control based on predetermined timeslot ordering in the receive-side SAIC controller 120 of FIGS. 1 and 4, and/or to perform the processing at block 820 in FIG. 8 and/or at block 1010 of FIG. 10, is illustrated in FIG. 15. In contrast with the per-burst SAIC control examples described above, the receive-side SAIC controller 120 can additionally or alternatively control SAIC on a block-by-block (codeword-by-codeword) basis. This type of control is referred to as per-codeword SAIC control or per-timeslot SAIC control, because the selection of the codewords/radio blocks for which SAIC is to be enabled is based on the timeslot number, with the same SAIC control being applied to timeslots having the same timeslot number in consecutive TDMA frames within a radio block period.

In some examples, if there is insufficient SAIC processing capacity to enable SAIC for all codewords to be received by the mobile station 110 in its assigned/allocated timeslots, the receive-side SAIC controller 120 disables SAIC for one or more timeslots based on a standardized, predetermined ordering of the timeslots. For example, if the mobile station 110 is assigned resources (e.g., timeslots) on a single RF channel (e.g., the RF channel 130), the receive-side SAIC controller 120 can disable SAIC beginning with the assigned timeslot having the highest timeslot number, and continue disabling SAIC for other timeslot(s) in decreasing order of timeslot number until SAIC processing capacity is not exceeded. As another example, if the resources (e.g., timeslots) assigned to the mobile station 110 span two carriers (e.g., the RF channels 130 and 135), the receive-side SAIC controller 120 can disable SAIC using a predetermined ordering of the timeslots by timeslot number and by carrier. For example, the receive-side SAIC controller 120 could disable SAIC based on carrier such that SAIC is disabled for all bursts/timeslots of one of the carriers (e.g., a lower priority carrier), whereas SAIC is enabled for all bursts/timeslots of the other of the carriers (e.g., a higher priority carrier). As another example, the receive-side SAIC controller 120 could disable SAIC based on carrier and timeslot number, such as, but not limited, using one of the example orderings described below. Generally, any type of predetermined/standardized ordering can be used by the receive-side SAIC controller 120.

With the foregoing in mind, and with reference to the preceding figures, the example process 1500 of FIG. 15 begins execution at block 1505 at which the SAIC enabler 425 of the receive-side SAIC controller 120 obtains the timeslot numbers of the downlink TDMA timeslots assigned to the mobile station 110 for downlink reception. At block 1510, the SAIC enabler 425 initializes the SAIC processor to perform SAIC for all timeslots. If at block 1515 the SAIC enabler 425 determines that SAIC processing capacity has been exceeded (e.g., because the number of timeslots, N, for which SAIC is enabled exceeds N_SAIC), then at block 1520 the SAIC enabler 425 disables SAIC on a per-codeword basis according to a predetermined ordering of timeslots based on timeslot number (and/or carrier in the case of dual carrier operation).

Figure 16:
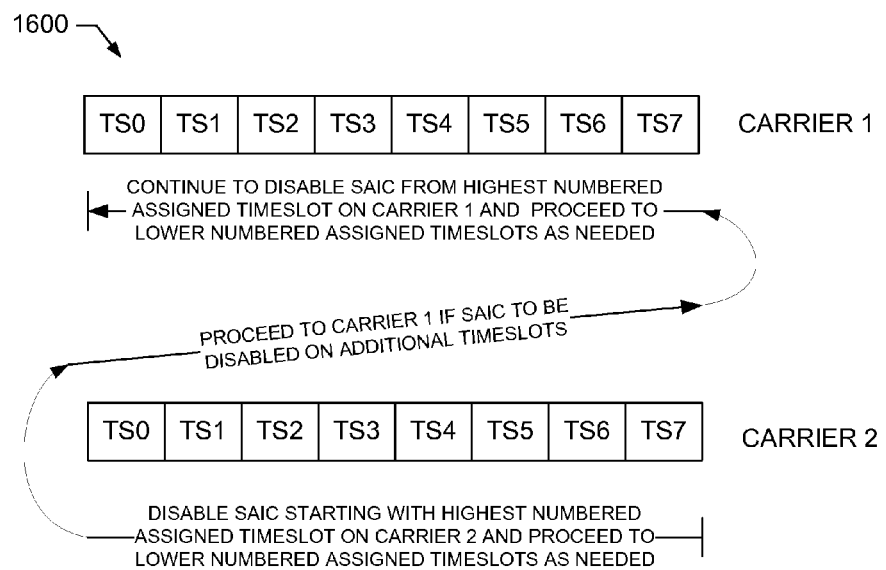
FIG. 16 is a block diagram illustrating a first example predetermined timeslot ordering that may be implemented by the example process of FIG. 15.

FIG. 16 illustrates a first predetermined timeslot ordering 1600 for dual carrier operation, which is an example of the predetermined ordering that may be used by the receive-side SAIC controller 120 to implement the processing at block 1520 of FIG. 15. In the example ordering 1600 illustrated in FIG. 16, SAIC is disabled (as needed to meet SAIC processing capacity) starting from the assigned timeslot of carrier 2 (e.g., such as RF channel 135) having the highest timeslot number and proceeding towards lower-numbered assigned timeslots of carrier 2. If SAIC is disabled on all assigned timeslots of carrier 2 and SAIC processing capacity is still exceeded, SAIC is then disabled starting from the assigned timeslot of carrier 1 (e.g., such as RF channel 130) having the highest timeslot number and proceeds towards lower-numbered assigned timeslots of carrier 1. In this example, the receive-side SAIC controller 120 disables SAIC using the predetermined order 1600 of FIG. 16 until a subset of the assigned timeslots for which the mobile station 110 can support SAIC is achieved.

Figure 17:
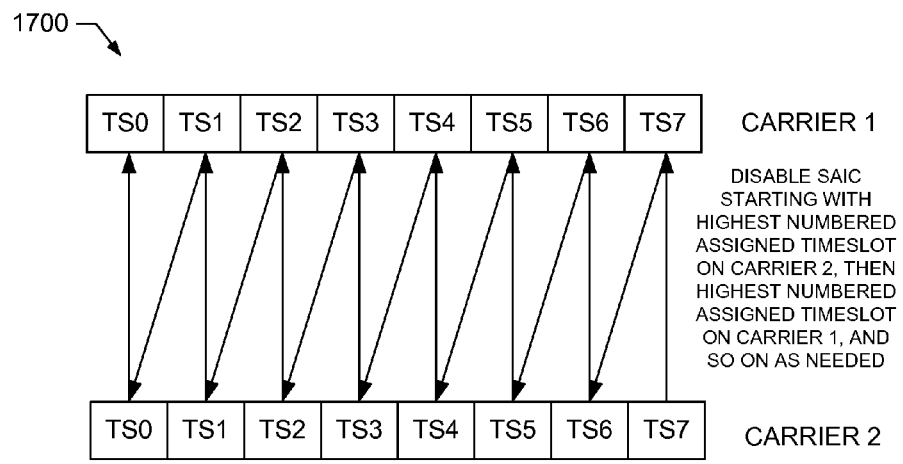
FIG. 17 is a block diagram illustrating a second example predetermined timeslot ordering that may be implemented by the example process of FIG. 15.

FIG. 17 illustrates a second predetermined timeslot ordering 1700 for dual carrier operation, which is another example of the predetermined ordering that may be used by the receive-side SAIC controller 120 to implement the processing at block 1520 of FIG. 15. In the example ordering 1700 illustrated in FIG. 17, the order in which SAIC is disabled (as needed to meet SAIC processing capacity) alternates among the two carriers. The example ordering 1700 may be advantageous in implementation where received timeslots are processed and equalized sequentially upon receipt (e.g., such as when the mobile station 110 first processes the burst received in timeslot 0 on carrier 1, followed by the burst in timeslot 0 on carrier 2, and then bursts in timeslot 1 on both carriers, and so on). In the example ordering 1700, SAIC is disabled (as needed to meet SAIC processing capacity) starting from the assigned timeslot of carrier 2 (e.g., such as RF channel 135) having the highest timeslot number and proceeds to the assigned timeslot of carrier 1 (e.g., such as RF channel 130) having the highest timeslot number. The receive-side SAIC controller 120 continues disabling SAIC, as needed, in the assigned timeslots having the next highest timeslot number, alternating between the carriers as shown.

Figure 18:
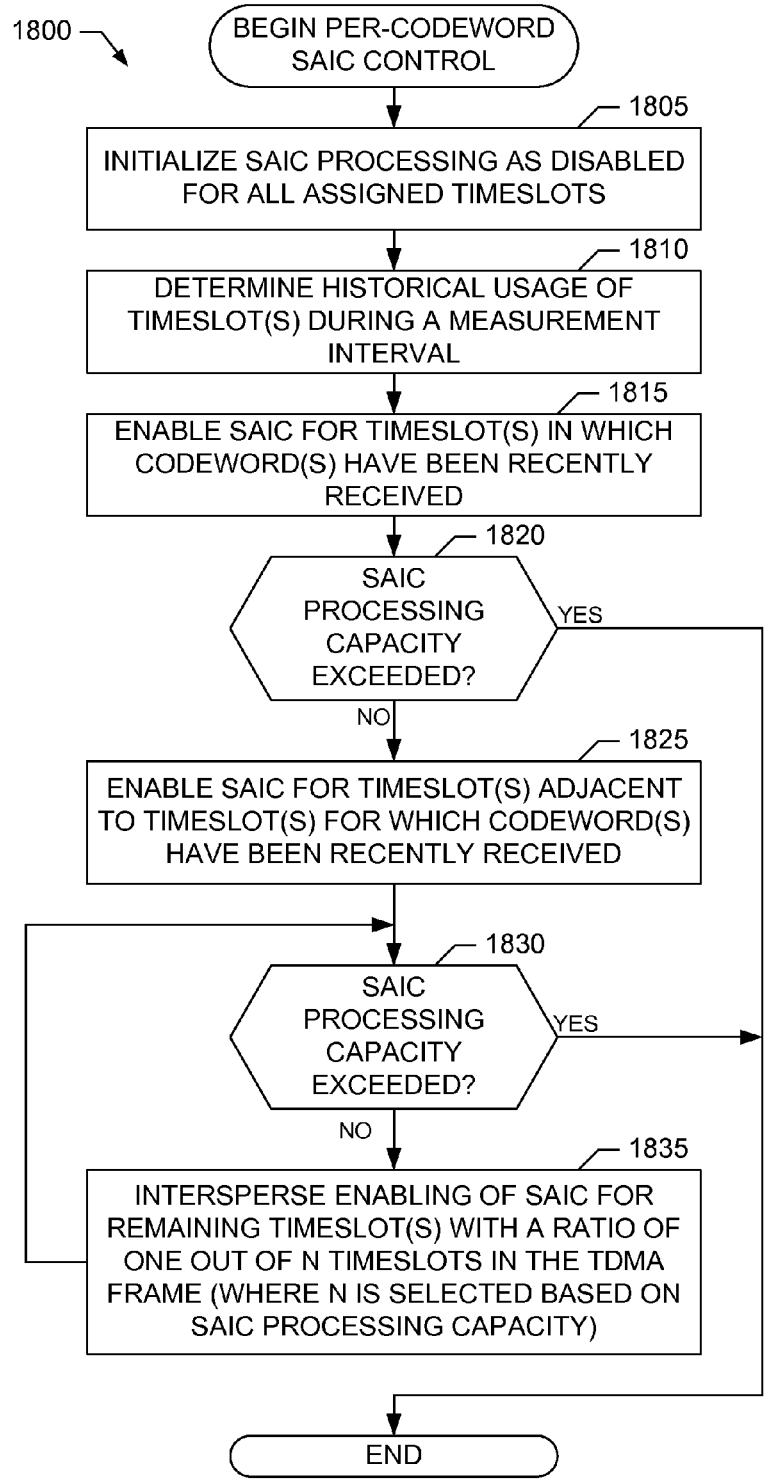
FIG. 18 is a flowchart representative of an example process that may be performed to implement per-codeword control based on historical timeslot usage in the example receive-side single antenna interference cancellation controller of FIG. 4.

An example process 1800 that may be executed to implement per-codeword SAIC control based on historical timeslot usage in the receive-side SAIC controller 120 of FIGS. 1 and 4, and/or to perform the processing at block 820 in FIG. 8 and/or at block 1010 of FIG. 10, is illustrated in FIG. 18. In GERAN systems, such as the mobile communication system 100, the network (e.g., the network element 105) often uses the same set of timeslot(s) and carrier(s) over time for transmitting to a given mobile station, such as the mobile station 110. For example, in the system 100, the network element 105 may consistently use a first carrier instead of second carrier, reserving the second carrier for use as needed, such as when another mobile station is to receive a large amount of data that would exhaust or utilize most of the capacity of the first carrier. Based on this behavior, the receive-side SAIC controller 120 can use the example process 1800 to prioritize (or assign higher weight to) enabling SAIC for timeslots/carriers that the network element 105 has recently used to send data to the mobile station 110.

Additionally or alternatively, because a GERAN network is likely to use contiguous timeslots to transmit to a mobile station, such as the mobile station 110, the receive-side SAIC controller 120 can use the process 1800 to select timeslots for which SAIC is to be enabled or disabled to reduce the number of contiguous timeslots for which SAIC is disabled. For example, using the process 1800, the receive-side SAIC controller 120 can initially prioritize enabling SAIC for timeslots that have been recently used for data transmission to the mobile station 110, and then intersperse enabling SAIC for the remaining timeslots using a "one-in-N" approach such that SAIC is enabled in every one out of N slots, with N being reduced provided SAIC processing capacity is met.

With the foregoing in mind, and with reference to the preceding figures, the example process 1800 of FIG. 18 begins execution at block 1805 at which the SAIC enabler 425 of the receive-side SAIC controller 120 initializes the SAIC processor 420 to disable SAIC for all timeslots assigned to the mobile station 110. At block 1810, the SAIC enabler 425 uses any appropriate technique to determine the timeslot(s) historically used by the mobile communication system 100 to send data to the mobile station 110 (e.g., during some measurement interval). At block 1815, the SAIC enabler 425 enables SAIC for the timeslot(s) in which codeword(s) have been recently received by the mobile station 110 (e.g., based on the historical usage determined at block 1810).

If SAIC processing capacity has not been exceeded (block 1820), then at block 1825 the SAIC enabler 425 enables SAIC for one or more timeslots immediately adjacent to the timeslot(s) for which SAIC was enabled at block 1815, and then one or more timeslots immediately adjacent to those timeslot(s), and so on (e.g., such that SAIC is enabled for a contiguous sequence of one or more timeslots adjacent to the one or more of the timeslots for which SAIC was enabled at block 1815). If SAIC processing capacity has still not been exceeded (block 1830), then at block 1825 the SAIC enabler 425 intersperses enabling of SAIC for the remaining assigned timeslot(s) in a ratio of one out of N, with N being reduced provided SAIC processing capacity is met.

Figure 19:
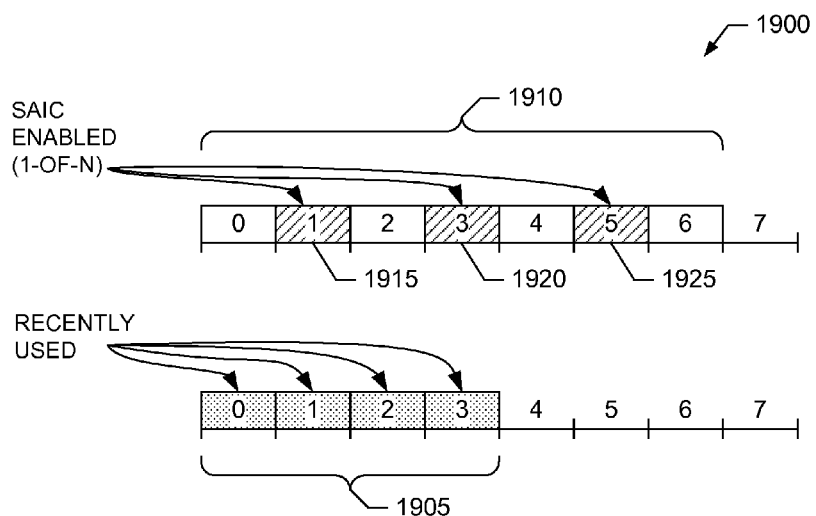
FIG. 19 is a block diagram illustrating a first example operation of the example process of FIG. 18.

FIG. 19 illustrates a first example operation 1900 of the example process 1800 of FIG. 18. The example operation 1900 of FIG. 19 corresponds to a dual carrier configuration in which the top TDMA frame corresponds to a first carrier assigned to the mobile station 110, and the bottom TDMA frame corresponds to a second carrier assigned to the mobile station 110. In the example operation 1900, the mobile station 110 is assigned timeslots 1905 and 1910, and recently was allocated to actually receive data in timeslots 1905. Using the example process 1800, the receive-side SAIC controller 120 enables SAIC for the recently allocated timeslots 1905 in which data was actually received. There are no assigned timeslots adjacent to the recently allocated. As such, the receive-side SAIC controller 120 then uses the example process 1800 to intersperse enabling of SAIC for timeslots 1915, 1920 and 1925, with the ratio of interspersing enabling of SAIC being dependent on the remaining SAIC processing capacity of the mobile station 110.

Figure 20:
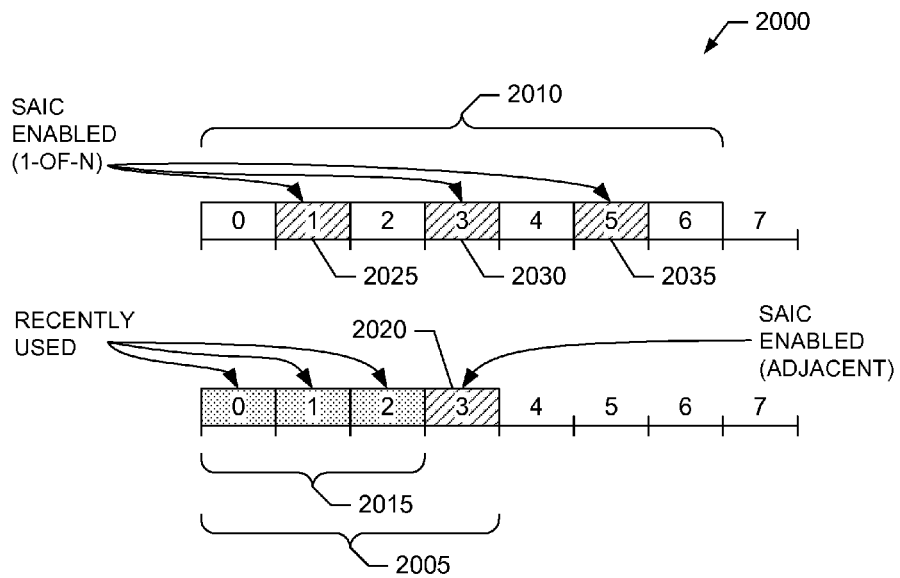
FIG. 20 is a block diagram illustrating a second example operation of the example process of FIG. 18.

FIG. 20 illustrates a second example operation 2000 of the example process 1800 of FIG. 18. The example operation 2000 of FIG. 20 corresponds to a dual carrier configuration in which the top TDMA frame corresponds to a first carrier assigned to the mobile station 110, and the bottom TDMA frame corresponds to a second carrier assigned to the mobile station 110. In the example operation 2000, the mobile station 110 is assigned timeslots 2005 and 2010, and recently was allocated to actually receive data in timeslots 2015. Using the example process 1800, the receive-side SAIC controller 120 enables SAIC for the recently allocated timeslots 2005 in which data was actually received. The receive-side SAIC controller 120 then uses the example process 1800 to enable SAIC for timeslot 2020, which is an assigned timeslot adjacent to the timeslots 2015 for which SAIC has already been enabled. The receive-side SAIC controller 120 then further uses the example process 1800 to intersperse enabling of SAIC for timeslots 2025, 2030 and 2035, with the ratio of interspersing enabling of SAIC being dependent on the remaining SAIC processing capacity of the mobile station 110.

Figure 21:
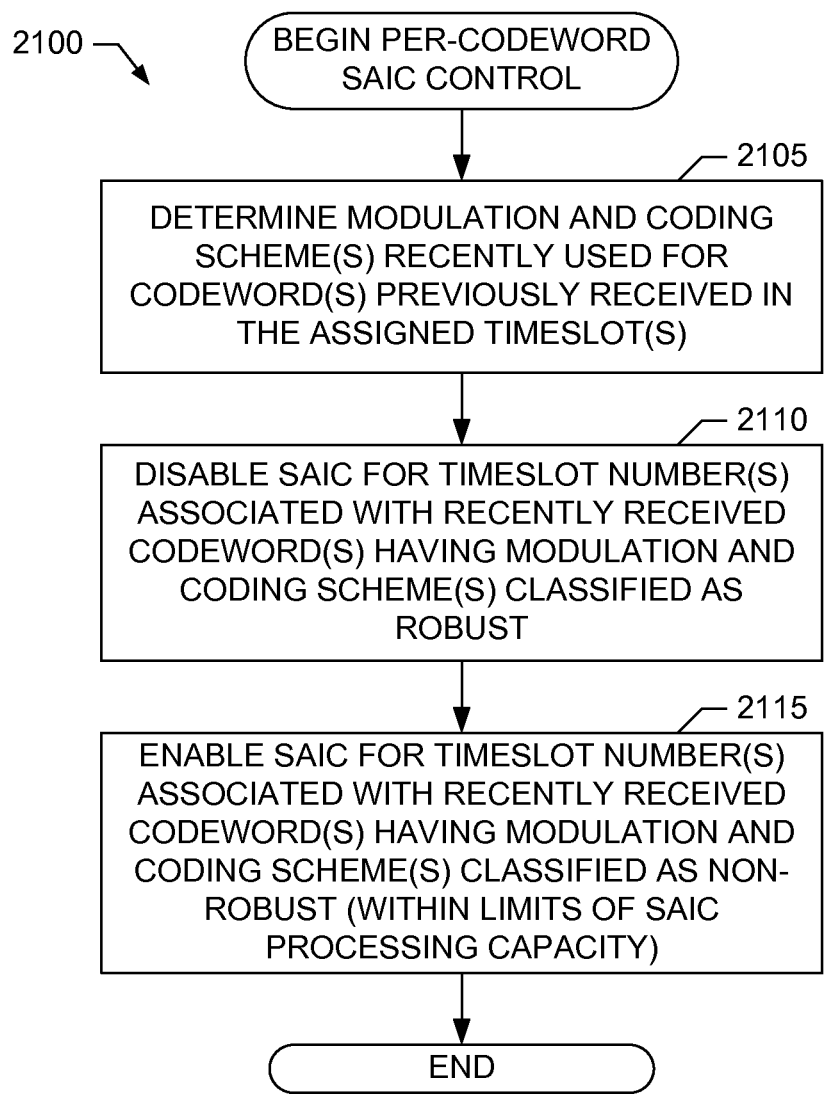
FIG. 21 is a flowchart representative of an example process that may be performed to implement per-codeword control based on modulation and coding schemes in the example receive-side single antenna interference cancellation controller of FIG. 4.

An example process 2100 that may be executed to implement per-codeword SAIC control based on modulation and coding schemes in the receive-side SAIC controller 120 of FIGS. 1 and 4, and/or to perform the processing at block 820 in FIG. 8 and/or at block 1010 of FIG. 10, is illustrated in FIG. 21. The example process 2100 is based on the premise that in a GERAN system, such as the mobile communication system 100, the network (e.g., the network element 105) is likely to use the same MCS on a given timeslot that it has used in the recent past. The example process 2100 of FIG. 21 begins execution at block 2105 at which the SAIC enabler 425 of the receive-side SAIC controller 120 determines the MCS (or set of MCSs) recently used for codeword(s) received in the timeslots assigned to the mobile station 110. In some examples, the SAIC enabler 425 considers only those blocks addressed to the mobile station 110. At block 1310, the SAIC enabler 425 disables SAIC for timeslot number(s) of timeslot(s) in which MCS(s) classified as robustly coded (e.g., having a coding rate less than a rate threshold) have been recently used. At block 1315, the SAIC enabler 425 enables SAIC for timeslot number(s) of timeslot(s) in which MCS(s)

classified as not robustly coded (e.g., having a coding rate greater than the rate threshold) have been recently used.

Figure 22:
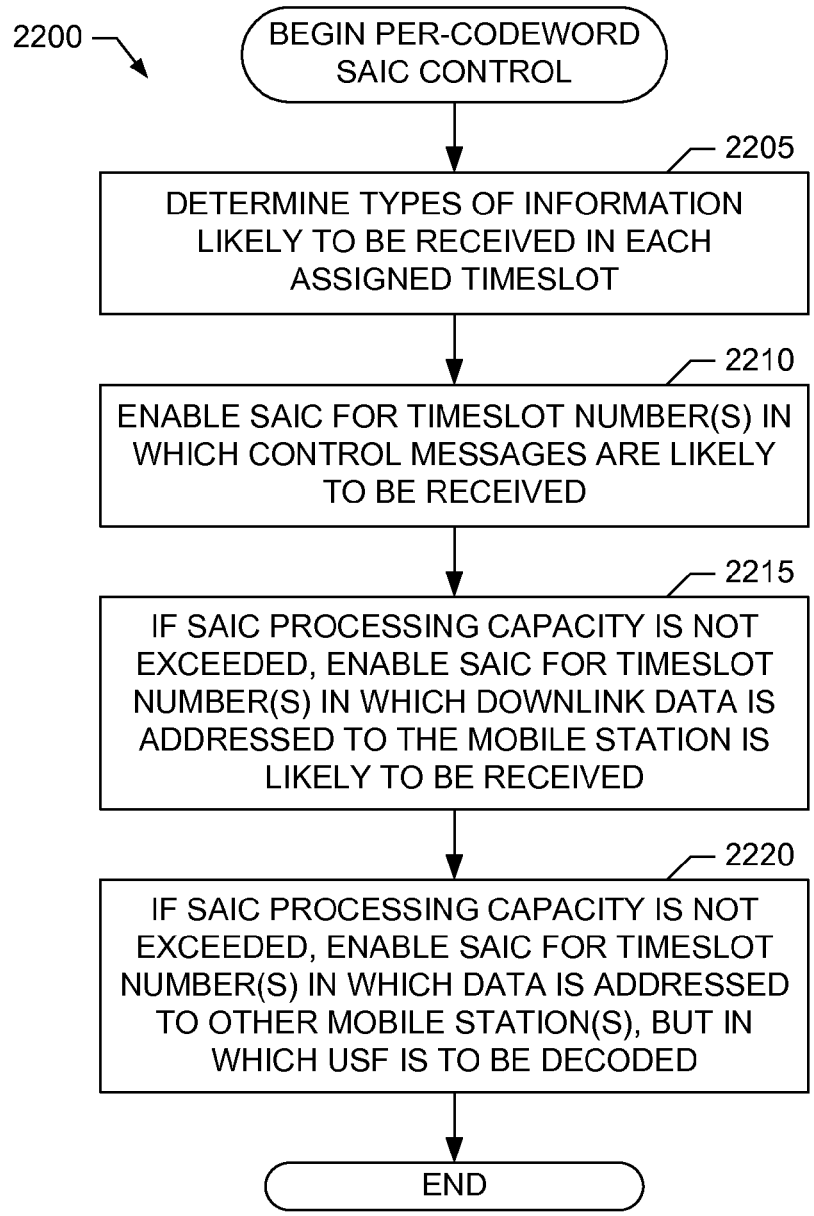
FIG. 22 is a flowchart representative of an example process that may be performed to implement per-codeword control based on expected received information types in the example receive-side single antenna interference cancellation controller of FIG. 4.

An example process 2200 that may be executed to implement per-codeword SAIC control based on expected received information types in the receive-side SAIC controller 120 of FIGS. 1 and 4, and/or to perform the processing at block 820 in FIG. 8 and/or at block 1010 of FIG. 10, is illustrated in FIG. 22. The example process 2200 can be performed by the receive-side SAIC controller 120 to preferentially enable or disable SAIC based on the type of information that may be conveyed on different timeslots. For example, the receive-side SAIC controller 120 can use the process 2200 to prioritize SAIC for timeslots that are likely to be used to send control messages (e.g. such as packet associated control channel (PACCH) signaling) to the mobile station 110 to increase the likelihood that such control messages (which may include resource assignments, handover commands, etc.) are received properly. For example, in the case of an uplink multislot assignment, PACCH transmissions are expected to occur on the lowest-numbered timeslot (see 3 GPP TS 44.060, sub-clause 8.1.1.2.2), while the mobile station is to decode blocks on others timeslots only to detect the USF fields.

As another example, for mobile stations having both downlink and uplink timeslot assignments, some timeslots may be used for downlink data, other timeslots for USFs (to indicate uplink allocations), and still other timeslots for both. The receive-side SAIC controller 120 can use the process 2200 to prioritize SAIC processing in the mobile station 110 for timeslots that are used for both downlink data and USFs, then those timeslots that are used for downlink data only, and finally those timeslots that are used for USFs only.

Combining the preceding two examples, the receive-side SAIC controller 120 can use the process 2200 to prioritize enabling SAIC in the mobile station 110 for timeslots in which PACCH can be received, followed by timeslots in which downlink data can be received, followed by timeslots in which only USFs are to be received.

With the foregoing in mind, and with reference to the preceding figures, the example process 2200 of FIG. 22 begins execution at block 2205 at which the SAIC enabler 425 of the receive-side SAIC controller 120 determines the types of information likely to be received in the downlink timeslot(s) assigned to the mobile station 110. At block 2210, the SAIC enabler 425 enables SAIC for timeslot number(s) associated with timeslot(s) in which control messages are likely to be received. If SAIC processing capacity is not exceeded, at block 2215 the SAIC enabler 425 enables SAIC for timeslot number(s) associated with timeslot(s) in which downlink data addressed to the mobile station 110 is likely to be received. If SAIC processing capacity is not exceeded, at block 2220 the SAIC enabler 425 enables SAIC for timeslot number(s) associated with timeslot(s) in which downlink data addressed to mobile station(s) other than mobile station 110 is likely to be received, but in which USF(s) are to be decoded.

Figure 23:
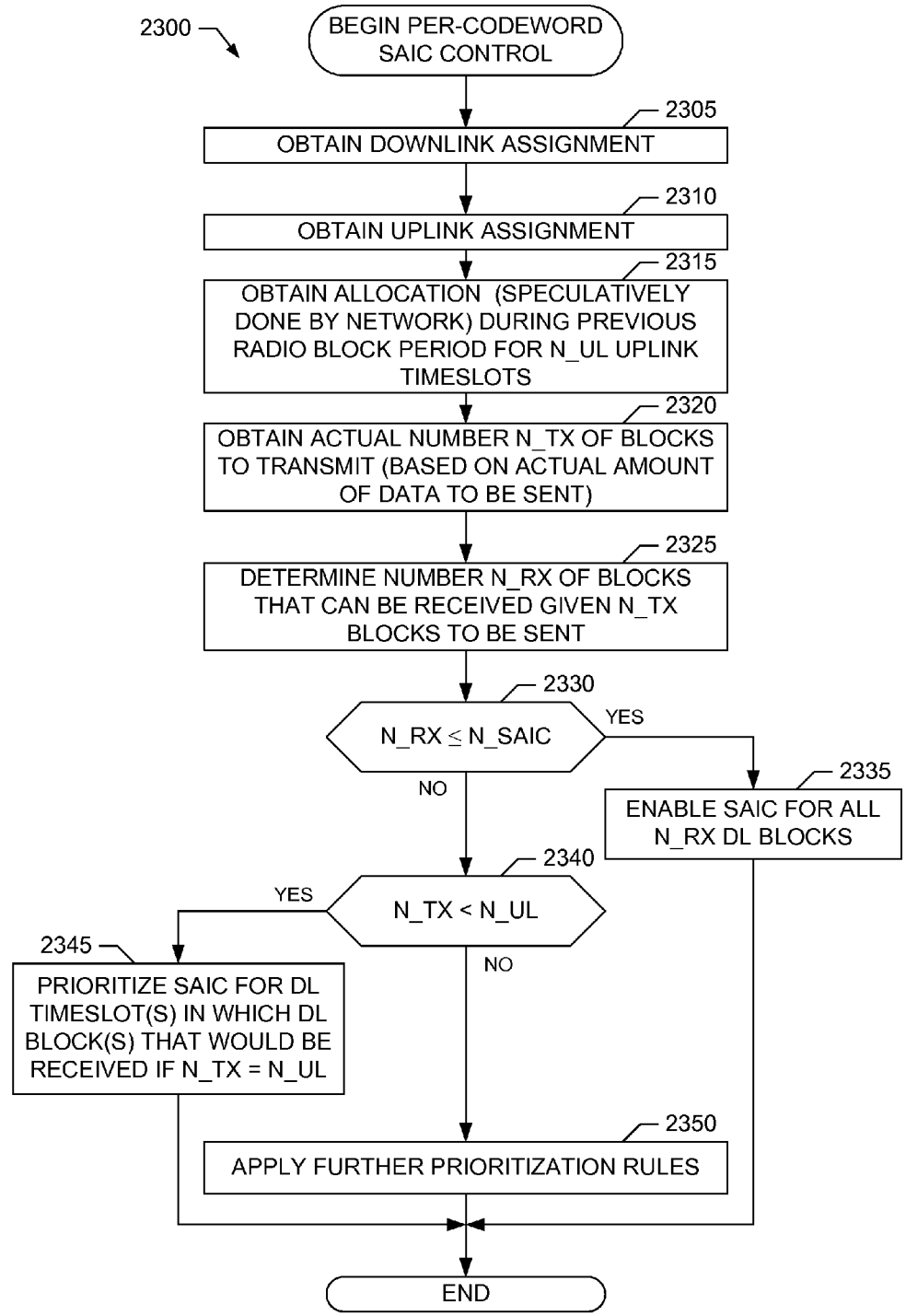
FIG. 23 is a flowchart representative of a first example process that may be performed to implement per-codeword control for enhanced flexible timeslot assignment in the example receive-side single antenna interference cancellation controller of FIG. 4.

A first example process 2300 that may be executed to implement per-codeword SAIC control for enhanced flexible timeslot assignment (EFTA) in the receive-side SAIC controller 120 of FIGS. 1 and 4, and/or to perform the processing at block 820 in FIG. 8 and/or at block 1010 of FIG. 10, is illustrated in FIG. 23. In some examples, such as when EFTA is used, a GERAN system, such as the mobile communication system 100, can allocate uplink resources to a mobile station, such as the mobile station 110, speculatively or, in other words, without knowing whether the mobile station actually has any data to transmit. In such examples, the mobile station 110 may be allocated uplink timeslots in which uplink data is to be transmitted even though the mobile station 110 has no data to transmit. Noting that downlink transmissions in timeslots that collide (e.g., overlap) with the allocated uplink timeslots have a significant likelihood of being lost (e.g., whenever the mobile station actually transmits on one or more colliding uplink timeslot(s)), the network is expected to schedule downlink control messages and data for the mobile station 110 for transmission in non-colliding (e.g., non-overlapping) timeslots. Furthermore, the network usually takes into account the uplink radio block transmission order specified for EFTA in 3 GPP TS 44.060 Annex N when scheduling downlink control messages and data for transmission to the mobile station 110.

The example process 2300 can be used by the receive-side SAIC controller 120 to prioritize SAIC processing for those non-colliding (e.g., non-overlapping) timeslots in which the network is likely to transmit data to the mobile station 110. The example process 2300 takes into account the actual allocation of timeslots in a given radio block period. If the number of timeslots that the mobile station 110 can receive, taking into account the transmissions the mobile station 110 will make on its allocated timeslots, is lower than the SAIC processing capacity, then SAIC is applied on all such timeslots. Otherwise, an alternative prioritization scheme is applied.

With the foregoing in mind, and with reference to the preceding figures, the example process 2300 of FIG. 23 begins execution at block 2305 at which the SAIC enabler 425 of the receive-side SAIC controller 120 obtains the downlink timeslot assignment for the mobile station 110. At block 2310, the SAIC enabler 425 obtains the uplink timeslot assignment for the mobile station 110. At block 2315, the SAIC enabler 425 obtains the uplink timeslot allocation (that is done speculatively by the network) for EFTA received in the previous radio block period. In the illustrated example, the speculative uplink timeslot allocation is for a number of uplink timeslots represented by N_UL. At block 2320, the SAIC enabler 425 obtains the actual number of uplink timeslots, N_TX, in which bursts are to be transmitted by the mobile station. At block 2325, the SAIC enabler 425 determines the number of timeslots, N_RX, in which data can be received given that data is to be transmitted in N_TX timeslots.

If the number of timeslots, N_RX, in which data can be received is less than or equal to N_SAIC (block 2330) and, as such, SAIC processing capacity is not exceeded, then at block 2335 the SAIC enabler 425 enables SAIC for all N_RX downlink timeslots. However, if N_RX is greater than N_SAIC (block 2330) and, as such, SAIC processing capacity would be exceeded, then at block 2340 the SAIC enabler 425 determines whether the actual number of uplink timeslots, N_TX, in which bursts are to be transmitted is less than the number, N_UL, of speculatively allocated uplink timeslots. If N_TX is less than N_UL, then at block 2345 the SAIC enabler 425 enables SAIC for the downlink timeslots in which downlink data would be scheduled for reception if the actual number of uplink timeslots, N_TX, in which bursts are to be transmitted had been equal to the number, N_UL, of speculatively allocated uplink timeslots. If, however, N_TX is not less than N_UL (block 2340), then SAIC processing capacity is exceeded even when the mobile station 110 is to transmit on all allocated uplink timeslots (yielding the smallest number of non-colliding assigned downlink timeslots). In this case, at block 2350 the SAIC enabler 425 can employ other prioritizing rules to determine for which timeslots SAIC is to be enabled.

Figure 24:
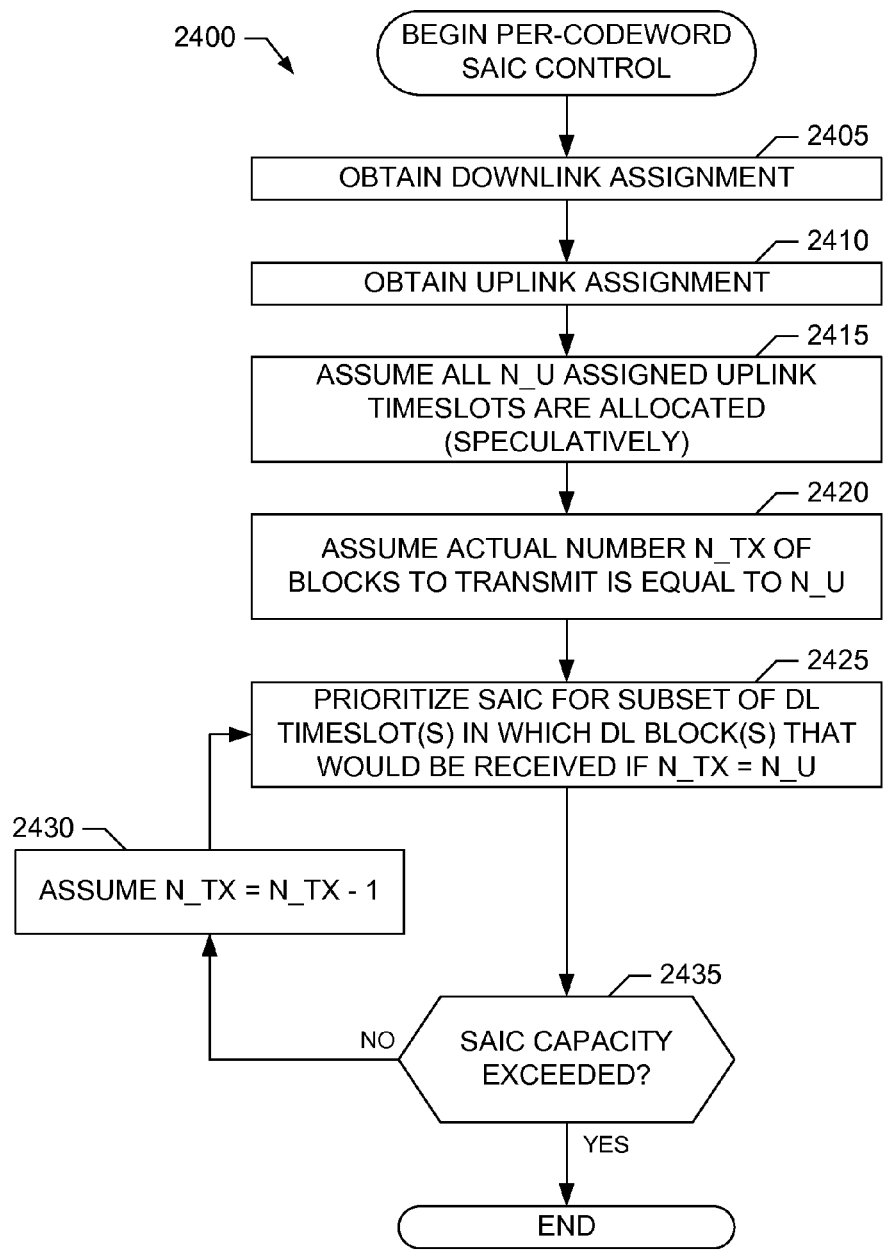
FIG. 24 is a flowchart representative of a second example process that may be performed to implement per-codeword control for enhanced flexible timeslot assignment in the example receive-side single antenna interference cancellation controller of FIG. 4.

A second example process 2400 that may be executed to implement per-codeword SAIC control for EFTA in the receive-side SAIC controller 120 of FIGS. 1 and 4, and/or to perform the processing at block 820 in FIG. 8 and/or at block 1010 of FIG. 10, is illustrated in FIG. 24. Compared to the example process 2300, the example process 2400 prioritizes SAIC processing without knowledge of the actual uplink allocation and, instead, assumes that the mobile station 110 is allocated all of its assigned uplink timeslots. The example process 2400 of FIG. 23 begins execution at block 2405 at which the SAIC enabler 425 of the receive-side SAIC controller 120 obtains the downlink timeslot assignment for the mobile station 110. At block 2410, the SAIC enabler 425 obtains the uplink timeslot assignment for the mobile station 110. At block 2415, the SAIC enabler 425 assumes that all assigned uplink timeslots have been allocated for uplink transmission. In the illustrated example, the number of assigned uplink timeslots is represented by N_U. At block 2420, the SAIC enabler 425 assumes that the actual number of uplink timeslots, N_TX, in which bursts are to be transmitted by the mobile station 110 is equal to the number of assigned uplink timeslots, N_U.

Next, at block 2425 the SAIC enabler 425 prioritizes enabling of SAIC for the downlink timeslots in which downlink data would be scheduled for reception if the actual number of uplink timeslots, N_TX, in which bursts are to be transmitted is equal to the number of assigned uplink timeslots, N_UL. If SAIC processing capacity has not been exceeded (block 2435), then at block 2430 the SAIC enabler 425 reduces the number of uplink timeslots, N_TX, that the SAIC enabler 425 is assuming will be used for transmission (thereby increasing the number of downlink timeslots in which downlink data is likely to be scheduled). Processing then returns to block 2425.

Figure 25:
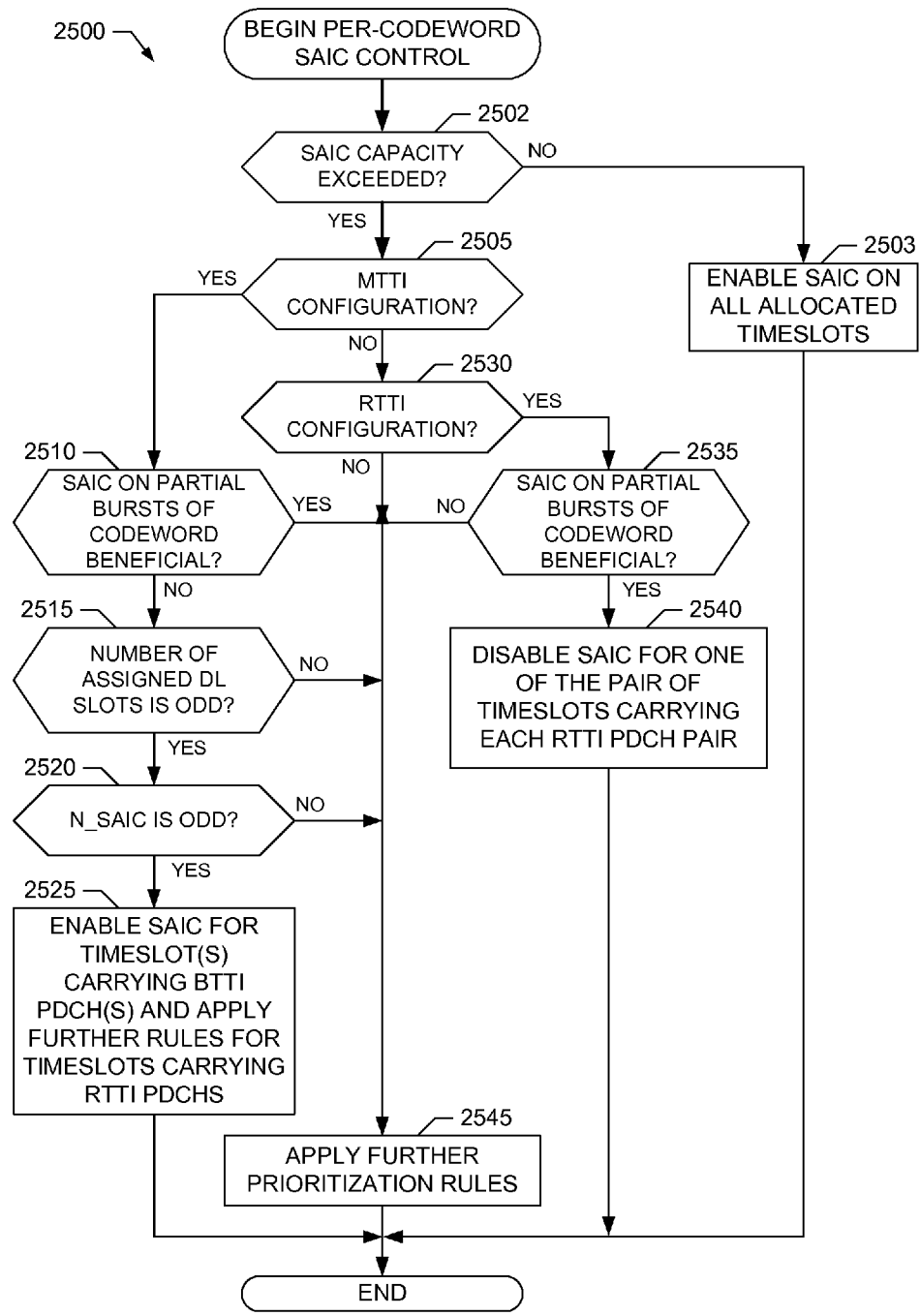
FIG. 25 is a flowchart representative of a first example process that may be performed to implement per-codeword control for mixed and reduced transmission time interval operation in the example receive-side single antenna interference cancellation controller of FIG. 4.

An example process 2500 that may be executed to implement per-codeword SAIC control for mixed and reduced transmission time interval operation in the receive-side SAIC controller 120 of FIGS. 1 and 4, and/or to perform the processing at block 820 in FIG. 8 and/or at block 1010 of FIG. 10, is illustrated in FIG. 25. In RTTI configurations, selection of timeslots for which SAIC is to be enabled may be timeslot based (e.g. for criteria relating to per-timeslot interference), or PDCH-pair based (e.g. for criteria relating to code rate of the used MCS), or a combination of both. For example, if the MCS used is strongly coded (low code rate) and there is insufficient SAIC processing capacity to enable SAIC for both PDCHs (and, thus, both timeslots) in the pair, then the DARP requirements may still be able to be met if SAIC be disabled in one of the timeslots in the PDCH pair, but enabled in the other timeslot. Conversely, if the MCS is weakly coded, then it may be beneficial to either enable SAIC for both timeslots in the PDCH pair or disable it for both of the timeslots, thereby conserving SAIC processing capacity to permit enabling of SAIC on a different PDCH pair instead.

In MTTI configuration, if it is determined that performing SAIC on partial bursts of a codeword is insufficient to meet DARP requirements (e.g., based on the code rate of the expected codeword being received and/or other received quality parameters, such as received signal strength, etc), and if the total number of assigned downlink timeslots is an odd number, and if N_SAIC is odd, then it may be beneficial to enable SAIC for just each timeslot carrying a BTTI PDCH in the MTTI configuration.

With the foregoing in mind, and with reference to the preceding figures, the example process 2500 of FIG. 25 begins execution at block 2502 at which the SAIC enabler 425 of the receive-side SAIC controller 120 determines whether SAIC processing capacity of the mobile station will be exceeded if SAIC is enabled for all allocated timeslots. If SAIC processing capacity will not be exceeded (block 2502), at block 2503 the SAIC enabler 425 enables SAIC for all allocated downlink timeslots. However, if SAIC processing capacity will be exceeded (block 2502), at block 2503 the SAIC enabler 425 determines whether the mobile station 110 is using an MTTI configuration. If the mobile station 110 is using an MTTI configuration (block 2505), and employing SAIC on partial bursts of codewords would be insufficient to meet DARP requirements (block 2510), and the number of assigned downlink timeslots is odd (block 2515), and N_SAIC is odd (block 2520), then at block 2525 the SAIC enabler 425 enables SAIC for each timeslot carrying a BTTI PDCH, and applies further prioritization rules to determine whether to enable/disable SAIC for the timeslots carrying RTTI PDCHs (e.g., such as determining to disable SAIC for at least one timeslot of the pair of timeslots carrying the RTTI PDCHs). However, if the mobile station 110 is not using an MTTI configuration (block 2505), then at block 2530 the receive-side SAIC controller 120 determines whether the mobile station 110 is using an RTTI configuration. If the mobile station 110 is using an RTTI configuration (block 2530), and employing SAIC on partial bursts of codewords would be sufficient to meet DARP requirements (block 2535), then at block 2540 the SAIC enabler 425 disables SAIC for one timeslot in each pair of timeslots carrying RTTI PDCHs, and enables SAIC in the other timeslot of each pair. Otherwise, at block 2545 the SAIC enabler 425 employs other prioritizing rules to determine for which timeslots SAIC is to be enabled.

In some examples, the network element 105 may indicate (e.g. in a packet downlink assignment message, and/or by broadcast signaling) the timeslots on which the mobile station 110 may disable SAIC. For example, the network element 105 could explicitly signal (e.g., via a bitmap representing timeslot numbers) the timeslots for which the mobile station 110 is to enable SAIC (as well as the timeslots for which SAIC is to be disabled). As another example, the network element 105 could indicate a particular rule to be used by the mobile station 110 to determine the assigned timeslots for which SAIC should be enabled.

As an example of explicit signaling, the network element 105 may know in advance the threshold number (e.g., maximum number) of timeslots (N_SAIC) for which the mobile station 110 can enable SAIC. (For example, this information may be sent to network by the mobile station 110 in an information element containing the capabilities of the mobile station 110.) In this case, the network 115 could indicate the timeslot numbers (within a TDMA frame) on which SAIC can be disabled or, alternatively, the timeslot numbers on which SAIC is to be enabled.

In some examples, the indication of N_SAIC may be standardized as a function of the signaled multislot class. Alternatively, N_SAIC could be indicated using a combination of existing plus new signaling, such as signaling specifying a multislot class and a "SAIC_reduction" field. For example, the "SAIC_reduction" could be a small (e.g., 1 bit) field indicating a single possible reduction value.

Irrespective of whether the network element 105 knows in advance the threshold number (e.g., maximum number) of timeslots (N_SAIC) for which the mobile station 110 can enable SAIC, the network element 105 could signal a particular rule (or set of rules) for determining the timeslots for which SAIC is to be enabled, as described above. Alternatively, the network element 105 could explicitly signal an initial set of timeslot numbers for which SAIC can be disabled or, alternatively, the timeslot numbers for which SAIC is to be enabled. The mobile station 110 may then increase or decrease the number of timeslots on which SAIC is enabled (e.g., using one or more of the example techniques described above), depending on the SAIC processing capacity of mobile station 110. As a non-limiting example, assume that the downlink assignment for the mobile station 110 includes the set of timeslot numbers {1,2,3,4,5} on both the first RF channel 130 and the second RF channel 135 (as part of a downlink dual carrier configuration). The network element 105 then indicates that SAIC may be disabled on timeslots {4, 5} on the first RF channel 130 for any mobile station not supporting SAIC on more than 8 timeslots. However, assume that the mobile station 110 can support SAIC on only 7 timeslots. In this case, the mobile station 110 expands the set of SAIC-disabled timeslots to also include timeslot {3} on the first RF channel 130.

In some examples, a deterministic rule combined with an indication of N_SAIC can be sufficient for the network element 105 to identify the timeslots for which the mobile station 110 has enabled SAIC. In other examples, the mobile station 110 can explicitly indicate to the network the timeslots for which the mobile station 110 has enabled SAIC (e.g., via a packet downlink ack/nack message, a piggy-backed ack/nack field included in a received data block, etc.). Knowledge of the timeslots for which the mobile station 110 has enabled SAIC may be used by the network element 105 and, more generally, the mobile communication system 100 for radio resource management (e.g., to improve network performance). For example, the network element 105 may send important data (e.g., requiring low latency and/or low block error rate) in timeslots for which SAIC is known to be enabled. As another example, the network element 105 may optimize the transmission strategy between first transmission and subsequent retransmissions such that if a first transmission was in a timeslot for which SAIC is known to be disabled, then retransmission may be scheduled for a timeslot for which SAIC is known to be enabled. As yet a further example, the network element 105 may optimize throughput by choosing a different modulation (i.e. non-GMSK) if the throughput without SAIC is known to be suboptimal.

Figure 26:
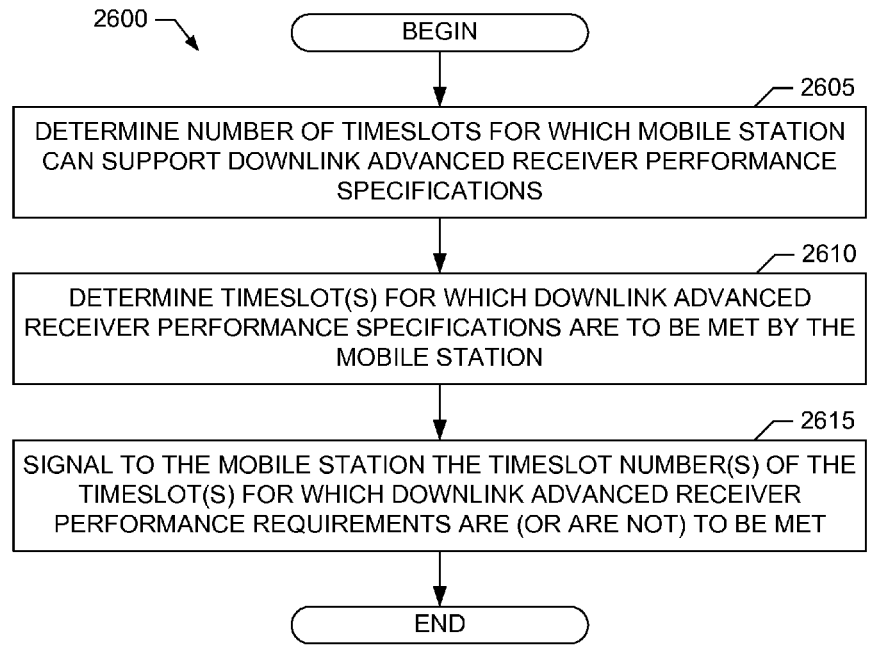
FIG. 26 is a flowchart representative of an example process that may be used to implement control based on timeslot signaling in the example transmit-side single antenna interference cancellation controller of FIG. 7.
Figure 27:
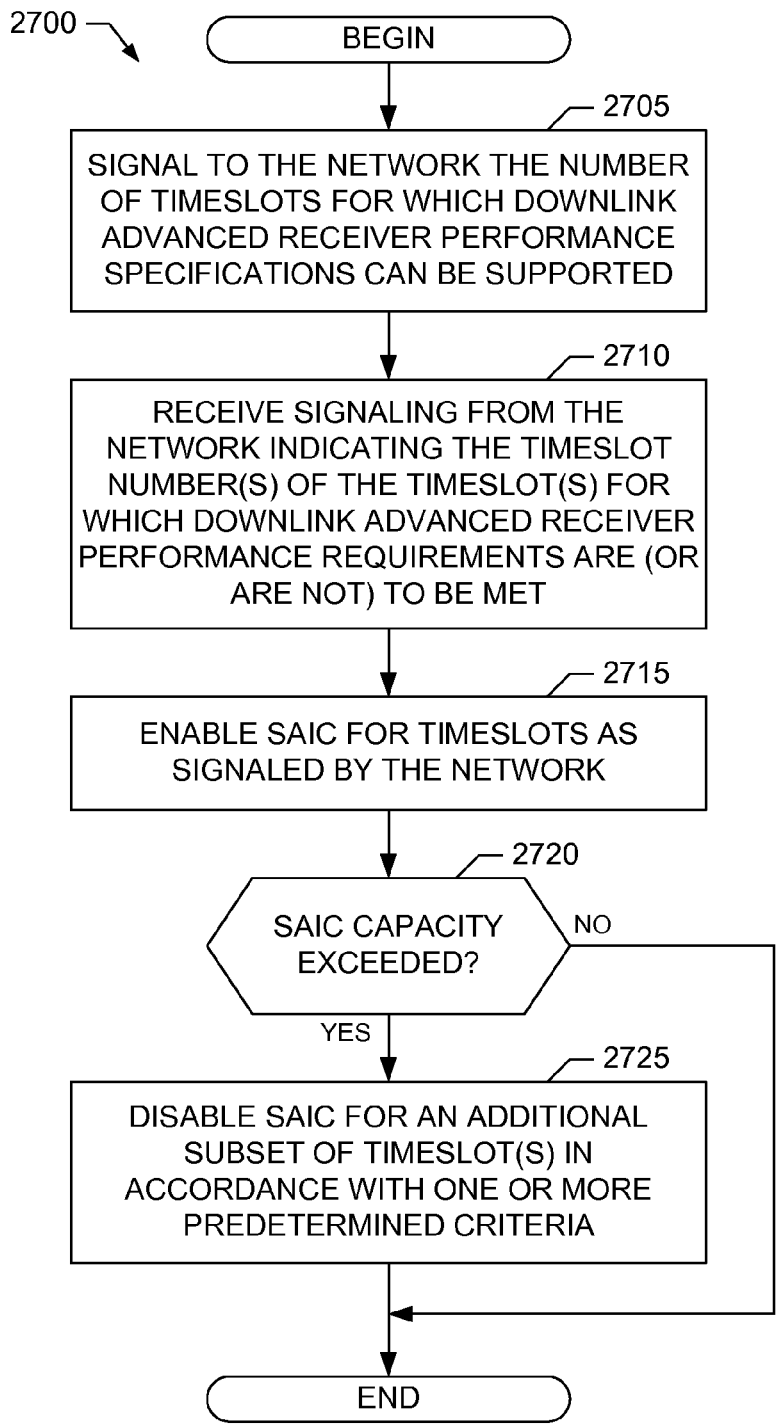
FIG. 27 is a flowchart representative of an example process that may be used to implement control based on timeslot signaling in the example receive-side single antenna interference cancellation controller of FIG. 4.

With the foregoing in mind, an example process 2600 that may be executed to implement the transmit-side SAIC controller 125 of FIGS. 1 and 7 is illustrated in FIG. 26. An example companion process 2700 that may be executed to implement the receive-side SAIC controller 120 of FIGS. 1 and 4 is illustrated in FIG. 27. Turning to FIG. 26, the example process 2600 begins execution at block 2605 at which the SAIC signaler 425 of the transmit-side SAIC controller 125 included in the network element 115 determines (e.g., via received signaling) the number of timeslots for which the mobile station 110 can support DARP requirements (e.g., which may correspond to the number of timeslots, N_SAIC, for which the mobile station 110 can support SAIC). At block 2610, the SAIC signaler 425 determines the timeslot number(s) of the timeslot(s) for which the mobile station 110 is to support the DARP requirements (e.g., such as the DARP Phase I requirements). At block 2615, the SAIC signaler 425 signals to the mobile station 110 the timeslot number(s) of the timeslot(s) for which the DARP requirements are to be met (or, alternatively, the timeslot number(s) of the timeslot(s) for which the DARP requirements are not to be met).

Turning to FIG. 27, the example process 2700 of FIG. 27 begins execution at block 2705 at which the receive-side SAIC controller 120 signals to the network element 105 the number of timeslots for which the mobile station 110 can support DARP requirements (e.g., which may correspond to the number of timeslots, N_SAIC, for which the mobile station 110 can support SAIC). At block 2710, the receive-side SAIC controller 120 receives signaling from the network element 105 indicating the timeslot number(s) of the timeslot(s) for which the DARP requirements are to be met (or, alternatively, the timeslot number(s) of the timeslot(s) for which the DARP requirements are not to be met). At block 2715, the SAIC enabler 425 of the receive-side SAIC controller 120 enables SAIC in the timeslot(s) for which the DARP requirements are to be met (as signaled by the network element 105). If the SAIC processing capacity of the mobile station 105 has been exceeded (block 2720), then at block 2725 the SAIC enabler 425 disables SAIC for an additional subset of one or more timeslot(s) in accordance with one or more predetermined criteria. For example, at block 2725 the SAIC enabler 425 can select the subset of timeslots for which SAIC is to be disabled using one or more of the example techniques described above.

Figure 28:
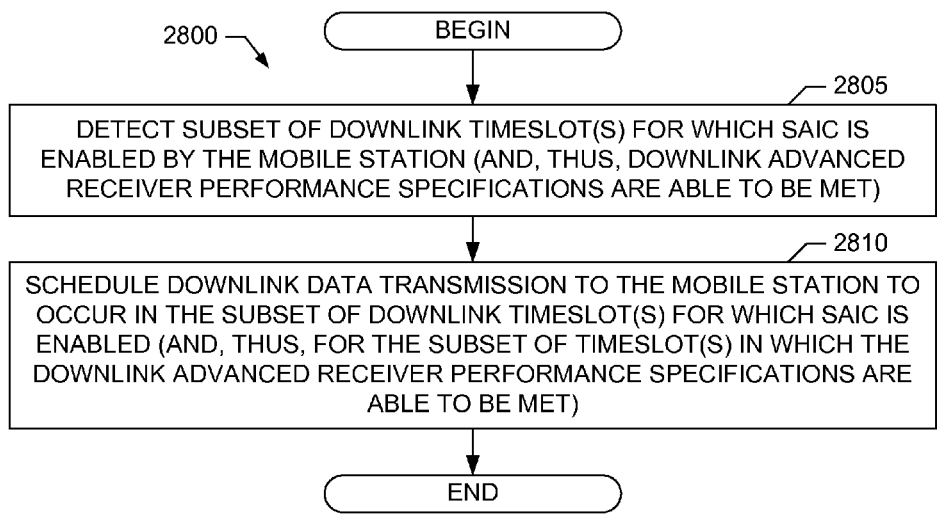
FIG. 28 is a flowchart representative of an example process that may be used to implement data transmission scheduling in the example transmit-side single antenna interference cancellation controller of FIG. 7.

An example process 2800 that may be executed to implement data transmission scheduling in the transmit-side SAIC controller 125 of FIGS. 1 and 7 is illustrated in FIG. 28. As noted above, it can be beneficial for radio resource management purposes if the network (e.g., the network element 105) of the mobile communication system 100 is able to identify the timeslot(s) for which the mobile station 110 has enabled SAIC. In some examples, the mobile station 110 can explicitly indicate to the network element 105 the timeslot(s) for which the mobile station 110 has enabled SAIC using, for example, a bitmap contained in one or more signaling messages, such as a packet downlink ack/nack message, and/or a bitmap in a piggy-backed ack/nack field included in a received data block, etc. Additionally or alternatively, in some examples mobile station 110 can implicitly indicate to the network element 105 the timeslot(s) for which the mobile station 110 has enabled SAIC using, for example, link quality interference measurements. For example, the mobile station 110 could report link quality interference measurements for only the subset of downlink timeslots for which the mobile station has enabled SAIC, but not report link quality interference measurements for any other timeslot in the time division multiple access frame. Alternatively, the mobile station 110 could report link quality interference measurements for only the subset of downlink timeslots for which the mobile station has disabled SAIC, but not report link quality interference measurements for any other timeslot in the time division multiple access frame.

With the foregoing in mind, and with reference to the preceding figures, the example process 2800 of FIG. 28 begins execution at block 2805 at which the SAIC detector 710 of the transmit-side SAIC controller 125 included in the network element 105 detects the subset of one or more downlink timeslots for which the mobile station 110 can support SAIC (e.g., which corresponds to the subset of timeslots for which the mobile station 110 can meet DARP requirements). At block 2810, the data scheduler 715 of the transmit-side SAIC controller 125 schedules downlink data transmission to the mobile station 110 based on the subset of downlink timeslots detected at block 2805 as having SAIC enabled in the mobile station 110. For example, the data scheduler 715 may schedule downlink data transmission with a bias (e.g., or weighting, prioritization, etc.) in favor of using one or more of the timeslots detected at block 2805 as having SAIC enabled, if these timeslot(s) are available. Additionally or alternatively, at block 2810 the data scheduler 715 can select a particular MCS for scheduled downlink data depending on whether SAIC is enabled or disabled for a particular timeslot. For example, if the data scheduler 715 determines that SAIC is enabled for a particular timeslot, the data scheduler 715 may select an MCS employing GMSK for sending data in that scheduled timeslot, whereas if SAIC is disabled, the data scheduler 715 may evaluate whether to use a higher-order modulation (e.g., such as 8-PSK, where PSK refers to phase shift keying) in the timeslot.

Interference conditions may vary significantly among timeslots in a multislot environment. Interference conditions depend on, for example, the load in neighboring cells, frequency planning and frequency hopping patterns, etc. During normal operation, the mobile station 110 measures the amount of interference observed in each timeslot in a given multislot scenario. As such, in some examples the receive-side SAIC controller 120 can disable SAIC for timeslot(s) in which the interference conditions are deemed by the mobile station 110 to be unfavorable for SAIC, and/or for which SAIC is not needed to meet DARP requirements. For example, the receive-side SAIC controller 120 could disable SAIC when: (1) no or low external interference is observed on a given timeslot; (2) the modulation of the external interferer is deduced to be non-GMSK; (3) the external interference is observed to include multiple interferers having little difference between the powers of the interferers; and/or (4) the quality on the timeslot is already deemed to be good (e.g., compared to other timeslots in the assignment), etc. Conversely, the receive-side SAIC controller 120 can enable SAIC for timeslot(s) in which the interference conditions are deemed by the mobile station 110 to be favorable for SAIC, and/or for which SAIC is needed to meet DARP requirements.

In some examples, the mobile station 110 may also gauge the effectiveness of SAIC on a given timeslot by enabling SAIC for some duration during the call/connection to determine if quality improves. For example, the mobile station 110 could determine whether the cyclical redundancy check (CRC) success rate for the received blocks improves in the case of speech traffic, or the frame error rate improves or the measured bit error rate improves, etc., in the case of PS data traffic. If no improvement is observed, the mobile station 110 can then try enabling SAIC for some duration on the other timeslots until a preferential list of timeslots that are most likely to benefit from SAIC is created in the mobile station 110. This list can then be used to select the subset of one or more timeslots for which SAIC is to be enabled during some or all of the remainder of the call. For example, the mobile station 110 may sort/rank the received bursts/timeslots in the order of observed performance gains when SAIC is enabled and then enable SAIC beginning with the highest ranked bursts/timeslots until SAIC processing capacity is exceeded for a given TDMA frame. In some examples, the foregoing measurement procedure could be repeated at regular intervals during the call to ensure that the ordering does not become stale as the call progresses.

In some examples, modified DARP requirements (e.g., modified DARP Phase I requirements) are specified for use in the mobile communication system 100. An example of such modified DARP requirements could include specifying that:

(1) for downlink timeslot assignments of up to N timeslots, existing DARP Phase I requirements are applicable.

(2) for downlink timeslot assignments for N+1 or more timeslots, new requirements apply, which are less restrictive than the existing DARP Phase I requirements, but are more restrictive than the requirements for mobiles not supporting the DARP Phase I requirements. For example:

(2a) The new requirements could be homogeneous across all timeslots; or (2b) The new requirements could apply on a subset of timeslots (e.g. to be selected according to one or more of the example SAIC control techniques described above); or (2c) The new requirements could be aggregate requirements to be met when averaged over all assigned/allocated timeslots, or a subset of the assigned/allocated timeslots.

In such examples employing modified DARP requirements, the receive-side SAIC controller 120 of the mobile station 110 can be configured to perform SAIC control in accordance with the modified DARP requirements.

As mentioned previously, the example SAIC control techniques can be implemented individually or combined in many different manners. The following is a non-limiting list of possible manner of combining one or more of the example SAIC control techniques described herein:

(A) The example process 900 for implementing speech channel control in the example receive-side SAIC controller 120 can be combined with any one of the example processes 1100, 1200, 1300 or 1400 for implementing per-burst SAIC control in the example receive-side SAIC controller 120 and/or any one of the example processes 1500, 1800, 2100, 2200, 2300, 2400 or 2500 for implementing per-codeword SAIC control in the example receive-side SAIC controller 120 with, for example, the process 900 having precedence (e.g., being performed first).

(B) Any one of the example processes 1100, 1200, 1300 or 1400 for implementing per-burst SAIC control in the example receive-side SAIC controller 120 can be combined with any one of the example processes 1500, 1800, 2100, 2200, 2300, 2400 or 2500 for implementing per-codeword SAIC control in the example receive-side SAIC controller 120 with, for example, the per-codeword SAIC control process having precedence (e.g., being performed first).

(C) The example processes 2600 and 2700 for implementing timeslot signaling in the example transmit-side SAIC controller 125 and the example receive-side SAIC controller 120, respectively, can be combined with any one of the example processes 1500, 1800, 2100, 2200, 2300, 2400 or 2500 for implementing per-codeword SAIC control in the example receive-side SAIC controller 120.

(D) The example process 1500 for implementing per-codeword SAIC control based on predetermined timeslot ordering in the example receive-side SAIC controller 120 can be combined with the example process 2800 for implementing data transmission scheduling in the example transmit-side SAIC controller 125.

(E) One or more of the example processes 1500, 1800, 2100, 2200, 2300, 2400 or 2500 for implementing per-codeword SAIC control in the example receive-side SAIC controller 120 can be used to weight/prioritize the selection of burst(s) for which SAIC is to be enabled in one or more of the example processes 1100, 1200, 1300 or 1400 for implementing per-burst SAIC control in the example receive-side SAIC controller 120.

Another example of performing SAIC control as described herein involves modifying section 11.2.6a of 3 GPP TS 44.060 such that the EGPRS PACKET DOWNLINK ACK/NACK message includes the information elements specified in Table 1, with the new definitions specified in Table 2.

TABLE 1

```
< EGPRS Packet Downlink Ack/Nack message content > ::=
    < DOWNLINK_TFI : bit (5) >
    < MS OUT OF MEMORY : bit(1)>
    { 0 | 1 < EGPRS Channel Quality Report : < EGPRS Channel Quality Report IE > > }
    { 0 | 1 < Channel Request Description : >Channel Request Description IE > > }
    { 0 | 1 < PFI : bit(7) > }
    { 0 | 1 < EPD A/N Extension length index : bit (6) >
        < bit (expanded_EPDAN_extension_length(val(EPD A/N Extension length index)))
        & { < EPD A/N Extension Info > ! { bit** = <no string> }} > }
    < EGPRS Ack/Nack Description : < EGPRS Ack/Nack Description IE >>
    <padding bits > } ;
< EPD A/N Extension Info > ::=
    { {       -- Rel-5 extension
        { 0 | 1 < Iu mode Channel Request Description : < Iu mode Channel Request Description IE > >
}
        { 0 | 1 < RB Id : bit (5) > }
        { 0 | 1 < Timeslot Number : bit (3) > } }
    {       -- Rel-6 extension
        { 0 | 1 < Extended Channel Request Description : < Extended Channel Request Description IE
>> } }
    {       -- Rel-7 extension
        < EARLY_TBF_ESTABLISHMENT : bit (1) >
        { 0 | 1 < Secondary Dual Carrier Channel Report : < EGPRS Channel Quality Report IE > }
        { 0 | 1 < DARP_TIMESLOTS_CARRIER : bit (1)
            < DARP_TIMESLOTS : bit (8) > } }
    < spare bit >** } // ; -- Truncation may occur between released versions of the protocol
                        -- The receiver shall assume the value zero of any truncated bits
```

TABLE 2

DARP_TIMESLOTS_CARRIER (1 bit field)
This field indicates the carrier to which the DARP_TIMESLOTS field relates:
0 Carrier 1
1 Carrier 2
DARP_TIMESLOTS (8 bit field)
This field indicates the timeslots on which DARP Phase I performance requirements may not be met. The requirements will be met on all other timeslots. Bit 8 indicates timeslot 0, bit 7 indicates the status of

TABLE 2-continued timeslot 1, etc. A '1' in any bit position indicates that the DARP Phase I performance requirements may not be met on that timeslot.

A further example of performing SAIC control as described herein involves modifying section 11.2.7 of 3 GPP TS 44.060 such that the PACKET DOWNLINK ASSIGNMENT message includes the information elements specified in Table 3, with the updated and new definitions specified in Table 4 and Table 5.

TABLE 3

```
< Packet Downlink Assignment message content > ::=
  < PAGE_MODE : bit (2) >
  { 0 | 1 <PERSISTENCE_LEVEL : bit (4) > * 4 }
  {{ 0 < Global TFI : < Global TFI IE > >
   | 10 < TLLI/ G-RNTI : bit (32) > }
   { 0 -- Message escape
    { < MAC_MODE : bit (2) >
      < RLC_MODE : bit (1) >
      < CONTROL_ACK : bit (1) >
      < TIMESLOT_ALLOCATION : bit (8) >
      < Packet Timing Advance : < Packet Timing Advance IE > >
      { 0 | 1 < P0 : bit (4) >
        0  -- The value '1' was allocated in an earlier version of the protocol and shall not
be used.
        < PR_MODE : bit (1) > }
      {{ 0 | 1 < Frequency Parameters : < Frequency Parameters IE > > }
       { 0 | 1 < DOWNLINK_TFI_ASSIGNMENT : bit (5) > }
       { 0 | 1 < Power Control Parameters : < Power Control Parameters IE > > }
       { 0 | 1 < TBF Starting Time : < Starting Frame Number Description IE > > }
        0   -- The value '1' was allocated in an earlier version of the protocol and shall not
be used.
       { null | 0 bit** = <no string>   -- Receiver backward compatible with earlier version
       | 1          -- Additional contents for Release 1999
        { 0 | 1 < EGPRS Window Size : < EGPRS Window Size IE > >
          < LINK_QUALITY_MEASUREMENT_MODE : bit (2) >
          { 0 | 1 < BEP_PERIOD2 : bit (4) >}}
       { 0 | 1 <Packet Extended Timing Advance : bit (2) > }
       { 0 | 1 < COMPACT reduced MA : < COMPACT reduced MA IE > > }
       { null | 0 bit** = < no string > -- Receiver backward compatible with earlier version
       | 1         -- Additions for REL-5
```

TABLE 3-continued

```
    { 0 | 1 < RB Id : bit (5) >
       { 0 | 1 < G-RNTI extension : bit (4) > }
       { 0 | 1 < Uplink Control Timeslot : bit (3) > }
       { 0 | 1 < HFN_LSB : bit (1) > }}
    { null | 0 bit** = < no string > -- Receiver backward compatible with earlier version
     | 1         -- Additions for REL-6
    { 0 | 1 < PFI : bit (7) > }
    { null | 0 bit** = < no string > -- Receiver backward compatible with earlier version
     | 1         -- Additions for REL-7
    { 0 | 1 < NPM Transfer Time : bit (5) > }
    { null | 0 bit** = < no string > -- Receiver backward compatible with earlier version
     | 1         -- Additions for REL-9
    < Indication of Upper Layer PDU Start for RLC UM : bit >
    { 0
    | 1 < RLC Entity 2 : < RLC Entity Struct > > -- EMST is used
      { 0
      | 1 < RLC Entity 3 : < RLC Entity Struct > > }
    }
    { null | 0 bit** = < no string > -- Receiver backward compatible with earlier version
     | 1         -- Additions for Rel-10
    { 1 < EMSR Additional PFCs 1 : < Additional PFCs struct > > }** 0
    { 1 < EMSR Additional PFCs 2 : < Additional PFCs struct > > }** 0
    { 1 < EMSR Additional PFCs 3 : < Additional PFCs struct > > }** 0
< padding bits > }}}}}}}//     -- truncation at end of message allowed, bits '0' assumed
! < Non-distribution part error : bit (*) = < no string > > }
| 1        -- message escape for dual carrier, RTTI, BTTI with FANR activated, EGPRS2
 { 00 { < RLC_MODE : bit (1) >
  < CONTROL_ACK : bit (1) >
  < Assignment Info : < Assignment Info struct > >
  { 0       -- BTTI mode
    < TIMESLOT_ALLOCATION_C1: bit (8) >
    { 0 | 1 < TIMESLOT_ALLOCATION_C2: bit (8) > }
  | 1       -- RTTI mode
    { 0      -- Single Carrier Assignment
     { 00    -- Default PDCH pair configuration
     | 01    -- Unchanged
     | 10    -- Explicit PDCH pair configuration
        < DOWNLINK_PDCH_PAIRS_C1 : bit (8) >
        < UPLINK_PDCH_PAIRS_C1 : bit (8) >
     ! < PDCH pairs configuration error : { 1 1 } bit (*) = < no string > >    -- reserved
     }
     < RTTI_DOWNLINK_PDCH_PAIR_ASSIGNMENT_SC : bit (4) >
    | 1      -- Dual Carrier Assignment
     { 00    -- Default PDCH pair configuration
     | 01    -- Unchanged
     | 10    -- Explicit PDCH pair configuration
        < DOWNLINK_PDCH_PAIRS_C1 : bit (8) >
        < DOWNLINK_PDCH_PAIRS_C2 : bit (8) >
        < UPLINK_PDCH_PAIRS_C1 : bit (8) >
        < UPLINK_PDCH_PAIRS_C2 : bit (8) >
     ! < PDCH pairs configuration error : { 1 1 }bit (*) = < no string > >    -- reserved
     }
     < RTTI_DOWNLINK_PDCH_PAIR_ASSIGNMENT_DC : bit (8) >
    }
  }
  < Packet Timing Advance : < Packet Timing Advance IE > >
  { 00   -- No frequency parameters included
  | 01   -- Legacy IEs used
    { 0 | 1 < Frequency Parameters C1 : < Frequency Parameters IE > > }
    { 0 | 1 < Frequency Parameters C2 : < Frequency Parameters IE > > }
  | 10    -- Optimized Dual Carrier frequency parameters used
    < Dual Carrier Frequency Parameters: < Dual Carrier Frequency Parameters IE > >
  ! < Frequency Parameters error: { 11 } bit (*) = < no string> > } -- reserved for future used
  { 0 | 1 < P0_C1 : bit (4) >
   < PR_MODE_C1 : bit (1) >
    { 0 | 1 < P0_C2 : bit (4) >
     < PR_MODE_C2 : bit (1) > }}
  { 0 | 1 < DOWNLINK_TFI_ASSIGNMENT : bit (5) > }
  { 0 | 1 < Power Control Parameters C1 : < Power Control Parameters IE > > }
  { 0 | 1 < Power Control Parameters C2 : < Power Control Parameters IE > > }
  { 0 | 1 < EGPRS Window Size : < EGPRS Window Size IE > >
   < LINK_QUALITY_MEASUREMENT_MODE : bit (2) >
    { 0 | 1 < BEP_PERIOD2 : bit (4) > }}
  { 0 | 1 < Packet Extended Timing Advance : bit (2) > }
  { 0 | 1 < PFI : bit (7) > }
  { 0 | 1 < NPM Transfer Time : bit (5) > }
  { 0 | 1  -- '1' indicates Fast Ack/Nack Reporting is activated
   < EVENT_BASED_FANR: bit (1) > }
```

TABLE 3-continued

```
    < Downlink EGPRS Level: < EGPRS Level IE > >
    { null | 0 bit** = < no string > -- Receiver backward compatible with earlier version
    | 1      -- Additions for REL-9
      < Indication of Upper Layer PDU Start for RLC UM: bit >
      { 0
      | 1 < RLC Entity 2 : < RLC Entity Struct > > -- EMST is used
        { 0
        | 1 < RLC Entity 3 : < RLC Entity Struct > > }
      }
      { 0 | 1 MTTI_DOWNLINK_ASSIGNMENT_C1 : bit (1) }
      { 0 | 1 MTTI_DOWNLINK_ASSIGNMENT_C2 : bit (1) }
      { null | 0 bit** = < no string > -- Receiver backward compatible with earlier version
      | 1      -- Additions for Rel-10
        { 1 < EMSR Additional PFCs 1 : < Additional PFCs struct > > }** 0
        { 1 < EMSR Additional PFCs 2 : < Additional PFCs struct > > }** 0
        { 1 < EMSR Additional PFCs 3 : < Additional PFCs struct > > }** 0
        { 0 | 1 < DARP_Phase_I_Timeslots_Selection_Criteria: bit (3) > }
    < padding bits > }}}//     -- truncation at end of message allowed, bits '0' assumed
  ! < Message escape : { 01 | 10 | 11 } bit (*) = < no string > > }
  }
  ! < Address information part error : bit (*) = < no string > > }
  ! < Distribution part error : bit (*) = < no string > > ;
< Assignment Info struct > ::=
< Assignment Type : bit (2) >
< Carrier ID : bit (1) >
< RLC Entity Struct > ::=
< DOWNLINK_TFI_ASSIGNMENT : bit (5) >
< RLC_MODE : bit (1) >
{ 0 | 1 < EGPRS Window Size : < EGPRS Window Size IE > > }
< PFI : bit (7) > ;
< Additional PFCs struct> ::=
< DOWNLINK_TFI_ASSIGNMENT : bit (5) >
  { 0 | 1 < NPM Transfer Time : bit (5) > }
< PFI : bit (7) > ;
```

TABLE 4

LINK_QUALITY_MEASUREMENT_MODE (2 bit field)
This field determines the measurements to be included within the EGPRS Timeslot Link Quality Measurements IE or EGPRS Timeslot Link Quality Measurements Type 2 IE.
bit
2 1
0 0 The mobile station shall not report either interference measurements (γ values) or per slot (slot pair in RTTI configuration) mean BEP measurements.
0 1 The mobile station shall report available interference measurements (γ values) for timeslots 0 through 7. The γ value is defined in 3GPP TS 45.008. No per slot (slot pair in RTTI configuration) mean BEP measurements shall be reported.
1 0 The mobile station shall report the mean BEP on each assigned time slot (slot pair in RTTI configuration) as specified in 3GPP TS 45.008. No interference measurements (γ values) shall be reported.
1 1 The mobile station shall report the mean BEP on each assigned time slot (slot pair in RTTI configuration) as specified in 3GPP TS 45.008. In addition to mean BEP, the mobile station shall report interference measurements (γ values) for no more than four time slots. If the MS has interference measurements for more than four timeslots to report, the selection of timeslots for which measurements are included in each message is implementation specific, subject to the requirement that a measurement for each time slot, unless not available (see 3GPP TS 45.008), is included in at least every other report.
In case the assignment results in a dual carrier configuration, the value of the LINK_QUALITY_MEASUREMENT_MODE field shall apply to both carriers.
In addition, a mobile station supporting Downlink Advanced Receiver Performance (DARP) - phase I (see 3GPP TS 24.008) (optional: assigned a downlink dual carrier configuration} shall not report interference measurements on those (preferable: assigned} timeslots on which the mobile station is unable to ensure that the DARP - phase I requirements (see 3GPP TS 45.005) are met.

TABLE 5

DARP_Phase_I_Timeslots_Selection_Criteria (3 bit field)
This field indicates the criteria for selecting the timeslots or PDCH pairs for which the mobile station shall meet the Downlink Advanced Receiver Performance - phase I requirements (see 3GPP TS 45.005). If the mobile station is assigned concurrent uplink and downlink TBFs using either Flexible Timeslot Assignment (FTA) or Enhanced TABLE 5-continued Flexible Timeslot Assignment (EFTA), then the conditions in sub-clause 11.2.7.2 apply.
NOTE: An assignment is considered to use FTA if the assignment would not be a valid
multislot configuration if the mobile station did not support FTA. (see 3GPP TS 45.002
Table 6.4.2.2.1, Note 8).
bit
3 2 1
0 0 0   The selection of timeslots or PDCH pairs is implementation dependent (the
mobile station shall indicate the timeslots on which DARP Phase I requirements will be
met in {optional: each} packet downlink ack/nack message {preferable: which includes
interference measurement reports}).
0 0 1   Selection is implementation dependent (mobile shall not inform network).
0 1 0   The DARP Phase I requirements shall be met on all assigned timeslots or PDCH
pairs on carrier 1 and on as many of the assigned timeslots or PDCH pairs on carrier 2 as
possible, starting with the lowest-numbered assigned timeslot.
0 1 1   The DARP Phase I requirements shall be met on as many as possible of the
assigned timeslots or PDCH pairs, starting with the highest numbered assigned timeslot or
PDCH pair, on either carrier 1 or carrier 2,; carrier 1 has precedence in the case DARP
Phase I requirements cannot be met for a timeslot or PDCH pair assigned on both carriers.
1 0 0   The DARP Phase I requirements shall be met on the timeslots or PDCH pairs on
which the most RLC data blocks were received by the mobile station (regardless of
whether they were correctly received or not) between the transmission of the last-but-one
and the most recent measurement reports (i.e. responses to a CES/P field with bits '1 0 1' or
'1 1 0', see Table 10.4.4b.1). In case the requirements can be met on more timeslots or
PDCH pairs than the ones on which data blocks were received, the requirements shall
additionally be met on as many timeslots or PDCH pairs immediately adjacent to (and
then, 2 apart from, and so on) timeslots on which one or more RLC data blocks were
transmitted; in the case of multiple candidates then precedence shall be given to the lowest-
numbered timeslot or PDCH pair on carrier 1, then the next-lowest numbered timeslot or
PDCH pair on carrier 1 and so on.
1 0 1   Requirements shall be met on the timeslots or PDCH pairs on which the most
GMSK radio blocks were received by the mobile station (counting only those which were
addressed to the mobile or for which the intended recipient could not be determined due to
decoding errors) between the transmission of the last-but-one and most recent
measurement reports (i.e. responses to a CES/P field with bits '1 0 1' or '1 1 0', see Table
10.4.4b.1). In case the requirements can be met on more timeslots or PDCH pairs than the
ones on which data blocks were received, the requirements shall additionally be met on as
many timeslots or PDCH pairs immediately adjacent to (and then, 2 apart from, and so on)
timeslots or PDCH pairs on which one or more GMSK radio blocks were received; in the
case of multiple candidates then precedence shall be given to the lowest-numbered timeslot
or PDCH pair on carrier 1, then the next-lowest numbered timeslot or PDCH pair on carrier
1 and so on.
1 1 0   The DARP Phase I requirements shall be met on all assigned timeslots or PDCH
pairs on carrier 1; meeting DARP Phase I requirements on assigned timeslots on carrier 2
is not required.
1 1 1   In a DTM configuration the DARP Phase I requirements shall be met on any
assigned timeslot carrying TCH. Meeting DARP Phase I requirements on assigned
timeslots not carrying TCH (whether or not in a DTM configuration) is not required.
If this field is omitted the mobile station shall behave as if '0 0 1' was signalled.
1 1 0 spare
1 1 1 spare
If this field is omitted the mobile station shall behave as if '0 0 1' was signalled.

Yet another example of performing SAIC control as described herein involves modifying 3 GPP TS 44.060 to include the following section of text bounded by the >>>BEGIN<<< and >>>END<<< delimiters:

>>>BEGIN<<<
Special requirements for DARP Phase I in downlink dual carrier
configuration using FTA or EFTA
The behaviour described in this sub-clause takes precedence over the
behaviour specified by the DARP__Phase__I__Timeslots__Selection__Criteria field, if received.
If the mobile station is assigned concurrent uplink and downlink TBFs
using either Flexible Timeslot Assignment (FTA) or Enhanced Flexible Timeslot Assignment
(EFTA), then the mobile station shall take account of its uplink allocation in a given block
period when determining on which timeslots or PDCH pairs the Downlink Advanced
Receiver Performance - phase I requirements (see 3GPP TS 45.005) must be met.
In the case of Flexible Timeslot Assignment (FTA), if in a given radio
block period, the number of timeslots on which the mobile station may receive data, taking
into account any uplink allocation, is equal to or lower than the number of timeslots on which
the requirements can be met, then the requirements shall be met for all timeslots on which
downlink data may be received.
In the case of Flexible Timeslot Assignment or Enhanced Flexible Timeslot
Assignment {optional: when Extended Dynamic Allocation is used} then the mobile station
shall meet the requirements on as many as possible of the assigned downlink timeslots starting with the lowest-numbered timeslot.
In case of a tie-break at any point, the rules specified for the
DARP_Phase_I_Timeslots_Selection_Criteria field shall apply.
>>>END<<<

---

The preceding example is but one example of a prioritization rule for controlling SAIC, and the preceding example prioritization rule is applicable when EFTA or FTA is being used. Further example prioritization rules A and B that may be used with or without EFTA or FTA are as follows. These example prioritization rules are tailored to circumstances when the uplink assignment and downlink assignment for the mobile station are such that transmission on all assigned uplink timeslots and reception on all assigned downlink timeslots is not possible (e.g., because transmission on one or more of the assigned uplink timeslots may preclude reception on one or more assigned downlink timeslots).

Example prioritization rule A: The mobile station shall meet the requirements on timeslots in the following order of precedence (highest first): (i) any assigned timeslots on which it could receive data, if the mobile station transmitted on all allocated uplink timeslots, then (ii) the additional assigned timeslot(s) (if any) on which the mobile station could receive data, if the mobile station transmitted on all but one of its allocated uplink timeslots, and so on, taking into account the specified priority for transmitting data when allocated more than one timeslot.

Example prioritization rule B: The mobile station shall meet the requirements on timeslots in the following order of precedence (highest first): (i) any assigned timeslots on which it could receive data, if the mobile station transmitted on all assigned uplink timeslots, then (ii) the assigned timeslot (if any) on which the mobile station could receive data, if the mobile station transmitted on all but one of its assigned uplink timeslots, and so on, taking into account the specified priority for transmitting data when allocated more than one timeslot.

Operation of prioritization rule A and B can be illustrated by the following example. Assume the priority for transmitting data in order of timeslot number is {7, 5, 3, 1, 6, 4, 2, 0}. Also assume that the mobile station is assigned uplink timeslot numbers {1-7} inclusively, and is allocated timeslot numbers {1, 2, 3}, but has nothing to send. Under example prioritization rule A, the mobile station determines which are the non-colliding (e.g., non-overlapping) downlink (e.g., receive) timeslots based on assuming transmissions will occur on timeslot {3}, then timeslots {3, 1} and then timeslots {3, 1, 2}, and prioritizes SAIC on the downlink (e.g., receive) timeslots accordingly. Under example prioritization rule B, the mobile station ignores the uplink allocation for SAIC control and, instead, determines which are the non-colliding (e.g., non-overlapping) downlink (e.g., receive) timeslots based on assuming transmissions will occur on timeslot {7}, then timeslots {7, 5} then timeslots {7, 5, 3}, and so one, and prioritizes SAIC on the downlink (e.g., receive) timeslots accordingly.

Additionally or alternatively, another example prioritization rule prioritizes the timeslots on which SAIC is applied depending on whether or not dynamic or extended dynamic allocation (EDA) is used for the allocation of uplink timeslots. EDA is a mechanism whereby multiple uplink timeslots (or PDCH pairs) within a radio block period on a single carrier can be allocated by a single USF. Generally, if an assigned USF is received on a particular timeslot or PDCH pair, then the corresponding uplink timeslot or PDCH pair and all higher-numbered timeslots or PDCH pairs in the same radio block period are allocated to the mobile station.

As such, the preceding examples illustrated prioritization rules that prioritize SAIC control for downlink timeslots based one or more (e.g., in combination) of any of the following: (i) a group of one or more timeslot numbers associated with the uplink assignment, and a group of one or more timeslot numbers associated with the downlink assignment; (ii) a group of one or more timeslot numbers associated with an uplink allocation; (iii) whether the uplink assignment requires flexible timeslot assignment or enhanced flexible timeslot assignment capability; (iv) whether the uplink assignment requires dynamic allocation or extended dynamic allocation; and/or (v) one or more prioritization rules for transmitting on a group of one or more allocated uplink timeslots, which is a subset of a group of assignment uplink timeslots.

A still further example of performing SAIC control as described herein involves modifying section 6.3.5(v) of 3 GPP TS 45.005 to include the following text bounded by the >>>BEGIN<<< and >>>END<<< delimiters:

---

>>>BEGIN<<<
v) In addition, MS indicating support for Downlink Advanced Receiver
Performance - phase I (see 3GPP TS 24.008) shall fulfil the requirements in table 2o for
wanted signals on GMSK modulated channels under TU50 no FH propagation conditions and
GMSK modulated interferers for the test scenarios defined in annex L, unless when the MS is
in downlink dual carrier configuration (see 3GPP 44.060), in which case, the MS shall fulfil
the requirements on a subset of the assigned PDCHs. (Note: In case of DTM in Downlink
Dual Carrier configuration, the Downlink Advanced Receiver Performance - Phase I shall be
met in any case for the speech channels and the associated control channels (SACCH and
FACCH).)
>>>END<<<

Another example of performing SAIC control as described herein involves modifying section 6.3.5(v) of 3 GPP TS 45.005 to include the following text bounded by the >>>BEGIN<<< and >>>END<<< delimiters:

>>>BEGIN<<<
v) In addition, MS indicating support for Downlink Advanced Receiver Performance - phase I (see 3GPP TS 24.008) shall fulfil the requirements in table 2o for wanted signals on GMSK modulated channels under TU50 no FH propagation conditions and GMSK modulated interferers for the test scenarios defined in annex L, unless when the MS is in downlink dual carrier configuration (see 3GPP 44.060) and the MS signals Downlink_Dualcarrier_Saic_Multislot_Capability (see 3GPP TS 24.008), in which case, the MS shall fulfil the requirements on a subset of the assigned PDCHs. (Note: In case of DTM in Downlink Dual Carrier configuration, the Downlink Advanced Receiver Performance - Phase I shall be met in any case for the speech channels and the associated control channels (SACCH and FACCH).)
>>>END<<<

Yet another example of performing SAIC control as described herein involves modifying section 6.3.5(v) of 3 GPP TS 45.005 to include the following text bounded by the >>>BEGIN<<< and >>>END<<< delimiters:

>>>BEGIN<<<
v) In addition, MS indicating support for Downlink Advanced Receiver Performance - phase I (see 3GPP TS 24.008) shall fulfil the requirements in table 2o for wanted signals on GMSK modulated channels under TU50 no FH propagation conditions and GMSK modulated interferers for the test scenarios defined in annex L, unless when the MS is in downlink dual carrier configuration (see 3GPP 44.060) and the MS signals Downlink_Dualcarrier_Saic_Multislot_Capability (see 3GPP TS 24.008), in which case, the MS shall fulfil the requirements on a subset of the assigned PDCHs as stated in 3GPP TS 44.060. (Note: In case of DTM in Downlink Dual Carrier configuration, the Downlink Advanced Receiver Performance - Phase I shall be met in any case for the speech channels and the associated control channels (SACCH and FACCH).)
>>>END<<<

Figure 29:
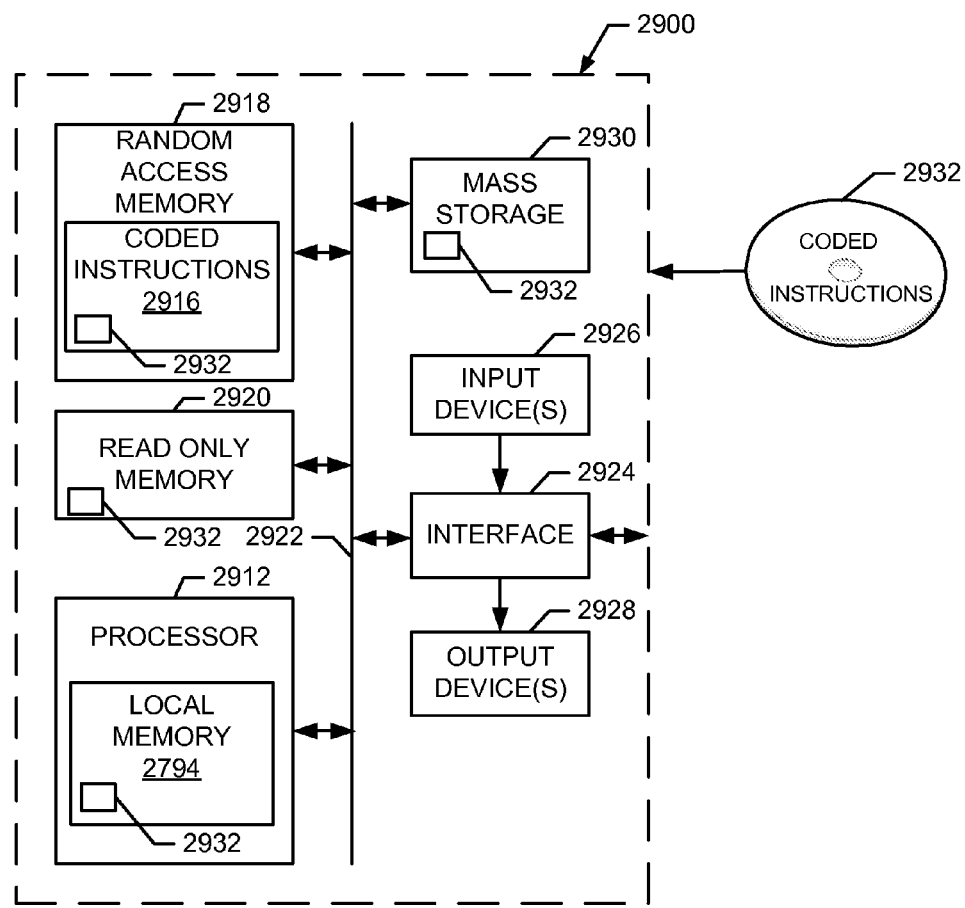
FIG. 29 is a block diagram of an example processing system that may execute example machine readable instructions used to implement some or all of the processes of FIGS. 8-15, 18, 21-27 and/or 28 to implement the example mobile communication system, the example mobile station and/or the example base station of FIG. 1, the example receive-side single antenna interference cancellation controller of FIG. 4, and/or the example transmit-side single antenna interference cancellation controller of FIG. 7.

FIG. 29 is a block diagram of an example processing system 2900 capable of implementing the apparatus and methods disclosed herein. The processing system 2900 can be, for example, a server, a personal computer, a personal digital assistant (PDA), an Internet appliance, or any other type of computing device.

The system 2900 of the instant example includes a processor 2912 such as a general purpose programmable processor. The processor 2912 includes a local memory 2914, and executes coded instructions 2916 present in the local memory 2914 and/or in another memory device. The processor 2912 may execute, among other things, machine readable instructions to implement the processes represented in FIGS. 8-15, 18 and 21-28. The processor 2912 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 2912 is in communication with a main memory including a volatile memory 2918 and a non-volatile memory 2920 via a bus 2922. The volatile memory 2918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2920 may be implemented by flash memory and/or any other desired type of memory device. Access to the main memory 2918, 2920 is typically controlled by a memory controller (not shown).

The processing system 2900 also includes an interface circuit 2924. The interface circuit 2924 may be implemented by any type of interface standard, such as an Ethernet interface, a universal serial bus (USB), and/or a third generation input/output (3 GIO) interface.

One or more input devices 2926 are connected to the interface circuit 2924. The input device(s) 2926 permit a user to enter data and commands into the processor 2912. The input device(s) can be implemented by, for example, a keyboard, a mouse, a touchscreen, a track-pad, a trackball, an isopoint and/or a voice recognition system.

One or more output devices 2928 are also connected to the interface circuit 2924. The output devices 2928 can be implemented, for example, by display devices (e.g., a liquid crystal display, a cathode ray tube display (CRT)), by a printer and/or by speakers. The interface circuit 2924, thus, typically includes a graphics driver card.

The interface circuit 2924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 2900 also includes one or more mass storage devices 2930 for storing machine readable instructions and data. Examples of such mass storage devices 2930 include floppy disk drives, hard drive disks, compact disk drives and digital versatile disk (DVD) drives.

The coded instructions 2932 of FIGS. 8-15, 18 and 21-28 may be stored in the mass storage device 2930, in the volatile memory 2918, in the non-volatile memory 2920, in the local memory 2914 and/or on a removable storage medium, such as a CD or DVD 2932.

As an alternative to implementing the methods and/or apparatus described herein in a system such as the processing system of FIG. 29, the methods and or apparatus described herein may be embedded in a structure such as a processor and/or an ASIC (application specific integrated circuit).

From the foregoing, it will be appreciated that methods, apparatus and articles for performing single antenna interference cancellation in a mobile communication system have been disclosed. Such an example disclosed method for a wireless device includes determining a number of bursts to be received in a time division multiple access frame comprising a plurality of timeslots, and when the number of bursts exceeds a threshold number of bursts for which single antenna interference cancellation can be performed, performing single antenna interference cancellation for a subset of the bursts received in the time division multiple access frame.

In some examples, the method further includes, when the number of bursts to be received does not exceed the threshold number of bursts for which single antenna interference cancellation can be performed, enabling single antenna interference cancellation for all bursts to be received in the time division multiple access frame.

In some examples, the method further includes sending a message indicating each timeslot in the time division multiple access frame for which performance requirements associated with single antenna interference cancellation being enabled are expected to be met.

In some examples, the method further includes sending a message indicating each timeslot in the time division multiple access frame for which performance requirements associated with single antenna interference cancellation being enabled are not expected to be met.

In some examples, the method further includes reporting a respective interference measurement for each timeslot in the time division multiple access frame for which performance requirements associated with single antenna interference cancellation being enabled are expected to be met, and not reporting a respective interference measurement for each timeslot in the time division multiple access frame for which performance requirements associated with single antenna interference cancellation being enabled are not expected to be met.

In some examples, the method further includes reporting a respective interference measurement for each timeslot in the time division multiple access frame for which performance requirements associated with single antenna interference cancellation being enabled are not expected to be met, and not reporting a respective interference measurement for each timeslot in the time division multiple access frame for which performance requirements associated with single antenna interference cancellation being enabled are expected to be met.

In some examples, performing single antenna interference cancellation for the subset of the bursts includes enabling single antenna interference cancellation for each burst corresponding to a speech channel.

In some examples, performing single antenna interference cancellation for the subset of the bursts includes determining a set of one or more modulation and coding schemes receivable in each timeslot assigned for reception in the time division multiple access frame, and determining, for a particular assigned timeslot, whether to perform single antenna interference cancellation on a per-codeword basis or a per-burst basis based on the set of one or more modulation and coding schemes determined to be receivable in the particular assigned timeslot.

In some examples, performing single antenna interference cancellation for the subset of the bursts includes determining whether to enable single antenna interference cancellation for a particular burst corresponding to a particular codeword based on at least one of a radio condition detected for the particular burst, an estimated probability of successfully decoding the particular codeword corresponding to the particular burst, or a set of one or more modulation and coding schemes capable of being used to transmit the particular burst.

In some examples, the method is performed by a first wireless device, the time division multiple access frame is a current time division multiple access frame, and performing single antenna interference cancellation for the subset of the bursts includes determining address information for a codeword associated with a particular timeslot from a decoded burst received in a previous time division multiple access frame during the particular timeslot, and disabling single antenna interference cancellation for the particular timeslot in the current time division multiple access frame when the address information indicates the codeword is addressed to a second wireless device different from the first wireless device.

In some examples, performing single antenna interference cancellation for the subset of the bursts includes disabling single antenna interference cancellation for one or more timeslots in the time division multiple access frame based on a predetermined order of disabling single antenna interference cancellation according to timeslot number. In some examples, the predetermined order of disabling single antenna interference cancellation according to timeslot number corresponds to disabling single antenna interference cancellation starting from a highest assigned timeslot number and proceeding in order of decreasing assigned timeslot number until the threshold number of bursts for which single antenna interference cancellation can be performed is not exceeded.

In some examples, performing single antenna interference cancellation for the subset of the bursts includes enabling single antenna interference cancellation for a first group of one or more timeslots of the time division multiple access frame each having a same respective timeslot number as that associated with a respective data block that was received during a prior interval, and when the threshold number of bursts for which single antenna interference cancellation can be performed is not exceeded after enabling single antenna interference cancellation in each timeslot in the first group of one or more timeslots, enabling single antenna interference cancellation for at least one additional timeslot that is adjacent to at least one timeslot in the first group of one or more timeslots.

In some examples, the method further includes, when the threshold number of bursts for which single antenna interference cancellation can be performed is not exceeded after enabling single antenna interference cancellation for the at least one additional timeslot, interspersing enabling of single antenna interference cancellation to a remaining subset of assigned timeslots based on a ratio.

In some examples, performing single antenna interference cancellation for the subset of the bursts includes enabling single antenna interference cancellation for a particular timeslot across multiple time division multiple access frames based on a set of one or more modulation and coding schemes determined to be receivable in the particular timeslot.

In some examples, performing single antenna interference cancellation for the subset of the bursts includes, for each assigned timeslot, determining a respective type of information likely to be received in the respective assigned timeslot, enabling single antenna interference cancellation for each timeslot that is likely to receive a control message, when the threshold number of bursts for which single antenna interference cancellation can be performed is not exceeded after enabling single antenna interference cancellation for each timeslot likely to receive a control message, enabling single antenna interference cancellation for each timeslot that is likely to receive data addressed to the wireless device, and when the threshold number of bursts for which single antenna interference cancellation can be performed is not exceeded after further enabling single antenna interference cancellation for each timeslot that is likely to receive data addressed to the wireless device, enabling single antenna interference cancellation for each timeslot that is likely to receive data not addressed to the wireless device.

In some examples, performing single antenna interference cancellation for the subset of the bursts includes receiving an uplink assignment, wherein transmission on all assigned uplink timeslots and reception on all assigned downlink timeslots is not possible, and prioritizing single antenna interference cancellation control for downlink timeslots based on at least one of a first group of one or more timeslot numbers associated with the uplink assignment, and a second group of one or more timeslot numbers associated with a downlink assignment, a third group of one or more timeslot numbers associated with an uplink allocation, whether the uplink assignment requires flexible timeslot assignment or enhanced flexible timeslot assignment capability, whether the uplink assignment requires dynamic allocation or extended dynamic allocation, or a prioritization rule for transmitting on a fourth group of one or more allocated uplink timeslots, wherein the fourth group of one or more allocated uplink timeslots is a subset of a fifth group of assigned uplink timeslots.

In some examples, performing single antenna interference cancellation for the subset of the bursts includes disabling single antenna interference cancellation for one timeslot of a pair of timeslots carrying a physical channel configured for reduced transmission time interval operation, and enabling single antenna interference cancellation for another timeslot of the pair of timeslots carrying the physical channel configured for reduced transmission time interval operation.

In some examples, performing single antenna interference cancellation for the subset of the bursts includes enabling single antenna interference cancellation for a timeslot carrying a first physical channel configured for basic transmission time interval operation, and disabling single antenna interference cancellation for at least one timeslot of a pair of timeslots carrying a second physical channel configured for reduced transmission time interval operation.

Another example disclosed method for a wireless device includes receiving a message from a network indicating downlink timeslots of a time division multiple access frame for which downlink advanced receiver performance requirements are to be met, and enabling single antenna interference cancellation for at least a subset of the downlink timeslots indicated in the received message.

In some examples, the message is a packet downlink assignment message.

In some examples, to indicate the downlink timeslots for which the downlink advanced receiver performance requirements are to be met, the message is to indicate a bitmap specifying, by timeslot number, the downlink timeslots for which downlink advanced receiver performance requirements are to be met.

In some examples, to indicate the downlink timeslots for which the downlink advanced receiver performance requirements are to be met, the message is to indicate a rule for prioritizing for which assigned downlink timeslots the downlink advanced receiver performance requirements are to be met.

In some examples, the method further includes indicating to the network a number of timeslots for which the downlink advanced receiver performance requirements can be supported.

In some examples, the method further includes, when a number of timeslots for which the downlink advanced receiver performance requirements can be supported is to be exceeded if single antenna interference cancellation is enabled for the downlink timeslots indicated in the received signaling, disabling single antenna interference cancellation for at least one of the downlink timeslots indicated in the received signaling.

In some examples, the subset of downlink timeslots includes all downlink timeslots indicated in the received message.

An example disclosed method for a network component includes sending a message to a mobile station indicating timeslot numbers of a time division multiple access frame for which downlink advanced receiver performance requirements are to be met.

In some examples, the method further includes receiving from the mobile station an indication of a number of timeslots for which the downlink advanced receiver performance requirements can be supported, and using the received indication to determine the timeslot numbers for which downlink advanced receiver performance requirements are to be met.

Another example disclosed method for a network component includes determining a subset of downlink timeslots for which a mobile station is able to meet downlink advanced receiver performance requirements, and at least one of scheduling or selecting a modulation and coding scheme for a downlink data transmission to the mobile station based on determining the subset of downlink timeslots in which the downlink advanced receiver performance requirements are able to be met.

In some examples, the method further includes receiving a message from the mobile station indicating the subset of downlink timeslots for which the mobile station is able to meet the downlink advanced receiver performance requirements.

In some examples, the message is a packet downlink ack/nack message.

In some examples, the message includes a piggy-backed ack/nack field included in a received data block.

In some examples, the method further includes receiving link quality interference measurements from the mobile station for the subset of downlink timeslots for which the mobile station is able to meet the downlink advanced receiver performance requirements, but not receiving link quality interference measurements for any other timeslot in the time division multiple access frame, and using the received link quality interference measurements to determine the subset of downlink timeslots for which the mobile station is able to meet the downlink advanced receiver performance requirements.

In some examples, the method further includes receiving link quality interference measurements from the mobile station for the subset of downlink timeslots for which the mobile station is not able to meet the downlink advanced receiver performance requirements, but not receiving link quality interference measurements for any other timeslot in the time division multiple access frame, and using the received link quality interference measurements to determine the subset of downlink timeslots for which the mobile station is able to meet the downlink advanced receiver performance requirements.

In some examples, a computer program stores machine readable instructions which, when executed, cause a machine to perform any one or more of the preceding example methods.

In some examples, an apparatus includes a processor programmed to perform any one or more of the preceding example methods.

It is noted that this patent claims priority from European Patent Application Serial Number EP11305560, which was filed on May 10, 2011, and is hereby incorporated by reference in its entirety.

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for a wireless device, the method comprising:
    determining whether a number of bursts to be received in a time division multiple access frame exceeds a threshold number of bursts for which single antenna interference cancellation can be performed, the time division multiple access frame comprising a plurality of timeslots; and
    when the number of bursts is determined to exceed the threshold number of bursts for which single antenna interference cancellation can be performed, performing single antenna interference cancellation for a subset of the bursts received in the time division multiple access frame, wherein performing single antenna interference cancellation for the subset of the bursts comprises disabling single antenna interference cancellation for one or more timeslots in the time division multiple access frame.

2. The method as defined in claim 1 further comprising, when the number of bursts to be received is determined to not exceed the threshold number of bursts for which single antenna interference cancellation can be performed, enabling single antenna interference cancellation for all bursts to be received in the time division multiple access frame.

3. The method as defined in claim 1 further comprising sending a message indicating each timeslot in the time division multiple access frame for which performance requirements associated with single antenna interference cancellation being enabled are expected to be met.

4. The method as defined in claim 1 further comprising sending a message indicating each timeslot in the time division multiple access frame for which performance requirements associated with single antenna interference cancellation being enabled are not expected to be met.

5. The method as defined in claim 1 further comprising reporting a respective interference measurement for each timeslot in the time division multiple access frame for which performance requirements associated with single antenna interference cancellation being enabled are expected to be met, and not reporting a respective interference measurement for each timeslot in the time division multiple access frame for which performance requirements associated with single antenna interference cancellation being enabled are not expected to be met.

6. The method as defined in claim 1 further comprising reporting a respective interference measurement for each timeslot in the time division multiple access frame for which performance requirements associated with single antenna interference cancellation being enabled are not expected to be met, and not reporting a respective interference measurement for each timeslot in the time division multiple access frame for which performance requirements associated with single antenna interference cancellation being enabled are expected to be met.

7. The method as defined in claim 1 wherein performing single antenna interference cancellation for the subset of the bursts comprises enabling single antenna interference cancellation for each burst corresponding to a speech channel.

8. The method as defined in claim 1 wherein disabling single antenna interference cancellation for one or more timeslots in the time division multiple access frame is based on a predetermined order of disabling single antenna interference cancellation according to timeslot number.

9. The method as defined in claim 8 wherein the predetermined order of disabling single antenna interference cancellation according to timeslot number corresponds to disabling single antenna interference cancellation starting from a highest assigned timeslot number and proceeding in order of decreasing assigned timeslot number until the threshold number of bursts for which single antenna interference cancellation can be performed is not exceeded.

10. The method as defined in claim 1 wherein performing single antenna interference cancellation for the subset of the bursts comprises
    receiving an uplink assignment, wherein transmission on all assigned uplink timeslots and reception on all assigned downlink timeslots is not possible; and
    prioritizing single antenna interference cancellation control for downlink timeslots based on at least one of:
        a first group of one or more timeslot numbers associated with the uplink assignment, and a second group of one or more timeslot numbers associated with a downlink assignment;
        a third group of one or more timeslot numbers associated with an uplink allocation;
        whether the uplink assignment requires flexible timeslot assignment or enhanced flexible timeslot assignment capability;
        whether the uplink assignment requires dynamic allocation or extended dynamic allocation; or
        a prioritization rule for transmitting on a fourth group of one or more allocated uplink timeslots, wherein the fourth group of one or more allocated uplink timeslots is a subset of a fifth group of assigned uplink timeslots.

11. A method for a wireless device, the method comprising:
    determining a number of bursts to be received in a time division multiple access frame comprising a plurality of timeslots;
    when the number of bursts exceeds a threshold number of bursts for which single antenna interference cancellation can be performed, performing single antenna interference cancellation for a subset of the bursts received in the time division multiple access frame, wherein performing single antenna interference cancellation for the subset of the bursts comprises disabling single antenna interference cancellation for one or more timeslots in the time division multiple access frame, and wherein performing single antenna interference cancellation for the subset of the bursts comprises:
        enabling single antenna interference cancellation for a first group of one or more timeslots of the time division multiple access frame each having a same respective timeslot number as that associated with a respective data block that was received during a prior interval; and when the threshold number of bursts for which single antenna interference cancellation can be performed is not exceeded after enabling single antenna interference cancellation in each timeslot in the first group of one or more timeslots, enabling single antenna interference cancellation for at least one additional timeslot that is adjacent to at least one timeslot in the first group of one or more timeslots.

12. The method as defined in claim 11 further comprising, when the threshold number of bursts for which single antenna interference cancellation can be performed is not exceeded after enabling single antenna interference cancellation for the at least one additional timeslot, interspersing enabling of single antenna interference cancellation to a remaining subset of assigned timeslots based on a ratio.

13. A method for a wireless device, the method comprising:
   determining a number of bursts to be received in a time division multiple access frame comprising a plurality of timeslots;
   when the number of bursts exceeds a threshold number of bursts for which single antenna interference cancellation can be performed, performing single antenna interference cancellation for a subset of the bursts received in the time division multiple access frame, wherein performing single antenna interference cancellation for the subset of the bursts comprises disabling single antenna interference cancellation for one or more timeslots in the time division multiple access frame, and wherein performing single antenna interference cancellation for the subset of the bursts comprises:
   for each assigned timeslot, determining a respective type of information likely to be received in the respective assigned timeslot;
   enabling single antenna interference cancellation for each timeslot that is likely to receive a control message;
   when the threshold number of bursts for which single antenna interference cancellation can be performed is not exceeded after enabling single antenna interference cancellation for each timeslot likely to receive a control message, enabling single antenna interference cancellation for each timeslot that is likely to receive data addressed to the wireless device; and
   when the threshold number of bursts for which single antenna interference cancellation can be performed is not exceeded after further enabling single antenna interference cancellation for each timeslot that is likely to receive data addressed to the wireless device, enabling single antenna interference cancellation for each timeslot that is likely to receive data not addressed to the wireless device.

14. A non-transitory machine readable storage medium comprising machine readable instructions which, when executed, cause a machine to at least:
   determine whether a number of bursts to be received in a time division multiple access frame exceeds a threshold number of bursts for which single antenna interference cancellation can be performed, the time division multiple access frame comprising a plurality of timeslots; and
   when the number of bursts is determined to exceed the threshold number of bursts for which single antenna interference cancellation can be performed, perform single antenna interference cancellation for a subset of the bursts received in the time division multiple access frame, wherein performing single antenna interference cancellation for the subset of the bursts comprises disabling single antenna interference cancellation for one or more timeslots in the time division multiple access frame.

15. An apparatus for a wireless device, the apparatus comprising:
   memory to store machine readable instructions; and
   a processor to execute the machine readable instructions to:
      determine whether determining a number of bursts to be received in a time division multiple access frame exceeds a threshold number of bursts for which single antenna interference cancellation can be performed, the time division multiple access frame comprising a plurality of timeslots; and
      when the number of bursts is determined to exceed the threshold number of bursts for which single antenna interference cancellation can be performed, perform performing single antenna interference cancellation for a subset of the bursts received in the time division multiple access frame, wherein performing single antenna interference cancellation for the subset of the bursts comprises disabling single antenna interference cancellation for one or more timeslots in the time division multiple access frame.

16. The apparatus as defined in claim 15 wherein the processor further is to, when the number of bursts to be received is determined to not exceed the threshold number of bursts for which single antenna interference cancellation can be performed, enable single antenna interference cancellation for all bursts to be received in the time division multiple access frame.

17. The apparatus as defined in claim 15 wherein the processor further is to send a message indicating each timeslot in the time division multiple access frame for which performance requirements associated with single antenna interference cancellation being enabled are expected to be met.

18. The apparatus as defined in claim 15 wherein the processor further is to send a message indicating each timeslot in the time division multiple access frame for which performance requirements associated with single antenna interference cancellation being enabled are not expected to be met.

19. The apparatus as defined in claim 15 wherein the processor further is to report a respective interference measurement for each timeslot in the time division multiple access frame for which performance requirements associated with single antenna interference cancellation being enabled are expected to be met, and not reporting report a respective interference measurement for each timeslot in the time division multiple access frame for which performance requirements associated with single antenna interference cancellation being enabled are not expected to be met.

20. The apparatus as defined in claim 15 wherein the processor further is to report a respective interference measurement for each timeslot in the time division multiple access frame for which performance requirements associated with single antenna interference cancellation being enabled are not expected to be met, and not report a respective interference measurement for each timeslot in the time division multiple access frame for which performance requirements associated with single antenna interference cancellation being enabled are expected to be met.

21. The apparatus as defined in claim 15 wherein to perform single antenna interference cancellation for the subset of the bursts, the processor is to enable single antenna interference cancellation for each burst corresponding to a speech channel.

22. The apparatus as defined in claim 15 wherein to disable single antenna interference cancellation for one or more timeslots in the time division multiple access frame is based on a predetermined order of disabling single antenna interference cancellation according to timeslot number.

23. The apparatus as defined in claim 22 wherein the predetermined order of disabling single antenna interference cancellation according to timeslot number corresponds to disabling single antenna interference cancellation starting from a highest assigned timeslot number and proceeding in order of decreasing assigned timeslot number until the threshold number of bursts for which single antenna interference cancellation can be performed is not exceeded.

24. The apparatus as defined in claim 15 wherein to perform single antenna interference cancellation for the subset of the bursts, the processor is to:
  receive an uplink assignment, wherein transmission on all assigned uplink timeslots and reception on all assigned downlink timeslots is not possible; and
  prioritize single antenna interference cancellation control for downlink timeslots based on at least one of:
    a first group of one or more timeslot numbers associated with the uplink assignment, and a second group of one or more timeslot numbers associated with a downlink assignment;
    a third group of one or more timeslot numbers associated with an uplink allocation;
    whether the uplink assignment requires flexible timeslot assignment or enhanced flexible timeslot assignment capability;
    whether the uplink assignment requires dynamic allocation or extended dynamic allocation; or
    a prioritization rule for transmitting on a fourth group of one or more allocated uplink timeslots, wherein the fourth group of one or more allocated uplink timeslots is a subset of a fifth group of assigned uplink timeslots.

25. An apparatus for a wireless device, the apparatus comprising:
  memory to store machine readable instructions; and
  a processor to execute the machine readable instructions to:
    determine a number of bursts to be received in a time division multiple access frame comprising a plurality of timeslots; and
    when the number of bursts exceeds a threshold number of bursts for which single antenna interference cancellation can be performed, perform single antenna interference cancellation for a subset of the bursts received in the time division multiple access frame, wherein to perform single antenna interference cancellation for the subset of the bursts comprises disabling single antenna interference cancellation for one or more timeslots in the time division multiple access frame, the processor is to:
    enable single antenna interference cancellation for a first group of one or more timeslots of the time division multiple access frame each having a same respective timeslot number as that associated with a respective data block that was received during a prior interval; and
    when the threshold number of bursts for which single antenna interference cancellation can be performed is not exceeded after enabling single antenna interference cancellation in each timeslot in the first group of one or more timeslots, enable single antenna interference cancellation for at least one additional timeslot that is adjacent to at least one timeslot in the first group of one or more timeslots.

26. The apparatus as defined in claim 25 wherein the processor further is to, when the threshold number of bursts for which single antenna interference cancellation can be performed is not exceeded after enabling single antenna interference cancellation for the at least one additional timeslot, intersperse enabling of single antenna interference cancellation to a remaining subset of assigned timeslots based on a ratio.

27. An apparatus for a wireless device, the apparatus comprising:
  memory to store machine readable instructions; and
  a processor to execute the machine readable instructions to:
    determine a number of bursts to be received in a time division multiple access frame comprising a plurality of timeslots; and
    when the number of bursts exceeds a threshold number of bursts for which single antenna interference cancellation can be performed, perform single antenna interference cancellation for a subset of the bursts received in the time division multiple access frame, wherein to perform single antenna interference cancellation for the subset of the bursts comprises disabling single antenna interference cancellation for one or more timeslots in the time division multiple access frame, the processor is to:
    for each assigned timeslot, determine a respective type of information likely to be received in the respective assigned timeslot;
    enable single antenna interference cancellation for each timeslot that is likely to receive a control message;
    when the threshold number of bursts for which single antenna interference cancellation can be performed is not exceeded after enabling single antenna interference cancellation for each timeslot likely to receive a control message, enable single antenna interference cancellation for each timeslot that is likely to receive data addressed to the wireless device; and
    when the threshold number of bursts for which single antenna interference cancellation can be performed is not exceeded after further enabling single antenna interference cancellation for each timeslot that is likely to receive data addressed to the wireless device, enable single antenna interference cancellation for each timeslot that is likely to receive data not addressed to the wireless device.

* * * * *